(12) United States Patent
Shigemura et al.

(10) Patent No.: US 9,072,313 B2
(45) Date of Patent: Jul. 7, 2015

(54) COMESTIBLE COMPOSITIONS COMPRISING HIGH POTENCY SAVORY FLAVORANTS, AND PROCESSES FOR PRODUCING THEM

(71) Applicant: Senomyx, Inc., San Diego, CA (US)

(72) Inventors: Rhondi Shigemura, Encinitas, CA (US); Qing Chen, San Diego, CA (US); Vincent Darmohusodo, Encinitas, CA (US); Aaron R. Dean, Wauwatosa, WI (US)

(73) Assignee: Senomyx, Inc., San Diego, CA (US)

( * ) Notice: Subject to any disclaimer, the term of this patent is extended or adjusted under 35 U.S.C. 154(b) by 0 days.

(21) Appl. No.: 13/646,555

(22) Filed: Oct. 5, 2012

(65) Prior Publication Data

US 2013/0266708 A1 Oct. 10, 2013

Related U.S. Application Data

(63) Continuation of application No. 13/406,002, filed on Feb. 27, 2012, now Pat. No. 8,318,947, which is a continuation of application No. 12/297,986, filed as application No. PCT/US2007/009828 on Apr. 19, 2007, now Pat. No. 8,148,536.

(60) Provisional application No. 60/793,844, filed on Apr. 21, 2006, provisional application No. 60/847,632, filed on Sep. 27, 2006.

(51) Int. Cl.
| | |
|---|---|
| A23L 1/0526 | (2006.01) |
| A23L 1/217 | (2006.01) |
| A23L 1/231 | (2006.01) |
| A23L 1/39 | (2006.01) |
| A23L 1/226 | (2006.01) |
| A23L 1/314 | (2006.01) |
| A23L 2/56 | (2006.01) |
| A23L 1/0522 | (2006.01) |

(52) U.S. Cl.
CPC ............... *A23L 1/22671* (2013.01); *A23L 1/39* (2013.01); *A23L 1/217* (2013.01); *A23L 1/231* (2013.01); *A23L 1/22664* (2013.01); *A23L 1/31445* (2013.01); *A23L 1/22678* (2013.01); *A23L 1/22657* (2013.01); *A23L 2/56* (2013.01); *A23L 1/0526* (2013.01); *A23L 1/05223* (2013.01)

(58) Field of Classification Search
None
See application file for complete search history.

(56) References Cited

U.S. PATENT DOCUMENTS

| | | | |
|---|---|---|---|
| 2,510,945 A | 6/1950 | Badget et al. | |
| 3,294,544 A | 12/1966 | Stanko et al. | |
| 3,503,962 A | 3/1970 | Beregi et al. | |
| 3,625,949 A | 12/1971 | Schorre et al. | |
| 4,034,109 A | 7/1977 | Roswell et al. | |
| 4,091,018 A | 5/1978 | Asato | |
| 4,115,538 A | 9/1978 | Satoh et al. | |
| 3,492,323 A | 1/1979 | Goldberg et al. | |
| 4,136,163 A | 1/1979 | Watson et al. | |
| 4,150,052 A | 4/1979 | Watson et al. | |
| 3,535,335 A | 10/1979 | Beregi et al. | |
| 4,177,279 A | 12/1979 | Archibald et al. | |
| 4,332,724 A | 6/1982 | Bentley et al. | |
| 4,366,241 A | 12/1982 | Tom et al. | |
| 4,376,110 A | 3/1983 | David et al. | |
| 4,391,904 A | 7/1983 | Litman et al. | |
| 4,458,066 A | 7/1984 | Caruthers et al. | |
| 4,509,971 A | 4/1985 | Forster et al. | |
| 4,517,288 A | 5/1985 | Geiegel et al. | |
| 4,535,084 A | 8/1985 | Lombardino et al. | |
| 4,567,053 A | 1/1986 | Lindley | |
| 4,571,345 A | 2/1986 | Verlander et al. | |
| 4,645,678 A | 2/1987 | Nofre et al. | |
| 4,683,195 A | 7/1987 | Mullis et al. | |
| 4,683,202 A | 7/1987 | Mullis | |
| 4,810,715 A | 3/1989 | Schickaneder et al. | |
| 4,833,243 A | 5/1989 | Forster et al. | |
| 4,837,168 A | 6/1989 | de Jaeger et al. | |
| 4,869,913 A | 9/1989 | Gries et al. | |
| 4,910,031 A | 3/1990 | Budd et al. | |
| 4,997,667 A | 3/1991 | Nofre et al. | |
| 5,010,175 A | 4/1991 | Rutter et al. | |
| 5,021,249 A | 6/1991 | Bunick et al. | |
| 5,176,928 A | 1/1993 | Shazer, Jr. et al. | |
| 5,272,071 A | 12/1993 | Chappel | |
| 5,288,514 A | 2/1994 | Ellman | |
| 5,426,039 A | 6/1995 | Wallace et al. | |
| 5,436,128 A | 7/1995 | Harpold et al. | |

(Continued)

FOREIGN PATENT DOCUMENTS

| | | |
|---|---|---|
| CA | 2406392 | 11/2001 |
| DE | 10109856 | 11/1957 |

(Continued)

OTHER PUBLICATIONS

Supplementary European Search Report for EP Application No. 04816798, dated Apr. 10, 2013.
Arai et al., "Tastes of L-Glutamyl Oligopeptides in Relation to Their Chromatographic Properties," *Agr. Biol. Chem.*, 37(1):151-156 (1973).
Avenoza et al., "Aspartame analogues containing 1-amino-2-phenylcyclohexanecarboxylic acids (c6Phe)," *Tetrahedron*, 58(24):4899-4905 (2002).
Brevitt et al., "Synthesis and in Vitro Evaluation of Two Progressive Series of Bifunctional Polyhydroxybenzaminde Catechol-O-methyltransferase Inhibitors," *J. Med Chem*, 40:2035-2039 (1997).

(Continued)

*Primary Examiner* — Kamal Saeed
(74) *Attorney, Agent, or Firm* — Cooley LLP

(57) ABSTRACT

The present invention relates to the use of certain high potency savory ('umami') taste modifiers, as savory flavoring agents and/or enhancers of monosodium glutamate, for the preparation of foods, beverages, and other comestible compositions, and to processes for preparing food flavorant compositions for use in the preparation of comestible food and drink.

4 Claims, No Drawings

(56) References Cited

U.S. PATENT DOCUMENTS

| | | | |
|---|---|---|---|
| 5,464,764 A | 11/1995 | Capecchi et al. |
| 5,476,849 A | 12/1995 | Ulrich et al. |
| 5,487,992 A | 1/1996 | Capecchi et al. |
| 5,506,337 A | 4/1996 | Summerton et al. |
| 5,508,407 A | 4/1996 | Kaldor et al. |
| 5,510,090 A | 4/1996 | Cuillerdier et al. |
| 5,519,134 A | 5/1996 | Acevedo et al. |
| 5,525,735 A | 6/1996 | Gallop et al. |
| 5,539,083 A | 7/1996 | Cook et al. |
| 5,549,974 A | 8/1996 | Holmes |
| 5,593,853 A | 1/1997 | Chen et al. |
| 5,616,491 A | 4/1997 | Mak et al. |
| 5,627,059 A | 5/1997 | Capecchi et al. |
| 5,631,153 A | 5/1997 | Capecchi et al. |
| 5,691,188 A | 11/1997 | Pausch et al. |
| 5,709,048 A | 1/1998 | Holtz |
| 5,780,090 A | 7/1998 | Frerot et al. |
| 5,877,218 A | 3/1999 | Herzig et al. |
| 5,877,221 A | 3/1999 | Cohen et al. |
| 5,880,159 A | 3/1999 | Herzig |
| 5,914,349 A | 6/1999 | Cohen et al. |
| 5,994,408 A | 11/1999 | Cohen et al. |
| 6,133,317 A | 10/2000 | Hart |
| 6,248,363 B1 | 6/2001 | Patel et al. |
| 6,271,263 B1 | 8/2001 | Sklarz et al. |
| 6,287,620 B1 | 9/2001 | Van Den Ouweland et al. |
| 6,368,651 B1 | 4/2002 | Gerlat et al. |
| 6,383,778 B1 | 5/2002 | Zuker et al. |
| 6,417,370 B1 | 7/2002 | Lieb et al. |
| 6,429,207 B1 | 8/2002 | Van Wagenen et al. |
| 6,451,843 B1 | 9/2002 | Lieb et al. |
| 6,462,747 B1 | 10/2002 | Suzuki et al. |
| 6,528,685 B2 | 3/2003 | Cohen et al. |
| 6,617,351 B1 | 9/2003 | Arnold et al. |
| 6,818,747 B2 | 11/2004 | Yao et al. |
| 6,955,887 B2 | 10/2005 | Adler et al. |
| 7,476,399 B2 | 1/2009 | Tachdjian et al. |
| 7,635,709 B2 | 12/2009 | Korsten et al. |
| 7,888,470 B2 | 2/2011 | Li et al. |
| 8,148,536 B2 | 4/2012 | Shigemura et al. |
| 8,318,947 B2 | 11/2012 | Shigemura et al. |
| 8,404,455 B2 | 3/2013 | Li et al. |
| 2002/0016424 A1 | 2/2002 | King et al. |
| 2002/0128433 A1 | 9/2002 | Yao et al. |
| 2002/0132273 A1 | 9/2002 | Stryer et al. |
| 2002/0143151 A1 | 10/2002 | Yao et al. |
| 2002/0151052 A1 | 10/2002 | Chaudhari et al. |
| 2002/0160424 A1 | 10/2002 | Adler et al. |
| 2003/0008344 A1 | 1/2003 | Adler et al. |
| 2003/0040045 A1 | 2/2003 | Zuker et al. |
| 2003/0054448 A1 | 3/2003 | Adler et al. |
| 2003/0089885 A1 | 5/2003 | Rogers et al. |
| 2003/0104102 A1 | 6/2003 | Nelles et al. |
| 2003/0139470 A1 | 7/2003 | Ley et al. |
| 2003/0170608 A1 | 9/2003 | Pronin et al. |
| 2003/0207337 A1 | 11/2003 | Han et al. |
| 2003/0220479 A1 | 11/2003 | Li et al. |
| 2003/0228633 A1 | 12/2003 | Zoller et al. |
| 2003/0232407 A1 | 12/2003 | Zoller et al. |
| 2004/0072254 A1 | 4/2004 | Callamaras et al. |
| 2004/0132075 A1 | 7/2004 | Elliot et al. |
| 2004/0132134 A1 | 7/2004 | Adler et al. |
| 2004/0171042 A1 | 9/2004 | Adler et al. |
| 2004/0175792 A1 | 9/2004 | Zoller et al. |
| 2004/0175793 A1 | 9/2004 | Zoller et al. |
| 2004/0185469 A1 | 9/2004 | Zoller et al. |
| 2004/0191805 A1 | 9/2004 | Adler et al. |
| 2004/0191862 A1 | 9/2004 | Zoller et al. |
| 2004/0209286 A1 | 10/2004 | Adler et al. |
| 2004/0229239 A1 | 11/2004 | Adler et al. |
| 2005/0009812 A1 | 1/2005 | Seko et al. |
| 2005/0032158 A1 | 2/2005 | Adler et al. |
| 2005/0069944 A1 | 3/2005 | Adler et al. |
| 2005/0084506 A1 | 4/2005 | Tachdjian et al. |
| 2005/0084932 A1 | 4/2005 | Zoller et al. |
| 2006/0045953 A1 | 3/2006 | Tachdjian et al. |
| 2006/0094699 A1 | 5/2006 | Kampen et al. |
| 2006/0257543 A1 | 11/2006 | Darmohusodo et al. |
| 2006/0263411 A1 | 11/2006 | Tachdjian et al. |
| 2007/0003680 A1 | 1/2007 | Tachdjian et al. |
| 2007/0104709 A1 | 5/2007 | Li et al. |
| 2009/0111834 A1 | 4/2009 | Tachdjian et al. |
| 2012/0201763 A1 | 8/2012 | Tachdjian et al. |
| 2013/0030059 A1 | 1/2013 | Li et al. |

FOREIGN PATENT DOCUMENTS

| | | |
|---|---|---|
| EP | 0 055 689 | 7/1982 |
| EP | 0 413 162 | 2/1991 |
| EP | 0 656 350 | 6/1995 |
| EP | 0 854 134 | 7/1998 |
| EP | 0 976 744 | 2/2000 |
| EP | 1 142 490 | 10/2001 |
| EP | 1 205 116 | 5/2002 |
| EP | 1 312 268 | 5/2003 |
| EP | 1 500 650 | 1/2005 |
| GB | 1 131 164 | 10/1968 |
| GB | 1 457 671 | 12/1976 |
| GB | 1 489 359 | 10/1977 |
| GB | 1 502 680 | 3/1978 |
| JP | 50-64235 | 5/1975 |
| JP | 61-200951 | 9/1986 |
| JP | 1-106853 | 4/1989 |
| JP | 2-108697 | 4/1990 |
| JP | 4-8264 | 1/1992 |
| JP | 8-103243 | 4/1996 |
| JP | 2000-169438 | 6/2000 |
| JP | 2000-175650 | 6/2000 |
| JP | 2002-234898 | 8/2002 |
| JP | 2003-104997 | 4/2003 |
| RU | 2162839 | 7/1996 |
| SU | 1750419 | 7/1992 |
| SU | 1811525 | 4/1993 |
| WO | WO 91/09955 | 7/1991 |
| WO | WO 91/12650 | 8/1991 |
| WO | WO 91/19735 | 12/1991 |
| WO | WO 92/00091 | 1/1992 |
| WO | WO 93/09222 | 5/1993 |
| WO | WO 93/20242 | 10/1993 |
| WO | WO 95/18617 | 7/1995 |
| WO | WO 95/31560 | 11/1995 |
| WO | WO 96/21640 | 7/1996 |
| WO | WO 96/29411 | 9/1996 |
| WO | WO 96/39154 | 12/1996 |
| WO | WO 97/00271 | 1/1997 |
| WO | WO 97/03211 | 1/1997 |
| WO | WO 98/32733 | 7/1998 |
| WO | WO 99/07235 | 2/1999 |
| WO | WO 99/26927 | 6/1999 |
| WO | WO 00/06156 | 2/2000 |
| WO | WO 00/06592 | 2/2000 |
| WO | WO 00/51970 | 9/2000 |
| WO | WO 00/63166 | 10/2000 |
| WO | WO 00/06593 | 12/2000 |
| WO | WO 01/35768 | 5/2001 |
| WO | WO 01/55123 | 8/2001 |
| WO | WO 01/77292 | 10/2001 |
| WO | WO 01/77676 | 10/2001 |
| WO | WO 01/79204 | 10/2001 |
| WO | WO 01/81311 | 11/2001 |
| WO | WO 01/97786 | 12/2001 |
| WO | WO 02/06254 | 1/2002 |
| WO | WO 02/36622 | 5/2002 |
| WO | WO 02/064139 | 8/2002 |
| WO | WO 02/064631 | 8/2002 |
| WO | WO 02/087361 | 11/2002 |
| WO | WO 03/001876 | 1/2003 |
| WO | WO 03/004992 | 1/2003 |
| WO | WO 03/013517 | 2/2003 |
| WO | WO 03/027061 | 4/2003 |
| WO | WO 03/030937 | 4/2003 |
| WO | WO 03/037332 | 5/2003 |
| WO | WO 03/043444 | 5/2003 |
| WO | WO 03/070713 | 8/2003 |

(56) References Cited

FOREIGN PATENT DOCUMENTS

| | | |
|---|---|---|
| WO | WO 03/103647 | 12/2003 |
| WO | WO 2004/000355 | 12/2003 |
| WO | WO 2004/011617 | 2/2004 |
| WO | WO 2004/026840 | 4/2004 |
| WO | WO 2004/080976 | 9/2004 |
| WO | WO 2004/081018 | 9/2004 |
| WO | WO 2004/089470 | 10/2004 |
| WO | WO 2004/092182 | 10/2004 |
| WO | WO 2004/113304 | 12/2004 |
| WO | WO 2005/015158 | 2/2005 |
| WO | WO 2005/041684 | 12/2005 |
| WO | WO 2006/084184 | 8/2006 |
| WO | WO 2006/084186 | 8/2006 |
| WO | WO 2006/084246 | 8/2006 |
| WO | WO 2006/138512 | 12/2006 |
| WO | WO 2007/124152 | 11/2007 |

OTHER PUBLICATIONS

CAS Registry No. 26693-55-0.
CAS Registry No. 561008-33-1, STN Entry Date: Aug. 5, 2003.
CAS Registry No. 556822-00-5, STN Entry Date: Jul. 29, 2003.
Clark et al., "Anticonvulsant Ativity of Some 4-Aminobenzamides," *J. Med. Chem.*, 27:779-782 (1984).
Estrela et al., Crop Protection—Tosicidade de Amidas Analogas a Piperina a Larvas de *Ascia monuste orseis* Godart (Lepidoptera: Pieridae) e *Spodoptera frugiperda* (J.E. Smith) (Lepidoptera: Noctuidae), *Neotropical Entomology*, 32(2):343-346 (2003).
Fanta et al., "Aziridines. XIII. Reactions of Cyclohexenimine Derivatives," Journal of Organic Chemistry, 30(10):3574-3575, (1965).
Merlin et al., "Mitosis Inhibition by a N-(1,1-Dimethylpropynl) Benzamide Series," *Phytochemistry*, 26(6):1567-1571 (1987).
Terada et al., "Antiallergic Substance from *Asarum sagittarioides* and Synthesis of Some Analogues," *Chem. Pharm. Bull.*, 35(6):2437-2442 (1987).
International Search Report for International Application No. PCT/US04/25459, mailed Oct. 18, 2006.
Written Opinion for International Application No. PCT/US04/25459, dated Oct. 18, 2006.
Zhao et al., "The receptors for mammalian sweet and umami taste," *Cell*, 115(3):255-266 (2003).
International Search Report for International Application No. PCT/US04/25419, dated Nov. 8, 2007.
Written Opinion for International Application No. PCT/US04/25419, dated Nov. 8, 2007.
International Search Report for International Application No. PCT/US2006/004132, dated Oct. 19, 2006.
Written Opinion for International Application No. PCT/US2006/004132, dated Oct. 19, 2006.
International Search Report for International Application No. PCT/US2007/009828, dated Jun. 20, 2008.
Written Opinion for International Application No. PCT/US2007/009828, dated Jun. 20, 2008.
Ackerman et al., Ion Channels—Basic Science and Clinical Disease, *New England Journal Med.*, 336:1575-1595 (1997).
Ackerstrom et al., Protein G: a powerful tool for binding and detection of monoclonal and polyclonal antibodies, *J. Immunol.*, 135:2589-2592 (1985).
Adams et al., Hindered dialkylamino nucleoside phosphite reagents in the synthesis of two DNA 51-mers, *J. Am. Chem. Socl.*, 105(3):661-663 (1983).
Adler et al., A Novel Family of Mammalian Taste Receptors; *Cell*, 100:693-702; 2000.
Ager et al., Commercial, Synthetic Nonnutritive Sweeteners, *Angew. Chem. Int. Ed.*, 37:1802-1817 (1998).
Ahn et al.; A General Diastereoselective Synthesis of Spiroacetals Related to Those in Ionophores via the Reaction of Lacones with Cerium (III) y-Cerioalkoxide; J. Org. Chem, 59:3142-3150 (1994).
Asai, "Making monoclonal antibodies," *Methods in Cell Biology*, 37:57-74, 1993.

Aubrecht; Expression of hyg[R] in Transgenic Mice Causes Resistance to Toxic Effects of Hygromycin B in Vivo; J. Pharmacol. Exp. Ther., 2981 (2): 992-997 (1997).
Bachmanov et al., "Positional cloning of the mouse saccharin preference (Sac) locus," *Chem Senses*, 26(7):925-933, 2001.
Bai et al., Dimerization of the Extracellular Calcium-sensing Receptor (caR) on the Cell Surface of CaR-transfected HEK293 Cells,: *J Biol. Chem.*, 273:23605-23610 (1998).
Baldwin, "Structure and function of receptors coupled to G proteins," *Curr. Opin. Cell Biol.*, 6: 180-190 (1994).
Baum, R.; Solid-phase synthesis of benodiazepines; C&EN, Jan. 18, 1993, p. 33.
Barringer, K. et al., "Blunt-end and single-strand ligations by *Escherichia coli* ligase: influence on an in vitro amplification scheme," *Gene*, 89:117-122 (1990).
Baserga et al., "Inhibition of Cell Cycle Progression by Antisense Oligodeoxynucleotides," *Annals of the N.Y. Academy of Sciences*, vol. 600, Eds. (NYAS 1992).
Batzer et al., "Enhanced evolutionary PCR using oligonucleotides with inosine at the 3'-terminus," *Nucleic Acid Res.*, 19:5081 (1991).
Beaucage, E. L., et al., "Deoxynucleoside Phosphoramidites—A New Class of Key Intermediates for Deoxypolynucleotide Synthesis," *Tetra Letter*, 22:1859-1862 (1981).
Belitz et al., "Taste Properties of Amides in Instrumental Analysis of Foods," *Academic Press, Inc.*, vol. 1:315-321, (1983).
Belousov, "Sequence-specific targeting and covalent modification of human genomic DNA," *Nucleic Acids Res.*, 25:3440-3444 (1997).
Berge et al., "Pharmaceutical Salts," *J. Pharm. Sci.*, 661:1-19 (1977).
Berridge, M. et al., "Inositol trisphosphate, a novel second messenger in cellular signal transduction," *Nature*, 312:315-321 (1984).
Biagi et al., "N[6]-Cycloalkyl-2-phenyl-3-dearza-8 azaadenines: a new class of $A_1$ adenosine receptor ligands. A comparison with the corresponding adenines and 8-azaadenines," *European Journal of Medicinal Chemistry*, 38:983-990 (2003).
Bijvoet, "Generalized glycogen storage and cardiomegaly in a knockout mouse model of Pompe disease," *Hum. Mol. Genet.*, 7:53-62 (1998).
Blommers, "Effects of the introduction of L-nucleotides into DNA. Solution structure of the heterochiral duplex d(G-C-G-(L)T-G-C-G) d(C-G-C-A-C-G-C) studied by NMR spectroscopy," *Biochemistry*, 33(25):7886-7896 (1994).
Blondelet-Rouaul et al., "Antibiotic resistance gene cassettes derived from the Ω interposon for use in *E. coli* and *Streptomyces*," *Gene*, 190(2):315-317 (1997).
Bors et al., "Antioxidant Mechanisms of Polyphenolic Caffeic Acid Oligomers, Constituents of Salvia officinalis," *Bio Res.*, 37:301-311 (2004).
Bourne et al, "The GTPase superfamily: conserved structure and molecular mechanism," *Nature*, 349(6305):117-127 (1991).
Bourne et al., "The GTPase superfamily: a conserved switch for diverse cell functions," *Nature*, 3348:125-132 (1990).
Brown et al. "Chemical synthesis and cloning of a tyrosine tRNA gene," *Methods Enzymo*, 1(68):109-151 (1979).
Buck et al., "A novel multigene family may encode odorant receptors: a molecular basis for odor recognition," *Cell*, 65(1): 175-187 (1991).
Burg et al., "Single molecule detection of RNA reporter probes by amplification with Qβ replicase," *Mol. Cell. Probes*, 10(4):257-271 (1996).
Campbell et al., "Phosphonate Ester Synthesis Using a Modified Mitsunobu Condensation," *J. Organic Chemistry*, 59:658-660 (1994).
Caruthers et al., "Chemical Synthesis and Biological Studies on Mutated Gene-control Regions," *Cold Spring Harbor Symp. Quant. Biol.*, 47:411-418 (1982).
Chandrashekar et al., "T2Rs Function as Bitter Taste Receptors," *Cell*, 100:703-711 (2000).
Chaudhari et al., "Molecular and Physiological Evidence for Gluatamate (Umami) Taste Transduction via a G Protein-Coupled Receptor," *Ann. N.Y. Acad Sci.*, 855:398-406 (1998).
Chaudhari et al., "A Metabotropic gluatamate receptor variant functions as a taste receptor," *Nat. Neurosci*, 3:113-119 (2000).

(56) References Cited

OTHER PUBLICATIONS

Chen et al., "Analogous Organic Synthesis of Small-Compound Libraries: Validation of Combinational Chemistry in Small-Molecule Synthesis," *J. Amer. Chem. Soc.*, 116:2661-2662 (1994).

Cho et al., "An Unnatural Biopolymer," *Science*, 261: 1303-1305 (1993).

Clark et al., "Synthesis and Analgesic Activity of 1, 3-Dihydro-3-(substituted Phenyl) Imidazo[4,5-bj Pyridin-2-Ones and 3-(Substituted Phenyl)-1,2,3-Triazolo[4,5-b]Pyridines," *Journal of Medicinal Chemistry*, 21(9):965-978 (1978).

Conigrave et al.; "L-amino acid sensing by the extracellular Ca2+-sensing receptor," *Proc Natl Acad Sci USA*, 97:4814-4819, 2000.

Cronet et al., "Modeling of transmembrane seven helix bundles," *Protein Eng.*, 6:59-64 (1993).

Crosignani et al., "Polymer-Supported Mukaiyama Reagent: A Useful Coupling Reagent for the Synthesis of Esters and Amides," *Organic Letters*, 6(24): 4579-4582 (2004).

Damak et al., "Detection of Sweet and Umami Taste in the Absence of Taste Receptor Tlr3," *Science*, 301(5634):850-853 (2003).

Daniel et al., "Screening for potassium channel modulators by a high through-put 86-rubidium efflux assay in a 96-well microtiter plate," *J. Pharmacal. Meth.*, 25(3):185-193 (1991).

Date et al., "Reactions of Lithiated ortho-Toluamides and Related Compounds with Vinylsilanes: Synthesis of 1-Tetralones and 1-Naphtols," *S. Chem. Pharm. Bull.*, 38(4):902-906 (1990).

DeWitt et al., "Diversomers: An Approach to Nonpeptide, Nonoligomeric Chemical Diversity," *Proc. Nat. Acad Sci.*, 90:6909-6913 (1993).

Donnelly et al., "Modeling a-helical transmembrane domains: The calculation and use of substitution tables for lipid-facing residues," *Protein Sci.*, 2:55-70 (1993).

Evangelista et al., "Synthesis and Anti-Ulcer Activity of Some New Compounds with Arylthiomethyl-Pyridine Structure," *Farmaco, Edizone Scientifica, Societa Chimica Italiana, Pavia, IT*, 43(11):901-908 (1988).

Felley-Bosco et al., "Constitutive expression of inducible nitric oxide synthase in human bronchial epithelial cells induces c-fos and stimulates the cGMP pathway," *Am. J Resp. Cell and Mol. Biol.*, 11:159-164 (1994).

Fong, "Mechanistic hypotheses for the activation of G-protein-coupled receptors," *Cell Signal*, 8:217-224 (1996).

Fodor et al., "Light-directed, spatially addressable parallel chemical synthesis," *Science*, 251:767-773 (1991).

Frank & Doring, "Simultaneous multiple peptide synthesis under continuous flow conditions on cellulose paper discs as segmental solid supports," *Tetrahedron*, 44:6031-6040 (1988).

Freeman et al., "The Reactions of Mesitoyl Nitrate and Other Hindered Acyl Nitrates with Nucleophilic Reagents," *Journal of American Chemical Society*, 770:6062-6064, 1955.

Frenkel et al., "7, 12-dimethylbenz[a]anthracene induces oxidative DNA modification in vivo," *Free Radic. Biol. Med*, 19(3):373-380 (1995).

Fuller, "Single-Locus Control of Saccharin Preference in Mice," *J. Hered.*, 65(1):33-36 (1974).

Furka et al., "General method for rapid synthesis of multicomponent peptide mixtures," *Int. J Pet. Prot. Res.*, 37:487-493 (1991).

Gasparini et al.; "Allosteric modulators of group I metabotropic glutamate receptors: novel subtype-selective ligands and therapeutic perspectives," *Curr Opin Pharmacol*, 2(1):43-9, 2002.

Gawley et al., "(R,R)-1,3 Dibenzylisoindoline: A New C2-Symmetric Secondary Amine, by Stereoselective and Regioselective a,d-Dialkylation of Isoindoline, and an Improved Procedure for the Preparation of lsoindoline," *J. Org. Chem*, 53:5381-5383 (1988).

Geysen et al., "Strategies for epitope analysis using peptide synthesis," *J. Imun. Meth.*, 102(2):259-274 (1987).

Gonzales & Tsien, "Improved indicators of cell membrane potential that use fluorescence resonance energy transfer," *Chem. Biol.*, 4:269-277 (1997).

Guatelli et al., "Isothermal, in vitro amplification of nucleic acids by a multienzyme reaction modeled after retroviral replication," *Proc. Natl. Acad Sci. USA*, 87:1874-1878 (1990).

Haase et al., "Detection of Viral Nucleic Acids by in Situ Hybridization," *Methods in Virology*, VII:189-226 (1984).

Hagihara et al., "Vinylogous polypeptides: an alternative peptide backbone," *J. Amer. Chem. Soc.*, 114:6568-6570 (1992).

Han et al., "Ligand Binding to the Amino-terminal Domain of the mGluR4 Subtype of Metabotropic Glutamate Receptor," *J. Biol. Chem.*, 274:10008-10013 (1999).

Higuchi et al., "4-Alkyl and 3, 4-Dialkyl-1,2,3,4-Tetrahydro-8-Pyridono[5,6-g]Quinolines: Potent, Nosteroidal Androgen Receptor Agonists," *Bioorganic & Medicinal Chemistry Letters*, 9:1335-1340 (1999).

Hill et al., "Polymerase recognition of synthetic oligodeoxyribonucleotides incorporating degenerate pyrimidine and purine bases," *Proc. Natl. Acad. Sci. USA*, 95:4258-4263 (1998).

Hirschmann et al., "Nonpeptidal Peptidomimetics with a β-D-Glucose Scaffolding, A Partial Somatostatin Agonist Bearing a Close Structural Relationship to a Potent, Selective Substance P Antagonist," *J. Amer. Chem. Soc.*, 114:9217-9218 (1992).

Holevinsky et al., "ATP-sensitive K+ channel opener acts as a potent cr channel inhibitor in vascular smooth muscle cells," *J Membr Biology*, 137(1):59-70 (1994).

Holzschu et al.; A molecular strategy designed for the rapid screening of gene traps based on sequence identify and gene expression pattern in adult mice; *Transgenic Res.*, 6:97-106 (1997).

Hoon et al., "Putative mammalian taste receptors: a class of taste-specific G PCRs with distinct topographic selectivity," *Cell*, 96(4):541-551 (1999).

Hoops et al., "Template directed incorporation of nucleotide mixtures using azole- nucleobase analogs," *Nucleic Acids Res.*, 25:4866-4871 (1997).

Houghten et al., "Generation and use of synthetic peptide combinattorial libraries for basic research and drug discovery," *Nature*, 354:84-86 (1991).

Huang et al., "2-{2-[3-(Pyridin-3-yloxy)phenyl]-2H-tetrazol-S-yl} pyridine: a highly potent, orally active metabotropic glutamate subtype 5 (mGlu5) receptor antagonist," *Bioorganic & Medicinal Chemistry Letters*, 14(22):5473-5476 (2004).

Huse et al., "Generation of a large combinatorial library of the immunoglobulin repertoire in a phage lambda," *Science*, 246:1275-1281 (1989).

Jasiczk et al.; Structure-Activity Relationship of Sweet Molecules: Phenylurea Derivatives; *Polish J. Chem*, 74:1259-1273 (2000).

Johnson et al., "Oxygenation of N- Cycloheptylbenzamides with Beauveria sulfurescens," *Journal of Organic Chemistry*, 57(26):7212-7216, 1992.

Jolley, "Fluorescence polarization immunoassay for the determination of therapeutic drug levels in human plasma," *Journal of Analytical Toxicology*, 5(5):236-240 (1981).

Jones, "$GABA_B$ receptors function as a heteromeric assembly of the subunits GABABRI and $GABA_BR2$," *Nature* 396:674-679 (1988).

Kaupmann et al., "GABAB-receptor subtypes assemble into functional heteromeric complexes," *Nature*, 396:683-687 (1998).

Khimiko-Farmatsevticheskii Zhurnal; vol. 23, No. 10, p. 1223-1226 (1989).

Kimmel et al., "Preparation of cDNA and the generation of cDNA libraries: overview," *Methods Enzymol*, 152:307-316 (1987).

Kinghorn et al., "Noncariogenic Intense Natural Sweeteners," *Med. Res. Rev.*, 18(5):347-360 (1998).

Kinnamon et al., "Chemosensory transduction mechanisms in taste," *Ann. Rev. Phsiol*, 54:715-31; 1992.

Kinoshita et al., "Chalcogeno Morita-Baylis-Hillman Reaction of 2-(Methylchalcogeno)phenyl Vinyl Ketones with Aldehyds, Ketones, and a-Dicarbonyl Compounds," *Eur. J. Org. Chem.*, 4852-4861 (2003).

Kitagawa et al., "Molecular genetic identification of a candidate receptor gene for sweet taste," *Biochem Biophys Res. Commun.*, 283:236-42; 2001.

Kohler & Milstein, "Derivation of specific antibody-producing tissue culture and tumor lines by cell fusion," *Eur J Immunol*, 6(7):511-519 (1976).

(56) References Cited

OTHER PUBLICATIONS

Kohler & Milstein, "Continuous cultures of fused cells secreting antibody of predefined specificity," *Nature*, 256:495-497 (1975).
Kozal et al., "Extensive polymorph isms observed in HIV-I Glade B protease gene using high-density 01 igon uc leotide arrays," *Nature Medicine*, 2(7): 753-759 (1996).
Kroll et al., "A multifunctional prokaryotic protein expression system: overproduction, affinity purification, and selective detection," *DNA Cell. Biol.*, 12(5):441-453 (1993).
Kronvall, "A surface component in group A, C, and G *Streptococci* with non-immune reactivity for immunoglobulin G," *J. Immunol.*, 111:1401-1406 (1973).
Kuner et al., "Role of Heteromer Formation in $GABA_B$ Receptor Function," *Science*, 283:74-77 (1999).
Kunishima et al., "Structural basis of glutamate recognition by a dimeric metabotropic glutamate receptor," *Nature*, 407(6807): 971-977 (2000).
Kwoh et al., "Transcription-based amplication system and detection as amplified human immunodeficiency virus type I with a bead-based sandwich hybridization format," *Proc. Natl. Acad. Sci. USA*, 86:1173-1177 (1989).
Kyte et al., "A simple method for displaying the hydropathic character of a protein," *J. Mol. Biol.*, 157:105-132 (1982).
Liang et al., "Parallel Synthesis and Screening of a Solid Phase Carbohydrate Library," *Science*, 274:1520-1522 (1996).
Landegren et al., "A Ligase-Mediated Gene Detection Technique;," *Science*, 241:1077-1080 (1988).
Li et al., "Human Receptors for Sweet and Umami Taste," *PNAS*, 997(7):4692-4696 (2002).
Li et al., "High-resolution genetic mapping of the saccharin preference locus (Sac) and the putative sweet taste receptor (TI R I) gene (Gpr70) to mouse distal Chromosome 4," *Mamm. Genome*, 12(J):13-16 (2001).
Lindemann, "Taste Reception," *Physiol. Rev.*, 76(3):719-766 (1996).
Linton et al., "Acyl Dipetides as Reversible Capase Inhibitors. Part I: Initial Lead Optimization," *Bioorganic & Medicinal Chemistry Letters*,12:979-2971 (2002).
Longo et al., "The chromosome make-up of mouse embryonic stem cells is predictive of somatic and germ cell chimaerism," *Transgenic Res.*, 6(5):321-328 (1997).
Margeta-Mitrovic, "Ligand-induced signal transduction within heterodimeric GABA(B) receptor," *Proc Natl Acad Sci USA*, 98(25): 14643-14654, 2001.
Marcus, "Culinary Applications of Flavor Enhancement in Product Development," *Slide Presentation Annual Meeting of Institute of Food Technology*, Las Vegas, Nevada, Jul. 12-16, 2004.
Mata et al., "A hexameric phosphorothioate oligonucleotide telomerase inhibitor arrests growth of Burkitts lymphoma cells in vitro and in vivo;," *Toxicol. Appl. Pharmacal*, 144(I):189-197 (1997).
Matsunami et al., "A family of candidate taste receptors in human and mouse," *Nature*, 404(6778):601-604 (2000).
Max et al., "Tas1r3, encoding a new candicate taste receptor, is allelic to the sweet responsiveness locus Sac," *Nat. Genet.* 28:58-63; 2001.
McMurry, "Isoxazole Annelation Reaction: 1-Methyl-4,4a,5,6,7,8-Hexahydronaphthalen-2(3H)-One," *Org. Syn. Coll.*, 6:781, 53:70, 1973.
Merrifield, "Solid Phase Peptide Synthesis. 1. The Synthesis of a Terrapeptide," *J Am. Chem. Soc.*, 85:2149-2154 (1963).
Milligan et al., "Current concepts in antisense drug design," *J Med. Chem.*, 36:1923-1937 (1993).
Misteli et al., "Applications of the green fluorescent protein in cell biology and biotechnology," *Nature Biotechnology*, 15(10):961-964 (1997).
Monroe et al., "Liposome immunoassay: A New Ultrasensitive Analytical Method," *Amer. Clin. Prod. Rev.*, 5:34-41 (1986).
Montmayeur et al., "A candidate taste receptor gene near a sweet taste locus," *Nature Neuroscience*, 4(5): 492-498, 2001.
Morales, "Efficient replication between non-hydrogen-bonded nucleoside shape analogs," *Nat. Struct. Biol.*, 5:950-954 (1998).

Moreadith, "Gene targeting in embryonic stem cells: the new physiology and metabolism," *J. Mol. Med*, 75:208-216 (1997).
Morini et al., "From Small Sweeteners to Sweet Proteins: Anatomy of the Binding Sites of the Human T1R2_T1R3 Receptor," *J. Med. Chem.*, 48(17):5520-5529 (Aug. 2005).
Mudgett et al., "Electroportation of embryonic stem cells for generating transgenic mice and studying in vitro differentiation," *Methods Mol. Biol.*, 48: I 67-184 (1995).
Musser et al., "Synthesis and Antiallergic Activities of 1,3-Oxazolo[4,5-h]quinolines," *J. Med. Chem.*, 28:1255-1259 (1985).
Narang et al., "Improved phosphotriester method for the synthesis of gene fragments," *Meth. Enzyrnol*, 68:90-98 (1979).
Nelson et al., "Mammalian Sweet Taste Receptors," *Cell*, 106:381-390 (2001).
Noyes et al., "Phthalimide; Organic Syntheses," *Coll.* 1:457, 2:75, 1941 and 1922.
Offermanns et al., "Ga 15 and Ga 16 couple a wide variety of receptors to phospholipase C," *J. Biol. Chern.* 270:15175-15180 (1995).
Ohtsuka et al., "An alternative approach to deoxyoligonucleotides as hybridization probes by insertion of deoxyinosine at ambiguous codon positions," *J. Biol. Chern.*, 260:2605-2608 (1985).
Okamoto et al., "Expression and Purification of the Extracellular Ligand Binding Region of Metabotropic Glutamate Receptor Subtype I," *J Biol. Chem.*, 273:13089-13096 (1998).
Oshiro et al., "Novel Cerebroprotective Agents with Central Nervous System Stimulating Activity. 1. Synthesis and Pharmacology of 1-Amino 7-hydroxyindan Derivatives," *J. Med. Chem.*, 34:2004-2013 (1991).
Ottavi et al., "An improved method to obtain a single recombinant vasoactive intestinal peptide (VIP) analog," *Biochimie*, 80(4):289-293 (1998).
Parmentier et al., "A model for the functioning of family 3 GPCRs," *Trends in Pharmacological Sciences*, 23(6):268-274, 2002.
Patonay et al., "Chemo- and Diastereoselectivity in the Dimethyldioxirane Oxidation of 2,3-Dihydro-4H-1-benzothiopyran-4-ones and 4H-1-Benzothiopyran-4-ones. Unusual Reactivity of 4H-1-Benzothiopyran-4-one 1-Oxides," *J. Org. Chem.* 66:2275-2280 (2001).
Peitsch et al., "Automated modeling of the transmembrane region of G-protein coupled receptor by Swiss model," *Receptors Channels*, 4(3): 161-164 (1996).
Pernak et al., "Activity of new auaternary ammonium compounds on strains of bacteria and fungi. part 5: Synthesis of 3-Methyl-N-Alkylthiomethylpyridine-, 1-Methyl-3-N-Alkylthiomethylimidazole- and 1-Ethyl-3-N-Alkylthiolimid Azoline Chlorides," *Pharmazie, Die, Govi Verlag*, Eschborn, DE, 38(11):752-754 (1983).
Pin et al., "Evolution, structure, and activation mechanism of family 3/C G-protein-coupled receptors," *Pharmacol Ther.*, 98(3):325-354 (2003).
Pitcher et al., "G protein-coupled receptor kinases," *Annu. Rev. Biochem.*, 67:653-692 (1988).
Polyak et al., "Introduction of spacer peptides N-terminal to a cleavage recognition motif in recombinant fusion proteins can improve site-specific cleavage," *Protein Eng.*, 10:615-6 19 (1997).
Roberts et al.; Generation of an antibody with enhanced affinity and specificity for its antigen by protein engineering; Nature, 328(6132):731-734 (1987).
Romano et al., "Metabotropic Glutamate Receptor 5 is a Disulfide-linked Dimer," *J. Biol. Chem*; 271:28612-28616 (1996).
Rose et al., "Consensus-degenerate hybrid oligonucleotide primers for amplification of distantly related sequences," *Nucleic Acids Res.* 26: 1628-1635 (1998).
Rossolini et al.; Use of deoxyinosine-containing primers vs. degenerate primers for polymerase chain reaction based on ambiguous sequence information, *Mol. Cell. Probes*; 8:91-98 (1994).
Sainz et al., "Identification of a novel member of the T1R family of putative taste receptors," *J. Neurochem.*, 77:896-903; 2001.
Samstag et al., "Synthesis and properties of new antisense oligodeoxynucleotides containing benzylphosphonate linkages," *Antisense Nucleic Acid Drug Dev.*, 6(3):153-1 56 (1996).

(56) References Cited

OTHER PUBLICATIONS

Sarges et al., "5,8-Diubstituted 1-Aminotetralins. A Class of Compounds with a Novel Profile of Central Nervous System Activity," *Journal of Medicinal Chemistry*, 16(9):1003-1011 (1973).

Schiffman et al., "Selective Inhibition of Sweetness by the Sodium Salt of ±2-(4-Methoxyphenoxy) Propanoic Acid," *Chem Senses*, 24:439-447 (1999).

Schneider et al., "Functional purification of a bacterial ATP-binding cassette transporter protein (MaIK) from the cytoplasmic fraction of an overproducing strain," *Protein Expr. Purif*, 6(1):10-14 (1995).

Sheldon et al., "Matrix DNA Hybridization," *Clinical Chemistry*, 39(4):718-719 (1993).

Shoeb et al., "Studies in Possible Oral Hypoglycaemic Agent," *Indian Journal of Chemistry*, 5(4):142-144, 1967.

Sibi et al., "Enantioselective Hydrogen Atom Transfer Reactions: Synthesis of N-Acyl-alpha-Amino Acid Esters This work was supported by the National Institutes of Health (NIH-GM-54656)," *Angew Chem Int Ed Engl.*, 40(7):1293-1296, 2001.

Singer et al., "Optimization of in situ Hybridization Using Isotopic and Non-Isotopic Detection Methods," *Biotechniques*, 4:230-250 (1986).

Singh et al., "Primer premier: program for design of degenerate primers from a protein sequence," *Biotechniques*, 24(2):318-319 (1998).

Skupinska et al., "Concise Preparation of Amino-5,6,7,8-tetrahydroquinolines and Amino-5,6,7,8-tetrahydroisoquinolines via Catalytic Hydrogenation of Acetamidoquinolines and Acetamidoisoquinolines," *J. Org. Chem.*, 67:7890-7893 (2002).

Skupinska et al., "Enzymatic Resolution of Bicyclic 1-Heteroarylamines Using *Candida antarcticai* Lipase B," *J. Org. Chem.*, 68(9):3546-3551 (2003).

Smith et al., "GRAS Flavoring Substances 21," *Food Technology*, 57(5):46-59 (2003).

Smith et al., "Detection of *Mycrobacterium tuberculosis* directly from sputum by using a prototype automated Q-beta replicase assay," *J. Clin. Microbiol.*, 35:1477-1491 (1997).

Sooknanan and Malek, "NASBA: A detection and amplification system uniquely suited fro RNA," *Nature Biotechnology*, 13:563-564 (1995).

Spatola, "Peptide Backbone Modifications: A Structure-Activity Analysis of Peptides Containing Amide Bond Surrogates," *Chemistry and Biochemistry of Amino Acids, Peptides and Proteins*, 7:267-357, Marcell Dekker, NY (1983).

Speca et al., "Functional identification of a goldfish odorant receptor," *Neuron*, 23:487-498 (1999).

Stalker et al., "Asymmetric Synthesis of Two new Conformationally Constrained Lysine Derivatives," *Tetrahedron*, 58:4837-4849 (2002).

Stewart et al., "New perspectives in a gustatory physiology: transduction, development, and plasticity," *Am. J Physiol.*, 272:C1-C26 (1997).

Strauss-Soukup et al., "Effects of neutralization pattern and stereochemistry on DNA bending by methylphosphonate substitutions," *Biochemistry*, 36(29):8692-8698 (1997).

Thate, "The Relationship Between Constitution and Taste Among Some Derivatives of Urea," *Recueil Des Travaux Cliniques Des Pays-Bas et da La Belgique*, 48:116-120 (1929).

Tojo et al., "Establishment of a novel embryonic stem cell line by a modified procedure," *Cytotechnology*, 19:161-165 (1995).

Turnbull et al., "Disposition and Metabolism of 4-Methyl-2-(4-phenylbenzyl)-2-oxazoline-4-methanol in the Rat and Dog," *Journal of Medicinal Chemistry*, 17(1):45-48 (1974).

Vaughan et al., "Human antibodies with sub-nanomolar affinities isolated from a large non-immunized phage display library," *Nature Biotechnology*, 14(3):309-314 (1996).

Vestergarrd-Bogind et al., "Single-file diffusion through the $Ca^{2+}$-activated $K^+$ channel of human red cells," *J Membrane Biol.*, 88:67-75 (1985).

Ward et al., "Binding activities of a repertoire of single immunoglobulin variable domains secreted from *Escherichia coli*," *Nature*, 341(6242):544-546 (1989).

White et al., "Heterodimerization is required for the formation of a functional $GABA_B$ receptor," *Nature*, 396(6712):679-682 (1998).

Wilkie et al., "Characterization of G-protein a subunits in the $G_q$ class: Expression in murine tissues and in stromal and hematopoietic cell lines," *Proc. Nat'l Acad. Sci.*, 88:10049-10053 (1991).

Williams et al., "Dissection of the extracellular human interferon y receptor a-chain into two immunoglbulin-like domains. Production in an *Escherichia coli* thioredoxin gene fusion expression system and recognition by neutralizing antibodies," *Biochemistry*, 34(5): 1787-1797 (1995).

Wong et al., "Transduction of bitter and sweet taste by gustducin," *Nature*, 381(6585):796-800, 1996.

Wu et al., "The ligation amplification reaction (LAR)—amplification of specific DNA sequences using sequential rounds of template-depdendent ligation," *Genomics*, 4(4):560-569 (1989).

COMESTIBLE COMPOSITIONS COMPRISING HIGH POTENCY SAVORY FLAVORANTS, AND PROCESSES FOR PRODUCING THEM

RELATED APPLICATIONS

This application is a continuation of U.S. patent application Ser. No. 13/406,002 filed on Feb. 27, 2012, which is a continuation of U.S. patent application Ser. No. 12/297,986, now U.S. Pat. No. 8,148,536, which is a U.S. national stage application of International Application No. PCT/US2007/009828, filed on Apr. 19, 2007, which, in turn, claims the priority of U.S. provisional patent application Ser. No. 60/793,844 filed on Apr. 21, 2006, and also claims the priority of U.S. provisional patent application Ser. No. 60/847,632, filed Sep. 27, 2006, the entire disclosures of which are hereby incorporated herein by this reference.

FIELD OF THE INVENTION

The inventions disclosed herein relate to the use of certain high potency savory ("umami") taste modifiers, as savory flavoring agents and/or enhancers of monosodium glutamate, for the preparation of foods, beverages, and other comestible compositions, and to processes for preparing food flavorant concentrate compositions for use in the preparation of comestible food and drink. The inventions also relate to processes for preparing some of the savory tastant compounds disclosed herein.

BACKGROUND OF THE INVENTION

For centuries, various natural and unnatural compositions and/or compounds have been added to comestible (edible) foods and beverages to improve their taste. Although it has long been known that there are only a few basic types of "tastes," the biological and biochemical basis of taste perception was poorly understood, and most taste improving or taste modifying agents have been discovered largely by simple trial and error processes.

For example, one of the five known basic tastes is the "savory" or "umami" flavor of monosodium glutamate ("MSG"), synthetic or natural versions of which are often added to foods, often at concentrations on the order of about 0.05 to about 0.5% by weight. Alternatively, MSG is present in and can be added in the form of certain food additives, such as autolyzed yeast extracts ("AYE") or hydrolyzed vegetable proteins ("HVP"), which are often added to comestible foods and drinks at a concentration from about 0.1 to about 2% by weight. MSG is however known to produce adverse reactions in some people, and MSG comprises significant amounts of undesirable sodium, but very little progress has been made in identifying artificial substitutes for MSG.

It is also known that a few naturally occurring materials can increase or enhance (multiply) the effectiveness of MSG as a savory flavoring agent, so that less MSG is needed for a given flavoring application. For example, the naturally occurring nucleotide compounds inosine monophosphate (IMP) and guanosine monophosphate (GMP) are known to have a multiplier ("enhancer") effect on the savory taste of MSG. IMP and GMP can also be present in AYE or HVP food additives, but are difficult and expensive to isolate and purify from natural sources, or synthesize, and hence have limited practical applications. High potency compounds that would substitute for the savory flavor of $MSG_5$ or enhance the effectiveness of any MSG present, so that less MSG could be employed in food compositions, could be of very high value.

In recent years substantial progress has been made in biotechnology in general, and in better understanding the underlying biological and biochemical phenomena of taste perception. For example, taste receptor proteins have been recently identified in mammals which are involved in taste perception. Particularly, two different families of G protein coupled receptors believed to be involved in taste perception, T2Rs and T1Rs, have been identified. (See, e.g., Nelson, et al., *Cell* (2001) 106(3):381-390; Adler, et al., *Cell* (2000) 100(6):693-702; Chandrashekar, et al., *Cell* (2000) 100:703-711; Matsunami, et al., *Number* (2000) 404:601-604; Li, et al., *Proc. Natl. Acad. Sci. USA* (2002) 99:4962-4966; Montmayeur, et al., *Nature Neuroscience* (2001) 4(S):492-498: U.S. Pat. No. 6,462,148; and PCT publications WO 02/06254, WO 00/63166 art, WO 02/064631, and WO 03/001876, and U.S. Patent Publication No. US 2003/0232407 A1).

Whereas the T2R family includes a family of over 25 genes that are involved in bitter taste perception, the T1R5 only includes three members, T1R1, T1R2, and T1R3. (See Li, et al., *Proc. Natl. Acad. Sci. USA* (2002) 99:4962-4966.) Recently it was disclosed in WO 02/064631 and/or WO 03/001876 that certain T1R members, when co-expressed in suitable mammalian cell lines, assemble to form functional taste receptors. Particularly it was found that co-expression of T1R1 and T1R3 in a suitable host cell results in a functional T1R1/T1R3 savory ("umami") taste receptor that responds to savory taste stimuli, including MSG.

More recently, certain publications disclosed the discovery and use of certain amide compounds as very high potency umami tastants and/or synergistic enhancers of the "Umami" taste of MSG.

Nevertheless, the current applicants have unexpectedly discovered that, like many other known artificial flavorants, at higher concentrations some of the new high potency compounds can have flavor differences as compared to MSG, such as mouth-watering side-tastes, a flavor "lingering" as compared to MSG, or in some cases a perception of tongue tingling or numbness. While such side tastes can actually be desirable in some food formulations (e.g., hot and spicy sauces), minimization or masking of any side tastes can, in other applications, be desirable. Such side tastes can become noticeable if the high potency savory compounds are not well dispersed within the comestible compositions. Moreover, while the solubility of the newly discovered high potency compounds is often good in aqueous and polar organic media, solubility can be limited in hydrophobic/lipophilic materials such as fats and oils, which are a natural component of many foods. Accordingly, effective formulation of the new high potency savory flavor compounds to achieve optimal human perception of the savory/Umami flavors, while minimizing side tastes, can sometimes be difficult.

However, when a new chemical entity such as new high potency savory compounds ave been discovered that is safe for human use, the original laboratory process by which the compound was first made may not be optimal for the production of commercial quantities. No large scale synthetic procedures for the preparation of the high potency savory tastant compounds N-(2,4-dimethoxybenzyl)-N'-[2-(pyridin-2-yl)ethyl]oxalamide and 2-H-benzo[3,4-d]1,3-dioxolan-5-yl-N-(propylbutyl)-carboxamide have been disclosed in the prior art, and as such, investigation of suitable processes for large scale preparations of the compounds recited above was undertaken.

To this end, the preparation of savory modulating and/or enhancing formulations that can provide a perceptible savory flavor and/or enhance the flavor of MSG, but avoid and/or overcome issues related to side tastes and solubility and can be used in a variety of applications is needed. The compositions and savory flavorant concentrate compositions and methods disclosed herein meet these unexpected complications and complexities.

SUMMARY OF THE INVENTION

The inventions described herein have many aspects, some of which relate to processes for formulating comestible compositions comprising high potency compounds having a savory "Umami" flavor or that can serve as enhancers for the savory "Umami flavor" of monosodium glutamate, and to the comestible products themselves, or to certain aspects of improved methods for making or purifying the compounds themselves.

The foregoing discussion merely summarizes certain aspects of the inventions and is not intended, nor should it be construed, as limiting the invention in any way.

DETAILED DESCRIPTION OF THE INVENTION

The inventions described herein can be understood more readily by reference to the following detailed description of various aspects of the invention and the Examples included therein and to the chemical drawings and Tables and their previous and following description. Before the present compounds, compositions, and/or methods are disclosed and described, it is to be understood that unless otherwise specifically indicated by the claims, the inventions are not limited to specific foods or food preparation methods, specific comestibles carriers or formulations, or to particular modes of formulating the compounds of the invention into comestible products or compositions intended for oral administration, because as one of ordinary skill in relevant arts is well aware, such things can of course, vary. It is also to be understood that the terminology used herein is for the purpose of describing particular embodiments only and is not intended to be limiting.

Definitions

A "comestibly, biologically or medicinally acceptable carrier or excipient" is a solid or liquid medium and/or composition that is used to prepare a desired dosage form of the inventive compounds, in order to administer the inventive compounds in a dispersed/diluted form, so that the biological effectiveness of the inventive compounds are maximized. A comestibly, biologically or medicinally acceptable carrier includes many common food ingredients, such as water at neutral, acidic, or basic pH, fruit or vegetable juices, vinegar, marinades, beer, wine, natural water/fat emulsions such as milk or condensed milk, edible oils and shortenings, fatty acids, low molecular weight oligomers of propylene glycol, glyceryl esters of fatty acids, and dispersions or emulsions of such hydrophobic substances in aqueous media, salts such as sodium chloride, wheat flours, solvents such as ethanol, solid edible diluents such as vegetable powders or flours, or other liquid vehicles; dispersion or suspension aids; surface active agents; isotonic agents; thickening or emulsifying agents, preservatives; solid binders; lubricants and the like.

A "flavor" herein refers to the perception of taste and/or smell in a subject, which include sweet, sour, salty, bitter, umami, and others. The subject may be a human or an animal.

A "flavoring agent" herein refers to a compound or a biologically acceptable salt thereof that induces a flavor or taste in a animal or a human.

A "flavor modifier" herein refers to a compound or biologically acceptable salt thereof that modulates, including enhancing or potentiating, and inducing, the tastes and/or smell of a natural or synthetic flavoring agent in a animal or a human.

A "flavor enhancer" herein refers to a compound or biologically acceptable salt thereof that enhances or "multiplies" the tastes or smell of a natural or synthetic flavoring agent.

"Savory flavor" herein refers to the savory, "mouth-watering," "umami" taste sensation typically induced by MSG (monosodium glutamate) in a animal or a human.

"Savory flavoring agent," "savory compound," or "savory receptor activating compound" herein refers to a compound or biologically acceptable salt thereof that elicits a detectable savory flavor in a subject, e.g., MSG (monosodium glutamate) or a compound that activates a T1R1/T1R3 receptor in vitro. The subject may be a human or an animal.

A "savory flavor modifier" herein refers to a compound or biologically acceptable salt thereof that modulates, including enhancing or potentiating, inducing, and blocking, the savory taste of a natural or synthetic savory flavoring agents, e.g., monosodium glutamate (MSG) in a animal or a human.

A "savory flavor enhancer" herein refers to a compound or biologically acceptable salt thereof that enhances, potentiates, or "multiplies" the savory taste of a natural or synthetic savory flavoring agents, e.g., monosodium glutamate (MSG) in a animal or a human.

An "umami receptor activating compound" herein refers to a compound that activates an umami receptor, such as a T1R1/T1 R3 receptor.

An "umami receptor modulating compound" herein refers to a compound that modulates (activates, enhances or blocks) an umami receptor.

An "umami receptor enhancing compound" herein refers to a compound that enhances or potentiates the effect of a natural or synthetic umami receptor activating compound, e.g., monosodium glutamate (MSG).

A "savory flavoring agent amount" herein refers to an amount of a compound that is sufficient to induce savory taste in a comestible or medicinal product or composition, or a precursor thereof. A fairly broad range of a savory flavoring agent amount can be from about 0.001 ppm to 100 ppm, or a narrow range from about 0.1 ppm to about 10 ppm. Alternative ranges of savory flavoring agent amounts can be from about 0.01 ppm to about 30 ppm, from about 0.05 ppm to about 15 ppm, from about 0.1 ppm to about 5 ppm, or from about 0.1 ppm to about 3 ppm.

A "savory flavor modulating amount" herein refers to an amount of a compound of Formula (I) that is sufficient to alter (either increase or decrease) savory taste in a comestible or medicinal product or composition, or a precursor thereof, sufficiently to be perceived by a human subject. A fairly broad range of a savory flavor modulating amount can be from about 0.001 ppm to 100 ppm, or a narrow range from about 0.1 ppm to about 10 ppm. Alternative ranges of savory flavor modulating amounts can be from about 0.01 ppm to about 30 ppm, from about 0.05 ppm to about 15 ppm, from about 0.1 ppm to about 5 ppm, or from about 0.1 ppm to about 3 ppm.

A "savory flavor enhancing amount" herein refers to an amount of a compound that is sufficient to enhance the taste of a natural or synthetic flavoring agents, e.g., mono sodium glutamate (MSG) in a comestible or medicinal product or composition. A fairly broad range of a savory flavor enhancing amount can be from about 0.001 ppm to 100 ppm, or a narrow range from about 0.1 ppm to about 10 ppm. Alternative ranges of savory flavor enhancing amounts can be from about 0.01 ppm to about 30 ppm, from about 0.05 ppm to about 15 ppm, from about 0.1 ppm to about 5 ppm, or from about 0.1 ppm to about 3 ppm.

An "umami receptor modulating amount" herein refers to an amount of a compound that is sufficient to modulate (activate, enhance or block) an umami receptor. A preferable range of an umami receptor modulating amount is 1 pM to 100 mM and most preferably 1 nM to 100 µM and most preferably 1 nM to 30 µM. A fairly broad range of an umami flavor enhancing amount can be from about 0.001 ppm to 100 ppm, or a narrow range from about 0.1 ppm to about 10 ppm. Alternative ranges of umami flavor enhancing amounts can be from about 0.01 ppm to about 30 ppm, from about 0.05 ppm to about 15 ppm, from about 0.1 ppm to about 5 ppm, or from about 0.1 ppm to about 3 ppm.

A "T1R1/T1R3 receptor modulating or activating amount" is an amount of compound that is sufficient to modulate or activate a T1R1/T1R3 receptor. These amounts are preferably the same as the umami receptor modulating amounts.

An "umami receptor" is a taste receptor that can be modulated by a savory compound. Preferably an umami receptor is a G protein coupled receptor, and more preferably the umami receptor is a T1R1/T1R3 receptor.

Compounds of the inventions described herein modulate an umami receptor and preferably are agonists of the T1R1/T1R3 receptor. An agonist of this receptor has the effect of activating a G protein signaling cascade. In many cases, this agonist effect of the compound on the receptor also produces a perceived savory flavor in a taste test. It is desirable, therefore, that such inventive compounds serve as a replacement for MSG, which is not tolerated by some in, for example, comestible products.

In addition, this agonist effect also is responsible for the synergistic savory taste effect, which occurs when a compound of the invention is combined with another savory flavoring agent such as MSG. The nucleotides, IMP or GMP, are conventionally added to MSG, to intensify the savory flavor of MSG, so that relatively less MSG is needed to provide the same savory flavor in comparison to MSG alone. Therefore, it is desirable that combining compounds of the inventions with another savory flavoring agent such as MSG into a comestible composition or formulation advantageously eliminates the need to add expensive nucleotides, such as IMP, as a flavor enhancer, while concomitantly reducing or eliminating the amount of a savory compound such as MSG needed to provide the same savory flavor in comparison to the savory compound or MSG alone.

A "synergistic effect" relates to the enhanced savory flavor of a combination of savory compounds in comparison to the sum of the taste effects or flavor associated effects associated with each individual compound. In the case of savory enhancer compounds, a synergistic effect on the effectiveness of MSG may be indicated for a compound of Formula (I) having an EC50 ratio (defined hereinbelow) of 2.0 or more, or preferably 5.0 or more, or 10.0 or more, or 15.0 or more.

"Homogenization," as the term is used herein, refers to any process for altering particle or droplet size (e.g., reducing size and/or creating size uniformity) in a fluid under conditions of pressure, shear, and/or stress. The term "homogenization" is intended to include the many and varied homogenization processes that involve the use of ultrasonic, pressure, and/or mechanical forces to homogenize a fluid. Examples of such homogenization techniques include, but are not limited to, two-stage homogenization, high-pressure homogenization (also known as micronization), very high pressure homogenization (VPH), rotator-stator homogenization, blade homogenization, high shear mixers, sonication, high shear impellers, milling, and the like.

When the compounds described here include one or more chiral centers, the stereochemistry of such chiral centers can independently be in the R or S configuration, or a mixture of the two. The chiral centers can be further designated as R or S or R,S or d,D, l,L or d,l, D,L. Correspondingly, the amide compounds of the invention, if they can be present in optically active form, can actually be present in the form of a racemic mixture of enantiomers, or in the form of either of the separate enantiomers in substantially isolated and purified form, or as a mixture comprising any relative proportions of the enantiomers.

As used herein, "hydrocarbon residue" refers to a chemical sub-group within a larger chemical compound which has only carbon and hydrogen atoms. The hydrocarbon residue may be aliphatic or aromatic, straight-chain, cyclic, branched, saturated or unsaturated. The hydrocarbon residue, when so stated however, may contain or be substituted with heteroatoms such as O, S or N, or the halogens (fluorine, chlorine, bromine, and iodine), or substituent groups containing heteroatoms (OH, $NH_2$, $NO_2$, $SO_3H$, and the like) over and above the carbon and hydrogen atoms of the substituent residue. Thus, when specifically noted as containing such heteroatoms, or designated as "substituted," the hydrocarbon residue may also contain carbonyl groups, amino groups, hydroxyl groups and the like, or contain heteroatoms inserted into the "backbone" of the hydrocarbon residue.

As used herein, "inorganic residue" refers to a residue that does not contain carbon, but contains at least some heteroatoms, including O, N, S, one or more halogens, or alkali metal or alkaline earth metal ions. Examples include, but are not limited to H, Na+, Ca++ and K+, halo, hydroxy, $NO_2$ or $NH_2$.

As used herein, the term "alkyl," "alkenyl" and "alkynyl" include straight- and branched-chain and cyclic monovalent substituents that respectively are saturated, unsaturated with at least one double bond, and unsaturated with at least one triple bond.

"Alkyl" refers to a hydrocarbon group that can be conceptually formed from an alkane by removing hydrogen from the structure of a hydrocarbon compound having straight or branched carbon chains, and replacing the hydrogen atom with another atom or substituent group. In some embodiments of the invention, the alkyl groups are "C1 to C6 alkyl" such as methyl, ethyl, propyl, isopropyl, n-butyl, iso-butyl, sec-butyl, tert-butyl, amyl, tert-amyl, hexyl and the like. In some embodiments of the invention "C1 to C4 alkyl" groups (alternatively termed "lower alkyl" groups are methyl, ethyl, propyl, iso-butyl, sec-butyl t-butyl, and iso-propyl. Some of the preferred alkyl groups of the invention have three or more carbon atoms preferably 3 to 16 carbon atoms, 4 to 14 carbon atoms, or 6 to 12 carbon atoms.

Preferred alkenyl groups are "C2 to C7 alkenyl" such as vinyl, allyl, 2-butenyl, 3-butenyl, 2-pentenyl, 3-pentenyl, 4-pentenyl, 2-hexenyl, 3-hexenyl, 4-hexenyl, 5-hexenyl, 2-heptenyl, 3-heptenyl, 4-heptenyl, 5-heptenyl, 6-heptenyl, as well as dienes and trienes of straight and branched chains.

Preferred alkynyl groups are "C2 to C7 alkynyl" such as ethynyl, propynyl, 2-butynyl, 2-pentynyl, 3-pentynyl, 2-hexynyl, 3-hexynyl, 4-hexynyl, 2-heptynyl, 3-heptynyl, 4-heptynyl, 5-heptynyl as well as di- and tri-ynes of straight and branched chains.

Hydrocarbon residues may be optionally substituted. Two of said optional substituents on adjacent positions can be joined to form a fused, optionally substituted aromatic or nonaromatic, saturated or unsaturated ring which contains 3-8 members. Optional substituents are generally hydrocarbon residues that may contain one or more heteroatoms or an inorganic residue such as H, $Na^+$, $Ca^{2+}$ or $K^+$.

The terms "substituted alkyl," "substituted alkenyl," "substituted alkynyl," and "substituted alkylene" denote that the alkyl, alkenyl, alkynyl and alkylene groups are substituted by one or more, and preferably one or two substituents, preferably halogen, hydroxy, C1 to C7 alkoxy, alkoxy-alkyl, oxo, C3 to C7 cycloalkyl, naphthyl, amino, (monosubstituted) amino, (disubstituted)amino, guanidino, heterocycle, substituted heterocycle, imidazolyl, indolyl, pyrrolidinyl, C1 to C7 acyl, C1 to C7 acyloxy, nitro, carboxy, carbamoyl, carboxamide, N—(C1 to C6 alkyl)carboxamide, N,N-di(C1 to C6 alkyl)carboxamide, cyano, methylsulfonylamino, thiol, C1 to C4 alkylthio or C1 to C4 alkylsulfonyl groups. The substituted alkyl groups may be substituted once or more, and preferably once or twice, with the same or with different substituents. In many embodiments of the invention, a preferred group of substituent groups include hydroxy, fluoro, chloro, $NH_2$, $NHCH_3$, $N(CH_3)_2$, $CO_2CH_3$, SEt, $SCH_3$, methyl, ethyl, isopropyl, vinyl, trifluoromethyl, methoxy, ethoxy, isopropoxy, and trifluoromethoxy groups. In many embodiments of the invention that comprise the above lists of substituent groups, an even more preferred group of substituent groups include hydroxy, SEt, $SCH_3$, methyl, ethyl, isopropyl, methoxy, and ethoxy groups.

Examples of the above substituted alkyl groups include the 2-oxo-prop-1-yl, 3-oxo-but-1-yl, cyanomethyl, nitromethyl, chloromethyl, hydroxymethyl, tetrahydropyranyloxymethyl, trityloxymethyl, propionyloxymethyl, aminomethyl, carboxymethyl, allyloxycarbonylmethyl, allyloxycarbonylaminomethyl, methoxymethyl, ethoxymethyl, t-butoxymethyl, acetoxymethyl, chloromethyl, trifluoromethyl, 6-hydroxyhexyl, 2,4-dichloro(n-butyl), 2-aminopropyl, 1-chloroethyl, 2-chloroethyl, 1-bromoethyl, 2-chloroethyl, 1-fluoroethyl, 2-fluoroethyl, 1-iodoethyl, 2-iodoethyl, 1-chloropropyl, 2-chloropropyl, 3-chloropropyl, 1-bromopropyl, 2-bromopropyl, 3-bromopropyl, 1-fluoropropyl, 2-fluoropropyl, 3-fluoropropyl, 2-aminoethyl, 1-aminoethyl, N-benzoyl-2-aminoethyl, N-acetyl-2-aminoethyl, N-benzoyl-1-aminoethyl, N-acetyl-1-aminoethyl and the like.

Examples of the above substituted alkenyl groups include styrenyl, 3-chloro-propen-1-yl, 3-chloro-buten-1-yl, 3-methoxy-propen-2-yl, 3-phenyl-buten-2-yl, 1-cyano-buten-3-yl and the like. The geometrical isomerism is not critical, and all geometrical isomers for a given substituted alkenyl can be used.

Examples of the above substituted alkynyl groups include phenylacetylen-1-yl, 1-phenyl-2-propyn-1-yl and the like.

The term "oxo" denotes a carbon atom bonded to two additional carbon atoms substituted with an oxygen atom doubly bonded to the carbon atom, thereby forming a ketone moiety.

"Alkoxy" refers to an OR group, wherein R is an alkyl or substituted alkyl. "Alkoxy-alkyl" refers to an alkyl group containing an alkoxy.

Preferred alkoxy groups are "C1 to C7 alkoxy" such as methoxy, ethoxy, n-propoxy, isopropoxy, n-butoxy, t-butoxy and like groups. The term "C1 to C7 substituted alkoxy" means the alkyl portion of the alkoxy can be substituted in the same manner as in relation to C1 to C6 substituted alkyl. Similarly, the term "C1 to C7 phenylalkoxy" as used herein means "C1 to C7 alkoxy" bonded to a phenyl radical.

"Acyloxy" refers to an OR group where R is an acyl group. Preferred acyloxy groups are "C1 to C7 acyloxy" such as formyloxy, acetoxy, propionyloxy, butyryloxy, pivaloyloxy, pentanoyloxy, hexanoyloxy, heptanoyloxy and the like.

As used herein, "acyl" encompasses the definitions of alkyl, alkenyl, alkynyl and the related hetero-forms which are coupled to an additional residue through a carbonyl group. Preferred acyl groups are "C1 to C7 acyl" such as formyl, acetyl, propionyl, butyryl, pentanoyl, pivaloyl, hexanoyl, heptanoyl, benzoyl and the like. More preferred acyl groups are acetyl and benzoyl.

Cycloalkyl residues are hydrocarbon groups within a molecule that comprise at least one ring having 3 to 8 carbon atoms linked into a ring. Examples of such cyclalkyl residues include cyclopropyl, cyclobutyl, cyclopentyl, cyclohexyl, cycloheptyl, cyclooctyl rings, and saturated bicyclic or fused polycyclic cycloalkanes such as decalin groups, norborayl groups, and the like. Preferred cycloalkyl groups include "C3 to C7 cycloalkyl" such as cyclopropyl, cyclobutyl, cyclopentyl, cyclohexyl or cycloheptyl rings. Similarly, the term "C5 to C7 cycloalkyl" includes the cyclopentyl, cyclohexyl or cycloheptyl rings.

"Substituted cycloalkyl" indicates the above cycloalkyl rings are substituted preferably by one or two halogen, hydroxy, C1 to C4 alkylthio, C1 to C4 alkylsulfoxide, C1 to C4 alkylsulfonyl, C1 to C4 substituted alkylthio, C1 to C4 substituted alkylsulfoxide, C1 to C4 substituted alkylsulfonyl, C1 to C6 alkyl, C1 to C7 alkoxy, C1 to C6 substituted alkyl, C1 to C7 alkoxy-alkyl, oxo(monosubstituted)amino, (disubstituted)amino, trifluoromethyl, carboxy, phenyl, substituted phenyl, phenylthio, phenylsulfoxide, phenylsulfonyl, amino. In many embodiments of substituted cycloalkyl groups, the substituted cycloalkyl group will have 1, 2, 3, or 4 substituent groups independently selected from hydroxy, fluoro, chloro, $NH_2$, $NHCH_3$, $N(CH_3)_2$, $CO_2CH_3$, SEt, $SCH_3$, methyl, ethyl, isopropyl, vinyl, trifluoromethyl, methoxy, ethoxy, isopropoxy, and trifluoromethoxy groups.

The term "cycloalkylene" means a cycloalkyl, as defined above, where the cycloalkyl radical is bonded at two positions connecting together two separate additional groups. Similarly, the term "substituted cycloalkylene" means a cycloalkylene where the cycloalkyl radical is bonded at two positions connecting together two separate additional groups and further bearing at least one additional substituent.

The term "cycloalkenyl" indicates preferably a 1,2, or 3-cyclopentenyl ring, a 1,2,3 or 4-cyclohexenyl ring or a 1,2,3,4 or 5-cycloheptenyl ring, while the term "substituted cycloalkenyl" denotes the above cycloalkenyl rings substituted with a substituent, preferably by a C1 to C6 alkyl, halogen, hydroxy, C1 to C7 alkoxy, alkoxy-alkyl, trifluoromethyl, carboxy, alkoxycarbonyl oxo, (monosubstituted) amino, (disubstituted)amino, phenyl, substituted phenyl, amino, or protected amino.

The term "heterocycle" or "heterocyclic ring" denotes optionally substituted 3 to 8-membered rings having one or more carbon atoms connected in a ring that also have 1 to 5 heteroatoms, such as oxygen, sulfur and/or nitrogen inserted into the ring. These 3 to 8-membered rings may be saturated, unsaturated or partially unsaturated, but are preferably saturated. An "amino-substituted heterocyclic ring" means any one of the above-described heterocyclic rings is substituted with at least one amino group. Preferred heterocyclic rings include furanyl, thiofuranyl, piperidyl, pyridyl, morpholino, aziridinyl, piperidinyl, piperazinyl, tetrahydrofurano, pyrrolo, and tetrahydrothiophen-yl.

The term "substituted heterocycle" or "substituted heterocyclic ring" means the above-described heterocyclic ring is substituted with, for example, one or more, and preferably one or two, substituents which are the same or different which substituents preferably can be halogen, hydroxy, thio, alkylthio, cyano, nitro, C1 to C6 alkyl, C1 to C7 alkoxy, C1 to C7 substituted alkoxy, alkoxy-alkyl, C1 to C7 acyl, C1 to C7 acyloxy, carboxy, alkoxycarbonyl, carboxymethyl, hydroxymethyl, alkoxy-alkyl amino, monosubstituted) amino, (disubstituted)amino carboxamide, N—(C1 to C6 alkyl)carboxamide, N,N-di(C1 to C6 alkyl)carboxamide, trifluoromethyl, N—((C1 to C6 alkyl)sulfonyl)amino, N-(phenylsulfonyl)amino groups, or substituted with a fused ring, such as benzo-ring. In many embodiments of substituted heterocyclic groups, the substituted cycloalkyl group will have 1, 2, 3, or 4 substituent groups independently selected from hydroxy, fluoro, chloro, $NH_2$, $NHCH_3$, $N(CH_3)_2$, $CO_2CH_3$, SEt, $SCH_3$, methyl, ethyl, isopropyl, vinyl, trifluoromethyl, methoxy, ethoxy, isopropoxy, and trifluoromethoxy groups.

An "aryl" groups refers to a monocyclic aromatic, linked bicyclic aromatic or fused bicyclic aromatic moiety comprising at least one six membered aromatic "benzene" ring, preferably comprising between 6 and 12 ring carbon atoms, such as phenyl, biphenyl or naphthyl groups, which may be optionally substituted with various organic and/or inorganic substitutent groups, wherein the substituted aryl group and its substituents comprise between 6 and 18, or preferably 6 and 16 total carbon atoms. Preferred optional substituent groups include 1, 2, 3, or 4 substituent groups independently selected from hydroxy, fluoro, chloro, $NH_2$, $NHCH_3$, $N(CH_3)_2$, $CO_2CH_3$, SEt, $SCH_3$, methyl, ethyl, isopropyl, vinyl, trifluoromethyl, methoxy, ethoxy, isopropoxy, and trifluoromethoxy groups.

The term "heteroaryl" means a heterocyclic aryl derivative which preferably contains a five-membered or six-membered conjugated and aromatic ring system having from 1 to 4 heteroatoms, such as oxygen, sulfur and/or nitrogen, inserted into the unsaturated and conjugated heterocyclic ring. Heteroaryl groups include monocyclic heteroaromatic, linked bicyclic heteroaromatic or fused bicyclic heteroaromatic moieties. Examples of heteroaryls include pyridinyl, pyrimidinyl, and pyrazinyl, pyridazinyl, pyrrolyl, furanyl, thiofuranyl, oxazoloyl, isoxazolyl, phthalimido, thiazolyl, quinolinyl, isoquinolinyl, indolyl, or a furan or thiofuran directly bonded to a phenyl, pyridyl, or pyrrolyl ring and like unsaturated and conjugated heteroaromatic rings. Any monocyclic, linked bicyclic, or fused bicyclic heteroaryl ring system which has the characteristics of aromaticity in terms of electron distribution throughout the ring system is included in this definition. Typically, the heteroaromatic ring systems contain 3-12 ring carbon atoms and 1 to 5 ring heteroatoms independently selected from oxygen, nitrogen, and sulfur atoms.

The term "substituted heteroaryl" means the above-described heteroaryl is substituted with, for example, one or more, and preferably one or two, substituents which are the same or different which substituents preferably can be halogen, hydroxy, protected hydroxy, thio, alkylthio, cyano, nitro, C1 to C6 alkyl, C1 to C7 substituted alkyl, C1 to C7 alkoxy, C1 to C7 substituted alkoxy, alkoxy-alkyl, C1 to C7 acyl, C1 to C7 substituted acyl, C1 to C7 acyloxy, carboxy, alkoxycarbonyl, carboxymethyl, hydroxymethyl, amino, (monosubstituted)amino, (disubstituted)amino, carboxamide, N—(C1 to C6 alkyl)carboxamide, N,N-di(C1 to C6 alkyl)carboxamide, trifluoromethyl, N—((C1 to C6 alkyl)sulfonyl)ammo or N-(phenylsulfonyl)amino groups. In many embodiments of substituted heteroaryl groups, the substituted cycloalkyl group will have 1, 2, 3, or 4 substituent groups independently selected from hydroxy, fluoro, chloro, $NH_2$, $NHCH_3$, $N(CBb)_2$, $CO_2CH_3$, SEt, $SCH_3$, methyl, ethyl, isopropyl, vinyl, trifluoromethyl, methoxy, ethoxy, isopropoxy, and trifluoromethoxy groups.

Examples of the term "substituted arylalkyl" include groups such as 2-phenyl-1-chloroethyl, 2-(4-methoxyphenyl)ethyl, 4-(2,6-dihydroxy phenyl)-n-hexyl, 2-(5-cyano-3-methoxyphenyl)-n-pentyl, 3-(2,6-dimethylphenyl)propyl, 4-chloro-3-aminobenzyl, 6-(4-methoxyphenyl)-3-carboxy-n-hexyl, 5-(4-aminomethylphenyl)-3-(aminomethyl)-n-pentyl, 5-phenyl-3-oxo-n-pent-1-yl and the like.

The term "arylalkylene" specifies an arylalkyl, as defined above, where the arylalkyl radical is bonded at two positions connecting together two separate additional groups. The definition includes groups of the formula: -phenyl-alkyl- and alkyl-phenyl-alkyl-. Substitutions on the phenyl ring can be 1,2, 1,3 or 1,4. The term "substituted arylalkylene" is an arylalkylene as defined above that is further substituted preferably by halogen, hydroxy, protected hydroxy, C1 to C4 alkylthio, C1 to C4 alkylsulfoxide, C1 to C4 alkylsulfonyl, C1 to C4 substituted alkylthio, C1 to C4 substituted alkylsulfoxide, C1 to C4 substituted alkylsulfonyl, C1 to C6 alkyl, C1 to C7 alkoxy, C1 to C6 substituted alkyl, C1 to C7 alkoxy-alkyl, oxo, (tnonosubstituted)amino, (disubstituted)amino, trifluoromethyl, carboxy, alkoxycarbonyl, phenyl, substituted phenyl, phenylthio, phenylsulfoxide, phenylsulfonyl, amino, or protected amino group on the phenyl ring or on the alkyl group.

The term "substituted phenyl" specifies a phenyl group substituted with one or more, and preferably one or two, moieties preferably chosen from the groups consisting of halogen, hydroxy, protected hydroxy, thio, alkylthio, cyano, nitro, C1 to C6 alkyl, C1 to C6 substituted alkyl, C1 to C7 alkoxy, C1 to C7 substituted alkoxy, alkoxy-alkyl, C1 to C7 acyl, C1 to C7 substituted acyl, C1 to C7 acyloxy, carboxy, alkoxycarbonyl, carboxymethyl, hydroxymethyl, amino, (monosubstituted)amino, (disubstituted)amino, carboxamide, N—(C1 to C6 alkyl)carboxamide, N,N-di(C1 to C6 alkyl)carboxamide, trifluoromethyl, N—((C1 to C6 alkyl)sulfonyl)amino, N-(phenylsulfonyl)amino or phenyl, wherein the phenyl is substituted or unsubstituted, such that, for example, a biphenyl results. In many embodiments of substituted phenyl groups, the substituted cycloalkyl group will have 1, 2, 3, or 4 substituent groups independently selected from hydroxy, fluoro, chloro, $NH_2$, $NHCH_3$, $N(CH_3)_2$, $CO_2CH_3$, SEt, $SCH_3$, methyl, ethyl, isopropyl, vinyl, trifluoromethyl, methoxy, ethoxy, isopropoxy, and trifluoromethoxy groups.

The terms "halo" and "halogen" refer to the fluoro, chloro, bromo or iodo atoms. There can be one or more halogen, which are the same or different. Preferred halogens are chloro and fluoro. Although many of the compounds of the invention having halogen atoms as substituents are very effective in binding to the relevant taste receptors, such halogenated organic compounds can often have undesirable toxicological properties when administered to an animal in vivo. Therefore, in many embodiments of the compounds of Formula (I), if a halogen atom (including a fluoro or chloro atom) is listed as a possible substitutent atom, an alternative preferred group of substitutents would NOT include the halogen, fluorine, or chlorine groups.

The term "(monosubstituted)amino" refers to an amino group with one substituent preferably chosen from the group consisting of phenyl, substituted phenyl, C1 to C6 alkyl, C1 to C6 substituted alkyl, C1 to C7 acyl, C1 to C7 substituted acyl, C2 to C7 alkenyl, C2 to C7 substituted alkenyl, C2 to C7 alkynyl, C2 to C7 substituted alkynyl, C7 to C12 phenylalkyl, C7 to C12 substituted phenylalkyl and heterocyclic ring. The (monosubstituted)amino can additionally have an amino-protecting group as encompassed by the term "protected (monosubstituted)amino."

The term "(disubstituted)amino" refers to an amino group substituted preferably with two substituents chosen from the group consisting of phenyl, substituted phenyl, C1 to C6 alkyl, C1 to C6 substituted alkyl, C1 to C7 acyl, C2 to C7 alkenyl, C2 to C7 alkynyl, C7 to C12 phenylalkyl, and C7 to C12 substituted phenylalkyl. The two substituents can be the same or different.

The term "substituted alkylene" means an alkyl group where the alkyl radical is bonded at two positions connecting together two separate additional groups and further bearing an additional substituent. Examples of "substituted alkylene" includes aminomethylene, 1-(amino)-1,2-ethyl, 2-(amino)-1,2-ethyl, 1-(acetamido)-1,2-ethyl, 2-(acetamido)-1,2-ethyl, 2-hydroxy-1,1-ethyl, 1-(amino)-1,3-pк>pyl.

One or more of the compounds of the invention, may be present as a salt. The term "salt" encompasses those salts that form with the carboxylate anions and amine nitrogens and include salts formed with the organic and inorganic anions and cations discussed below. Furthermore, the term includes salts that form by standard acid-base reactions with basic groups (such as amino groups) and organic or inorganic acids. Such acids include hydrochloric, hydrofluoric, trifluoroacetic, sulfuric, phosphoric, acetic, succinic, citric, lactic, maleic, fumaric, palmitic, cholic, pamoic, mucic, D-glutamic, D-camphoric, glutaric, phthalic, tartaric, lauric, stearic, salicyclic, methanesulfonic, benzenesulfonic, sorbic, picric, benzoic, cinnamic, and like acids.

The term "organic or inorganic cation" refers to counter-ions for the carboxylate anion of a carboxylate salt. The counter-ions are chosen from the alkali and alkaline earth metals, (such as lithium, sodium, potassium, barium, aluminum and calcium); ammonium and mono-, di- and tri-alkyl amines such as trimethylamine, cyclohexylamine; and the organic cations, such as dibenzylammonium, benzylammonium, 2-hydroxyethylammonium, bis(2-hydroxyethyl) ammonium, phenylethylbenzylammonium, dibenzylethylenediammonium, and like cations. See, for example, "Pharmaceutical Salts," Berge, et al., *J. Pharm. Sci.* (1977) 66:1-19, which is incorporated herein by reference. Other cations encompassed by the above term include the protonated form of procaine, quinine and N-methylglucosamine, and the protonated forms of basic amino acids such as glycine, ornithine, histidine, phenylglycine, lysine and arginine. Furthermore, any zwitterionic form of the instant compounds formed by a carboxylic acid and an amino group is referred to by this term. For example, a cation for a carboxylate anion will exist when R2 or R3 is substituted with a (quaternary ammonium)methyl group. A preferred cation for the carboxylate anion is the sodium cation.

The compounds of the invention can also exist as solvates and hydrates. Thus, these compounds may crystallize with, for example, waters of hydration, or one, a number of, or any fraction thereof of molecules of the mother liquor solvent. The solvates and hydrates of such compounds are included within the scope of this invention.

The term "amino acid" includes any one of the twenty naturally-occurring amino acids or the D-form of any one of the naturally-occurring amino acids. In addition, the term "amino acid" also includes other non-naturally occurring amino acids besides the D-amino acids, which are functional equivalents of the naturally-occurring amino acids. Such non-naturally-occurring amino acids include, for example, norleucine ("Nle"), norvaline ("Nva"), L- or D-naphthalanine, ornithine ("Orn"), homoarginine (homoArg) and others well known in the peptide art, such as those described in M. Bodanzsky, "Principles of Peptide Synthesis," 1st and 2nd revised ed., Springer-Verlag, New York, N.Y., 1984 and 1993, and Stewart and Young, "Solid Phase Peptide Synthesis," 2nd ed., Pierce Chemical Co., Rockford, Ill., 1984, both of which are incorporated herein by reference. Amino acids and amino acid analogs can be purchased commercially (Sigma Chemical Co.; Advanced Chemtech) or synthesized using methods known in the art.

"Amino acid side chain" refers to any side chain from the above-described "amino acids."

"Substituted" herein refers to a substituted moiety, such as a hydrocarbon, e.g., substituted alkyl or benzyl wherein at least one element or radical, e.g., hydrogen, is replaced by another, e.g., a hydrogen is replaced by a halogen as in chlorobenzyl.

A residue of a chemical species, as used in the specification and concluding claims, refers to a structural fragment, or a moiety that is the resulting product of the chemical species in a particular reaction scheme or subsequent formulation or chemical product, regardless of whether the structural fragment or moiety is actually obtained from the chemical species. Thus, an ethylene glycol residue in a polyester refers to one or more —$OCH_2CH_2O$— repeat units in the polyester, regardless of whether ethylene glycol is used to prepare the polyester. Similarly, a 2,4-thiazolidinedione residue in a chemical compound refers to one or more-2,4-thiazolidinedione moieties of the compound, regardless of whether the residue was obtained by reacting 2,4-thiazolidinedione to obtain the compound.

The term "organic residue" defines a carbon containing residue, i.e. a residue comprising at least one carbon atom, and includes but is not limited to the carbon-containing groups, residues, or radicals defined hereinabove. Organic residues can contain various heteroatoms, or be bonded to another molecule through a heteroatom, including oxygen, nitrogen, sulfur, phosphorus, or the like. Examples of organic residues include but are not limited alkyl or substituted alkyls, alkoxy or substituted alkoxy, mono or di-substituted amino, amide groups, etc. Organic resides can preferably comprise 1 to 18 carbon atoms, 1 to 15, carbon atoms, 1 to 12 carbon atoms, 1 to 8 carbon atoms, or 1 to 4 carbon atoms.

By the term "effective amount" of a compound as provided herein is meant a sufficient amount of the compound to provide the desired regulation of a desired function, such as activation of a taste receptor, or to cause perception of taste. As will be pointed out below, the exact amount required will vary from subject to subject, depending on the species, age, general condition of the subject, specific identity and formulation of the drug, etc. Thus, it is not possible to specify an exact "effective amount." However, an appropriate effective amount can be determined by one of ordinary skill in the art using only routine experimentation.

It must be noted that, as used in the specification and the appended claims, the singular forms "a," "an" and "the" include plural referents unless the context clearly dictates otherwise. Thus, for example, reference to "an aromatic compound" includes mixtures of aromatic compounds.

Often, ranges are expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not. For example, the phrase "optionally substituted lower alkyl"

means that the lower alkyl group may or may not be substituted and that the description includes both unsubstituted lower alkyl and lower alkyls where there is substitution.

The Savory Amide Compounds to be Formulated

Many of the high potency savory compounds employed in formulating the comestible compositions described herein include the "amide" compounds that were recently disclosed in U.S. Patent Publication No. US 2005/0084506 A1 and U.S. Patent Publication No. US 2006/0045953 A1, both of which applications are hereby incorporated by reference herein in their entirety, for all purposes, but particularly for their description of "amide" compounds that have an extremely high potency as Umami flavorant compounds, methods and examples of their synthesis, and data on their biological effectiveness as Umami flavorants or tastants. Many of the savory amide compounds used in the comestible compositions and formulations described herein are organic (carbon containing) compounds that all have at least one "amide" group therein, have the following general structure, which will be hereinafter referred to as the amide compounds having Formula (I) shown below:

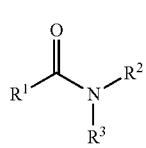

(I)

The amide compounds of Formula (I) do not include any amide compounds that are known to naturally occur in biological systems or foods, such as peptides, proteins, nucleic acids, glycopeptides or glycoproteins, or the like. The amide compounds of Formula (I) of the invention are man-made and artificial synthetic amide compounds.

For the various embodiments of the compounds of Formula (I), the $R^1$, $R^2$ and $R^3$ groups can be and are independently further defined in many ways, for example as was described in detail in U.S. Patent Publication No. US 2005/0084506 A1 and U.S. Patent Publication No. US 2006/0045953 A1, hereby incorporated herein by reference for their disclosures relating to the structures and biological activity of the amide compounds described herein, and methods for their synthesis and purification. It is hereby specifically contemplated that any of subgenuses and/or species of compounds of Formula (I) described in U.S. Patent Publication No. US 2005/0084506 A1 and U.S. Patent Publication No. US 2006/0045953 A1 can be employed in the compositions, processes and/or methods described herein below, to form a savory or sweet flavor modified comestible or medicinal product, or a precursor thereof.

In many aspects of the compounds of Formula (T), $R^1$ comprises an organic or hydrocarbon-based residue having at least three carbon atoms and optionally one to 20, 15, 10, 8, 7, 6, or 5 heteroatoms independently selected from oxygen, nitrogen, sulfur, halogens, or phosphorus.

In many aspects of the compounds of Formula (I), one of $R^2$ and $R^3$ is optionally H, and one or both of $R^2$ and $R^3$ comprises an organic or hydrocarbon-based residue having at least three carbon atoms and optionally one to ten heteroatoms independently selected from oxygen, nitrogen, sulfur, halogens, or phosphorus.

In many aspects of the compounds of Formula (I), the molecular weight of the compounds of Formula (I) should be less than about 800 grams per mole, or in further related embodiments less than or equal to about 700 grams per mole, 600 grams per mole, 500 grams per ole, 450 grams per mole, 400 grams per mole, 350 grams per mole, or 300 grams per mole. Similarly, the compounds of Formula (I) can have preferred ranges of molecular weight, such as for example from about 175 to about 500 grams per mole, from about 200 to about 450 grams per mole, from about 225 to about 400 grams per mole, from about 250 to about 350 grams per mole.

For example, in some aspects, $R^1$, $R^2$, and $R^3$ can be independently selected from the group consisting of an arylalkenyl, heteroarylalkenyl, arylalkyl, heteroarylalkyl, alkyl, alkoxy alkyl, alkenyl, cycloalkyl, cycloalkenyl, aryl, heteroaryl, $-R^4OH$, $-R^4OR^5$, $-R^4CN$, $-R^4CO_2H$, $-R^4CO_2R^5$, $-R^4COR^5$, $-R^4SR^5$, and $-R^4SO_2R^5$, and optionally substituted derivative thereof comprising 1, 2, 3, or 4 carbonyl, amino groups, hydroxyl, or halogen groups, and wherein $R^4$ and $R^5$ are $C_1$-$C_6$ hydrocarbon residues.

In further related embodiments of the amide compounds of Formula (I), $R^1$, $R^2$ and $R^3$ can be independently selected from the group consisting of an arylalkenyl, heteroarylalkenyl, arylalkyl, heteroarylalkyl, alkyl, alkoxy-alkyl, alkenyl, cycloalkyl, cycloalkenyl, heterocycle, aryl and heteroaryl groups, and optionally substituted derivatives thereof comprising 1, 2, 3 or 4 carbonyl, amino groups, hydroxyl, chlorine, or fluorine groups. In both of the embodiments just mentioned, an alternative and preferred set of optional substituent groups would be substituents independently selected from hydroxy, fluoro, chloro, $NH_2$, $NHCH_3$, $N(CH_3)_2$, $CO_2CH_3$, SEt, $SCH_3$, methyl, ethyl, isopropyl, vinyl, trifluoromethyl, methoxy, ethoxy, isopropoxy, and trifluoromethoxy substituent groups.

In many aspects of the compounds of Formula (I), one of $R^2$ and $R^3$ is hydrogen and the other $R^2$ or $R^3$ group is an organic residue or group. For example, in many embodiments of the compounds of Formula (I), at least one or $R^2$ and $R^3$ is a branched or cyclic organic residue having a carbon atom directly bonded to both (a) the amide nitrogen atom and (b) two additional carbon atoms from other organic residues, which are branched or cyclic organic residues comprising additional hydrogen atoms and up to 10 optional additional carbon atoms, and optionally from zero to five heteroatoms independently selected from oxygen, nitrogen, sulfur, fluorine, and chlorine. Such branched $R^2$ and $R^3$ groups include organic radicals having the formula:

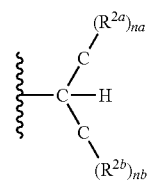

wherein $n_a$ and $n_b$ are independently selected from 1, 2, and 3, and each $R^{2a}$ or $R^{2b}$ substituent residue is independently selected from hydrogen, a halogen, a hydroxy, or a carbon-containing residue optionally having from zero to five heteroatoms independently selected from oxygen, nitrogen, sulfur, and a halogen. In some such embodiments, the $R^{2a}$ or $R^{2b}$ are independent substituent groups, but in other embodiments one or more of the $R^{2a}$ or $R^{2b}$ radicals can be bonded together to form ring structures.

In some aspects of the compounds of Formula (I), at least one of the $R^2$ and $R^3$ is a branched alkyl radical having 5 to 12 carbon atoms, or at least one of $R^2$ and $R^3$ is a cycloalkyl or cycloalkenyl ring comprising 5 to 12 ring carbon atoms. In such embodiments of $R^2$ and $R^3$ the branched alkyl radical or the cycloalkyl or cycloalkenyl ring can be optionally substituted with 1, 2, 3, or 4 substituent groups independently selected from hydrogen, alkyl, alkoxyl, alkoxy-alkyl, OH, $SR^9$, halogen, CN, $NO_2$, $CO_2R^9$, $COR^9$, $CONR^9R^{10}$, $NR^9R^{10}$, $NR^9COR^{10}$, $SOR^9$, $SO_2R^9$, $SO_2NR^9R^{10}$, $NR^9SO_2R^{10}$, alkenyl, cycloalkyl, cycloalkenyl, aryl, heteroaryl, and heterocycle; and $R^9$ and $R^{10}$ are independently selected from H, alkyl, cycloalkyl, and alkenyl. In some related aspects, the substituents for the compounds can be selected from hydroxy, fluoro, chloro, $NH_2$, $NHCH_3$, $N(CH_3)_2$, $CO_2CH_3$, SEt, $SCH_3$, methyl, ethyl, isopropyl, vinyl, trifluoromethyl, methoxy, ethoxy, isopropoxy, and trifluoromethoxy.

In many aspects of the compounds of Formula (I), at least one of $R^2$ or $R^3$ is a $C_3$-$C_{10}$ or $C_3$-$C_{15}$ branched alkyl. These branched alkyls have been found to be highly effective $R^2$ groups for savory amide compounds. In further aspects the $C_3$-$C_{10}$ branched alkyl may optionally substituted with one or two substituents independently selected from a hydroxy, fluoro, chloro, $NH_2$, $NHCH_3$, $N(CH_3)_2$, $CO_2CH_3$, $SCH_3$, SEt, methyl, ethyl, isopropyl, vinyl, trifluoromethyl, methoxy, ethoxy, isopropoxy, and trifluoromethoxy group.

In some aspects of the compounds of Formula (I), at least one of $R^2$ or $R^3$ is a cycloalkyl, cycloalkenyl, or saturated heterocyclic ring having 3 to 10 ring carbon atoms, optionally substituted with 1, 2, or 3 substituents independently selected from the group consisting of $NH_2$, $NHCH_3$, $N(CH_3)_2$, $CO_2CH_3$, SEt, $SCH_3$, $C_1$-$C_4$ alkyl, $C_1$-$C_4$ haloalkyl, $C_1$-$C_4$ alkoxy, $C_1$-$C_4$ haloalkoxy, hydroxy, and halogen. In some further embodiments, at least one of $R^2$ or $R^3$ is a cyclopentyl, cyclohexyl, cycloheptyl, cyclooctyl ring, or piperidyl ring optionally substituted with 1, 2, or 3 substituents independently selected from the group consisting of hydroxy, fluoro, chloro, $NH_2$, $NHCH_3$, $N(CH_3)_2$, $CO_2CH_3$, SEt, $SCH_3$, methyl, ethyl, isopropyl, vinyl, trifluoromethyl, methoxy, ethoxy, isopropoxy, and trifluoromethoxy.

In some aspects, at least one of $R^2$ or $R^3$ is a cyclohexyl, optionally substituted with 1, 2, or 3 methyl groups. Examples of such methyl substituted cyclohexyl rings have the formula

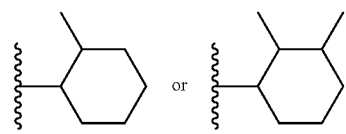

In some aspects of the compounds of Formula (I), at least one of $R^2$ or $R^3$ is a 1-(1,2,3,4)tetrahydronapthalene ring or an 2,3-dihydro-1H-indene ring having the formula:

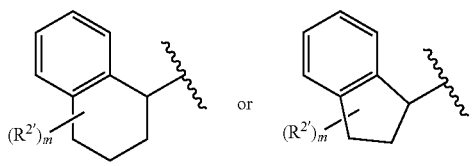

wherein m is 0, 1, 2, or 3, and each $R^2$ can be bonded to either the aromatic or non-aromatic ring and is independently selected from hydroxy, fluoro, chloro, $NH_2$, $NHCH_3$, $N(CH_3)_2$, $CO_2CH_3$, $SCH_3$, SEt, methyl, ethyl, isopropyl, vinyl, trifluoromethyl, methoxy, ethoxy, isopropoxy, and trifluoromethoxy. It is to be understood that optical and/or diastereomeric isomerism can occur on the cyclohexyl or cyclopentyl rings of these substituent, and differing optical and/or diastereomers can often have at least somewhat differing biological activities.

Aromatic or Heteroaromatic Compounds

In many aspects of the amide compounds of Formula (I) having savory receptor agonist activity, the invention relates to a subgenus of aromatic amide compounds having the following formula (II):

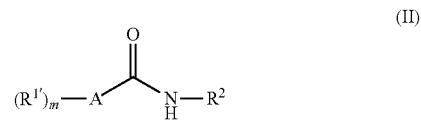

wherein A comprises a 5 or 6 membered aryl or heteroaryl ring; m is 0, 1, 2, 3 or 4; each $R^1$ is independently selected from alkyl, alkoxy, alkoxy-alkyl. hydroxyalkyl, OH, CN, $CO_2H_5 CO_2R^6$,CHO, $COR^6$, $SR^6$, halogen, alkenyl, cycloalkyl, cycloalkenyl, heterocycle, aryl, and heteroaryl; and $R^6$ is $C_1$-$C_6$ alkyl, and $R^2$ can be any of the embodiments contemplated herein above, or the like.

In many aspects, the A group of Formula (II) comprises an aryl ring, i.e. it contains at least one six-membered phenyl (benzene) ring. The aryls include at least benzene and napthalene rings, which may not, but in many embodiments are, further substituted with at least 1, 2, or 3 $R^1$ substituent groups independently selected from the group consisting of hydroxy, fluoro, chloro, $NH_2$, $NHCH_3$, $N(CH_3)_2$, $COOCH_3$, $SCH_3$, SEt, methyl, ethyl, isopropyl, vinyl, trifluoromethyl, methoxy, ethoxy, isopropoxy, and trifluoromethoxy groups.

In some preferred embodiments, one or two of the $R^1$ substituent groups are bonded together to form a saturated alkylenedioxy ring on a phenyl ring, as exemplified by the following preferred structures (IIa) and (IIb);

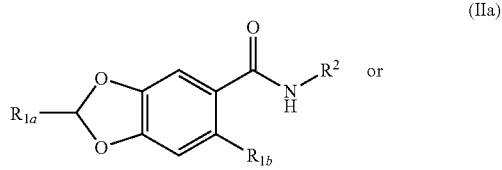

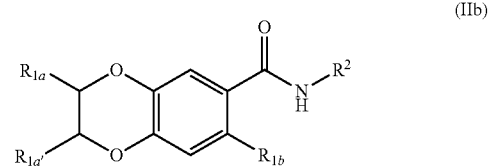

wherein $R_{1a}$, $R_{1a'}$, and $R_{1b}$ are independently hydrogen or a lower alkyl, or alternatively $R_{1a}$ and $R_{1b}$ are independently hydrogen or methyl, or alternatively both $R_{1a}$ and $R_{1b}$ are hydrogen.

Additional examples of fused bicyclic heteroaryls as A groups are typified by the following benzoxazole compounds (Formula IIe) and (Formula IIf):

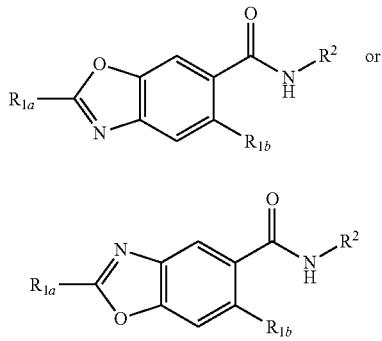

(IIe)

(IIf)

or wherein $R_{1a}$ or $R_{1b}$ is independently hydrogen or a lower alkyl.

In many embodiments of the amide compounds of Formula (H), A is a monocyclic heteroaryl ring. The monocyclic heteroaryls that can be used as an A group in Formula (II) are typified by the following structures:

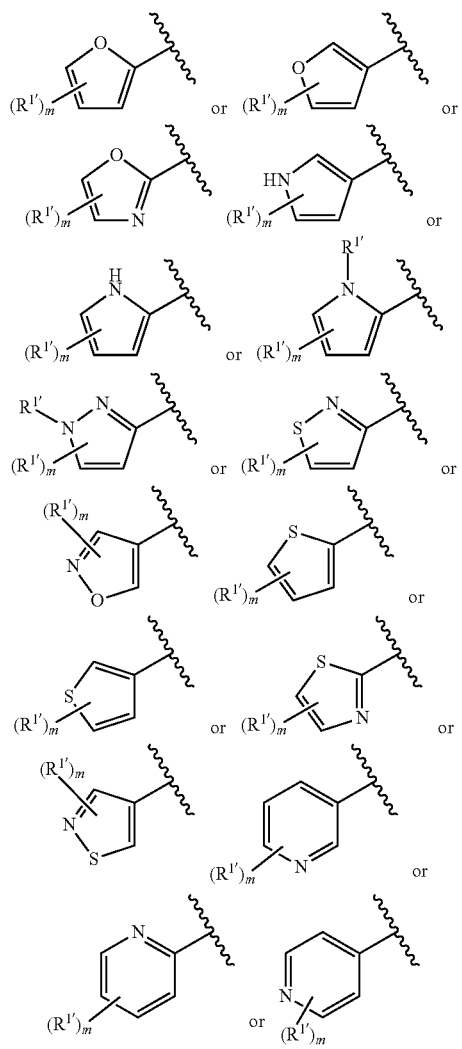

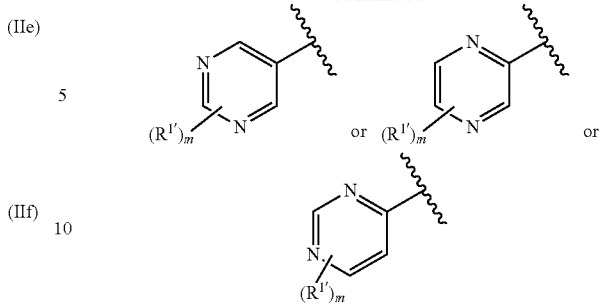

wherein m is 0, 1, 2, or 3, and each $R^1$ is independently selected from, hydroxy, fluoro, chloro, $NH_2$, $NHCH_3$, $N(CH_3)_2$, $CO_2CH_3$, $SCH_3$, SEt, methyl, ethyl, isopropyl, vinyl, trifluoromethyl, methoxy, ethoxy, isopropoxy, and trifluoromethoxy.

In many embodiments of the compounds of the various subgenuses of Formula (II) described immediately above, at least one of $R^1$ or $R^2$ can be a $C_3$-$C_{15}$ branched alkyl; an α-substituted carboxylic acid or an α-substituted carboxylic acid lower alkyl ester; a 5 or 6 membered aryl or heteroaryl ring, optionally substituted with 1, 2, 3 or 4 substituent groups selected from the group consisting of hydroxy, fluoro, chloro, $NH_2$, $NHCH_3$, $N(CH_3)_2$, $CO_2CH_3$, $SCH_3$, SEt, methyl, ethyl, isopropyl, vinyl, trifluoromethyl, methoxy, ethoxy, isopropoxy, and trifluoromethoxy groups; a cyclohexyl, optionally substituted with 1, 2, or 3 methyl groups; or a 1-(1,2,3,4) tetrahydronapthalene ring or an 2,3-dihydro-1H-indene ring having the formula:

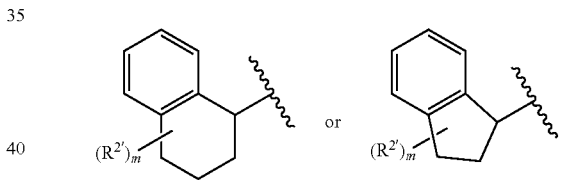

wherein m is 0, 1, 2, or 3, and each $R^{2'}$ can be bonded to either the aromatic or non-aromatic ring and is independently selected from hydroxy, fluoro, chloro, $NH_2$, $NHCH_3$, $N(CH_3)_2$, $CO_2CH_3$, $SCH_3$, SEt, methyl, ethyl, isopropyl, vinyl, trifluoromethyl, methoxy, ethoxy, isopropoxy, and trifluoromethoxy; as were described hereinabove with respect to the general amide compounds of Formula (I).

In many aspects of the inventions described herein, amide compounds within the subgenus of aromatic amide compounds described below can be employed to formulate the comestible concentrate and/or final comestible compositions;

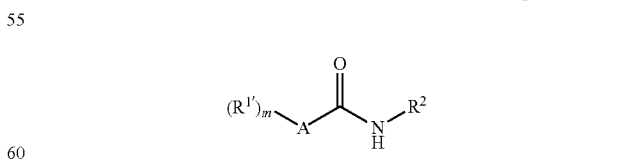

wherein
i) A is a 5 or 6 membered aryl or heteroaryl ring,
ii) m is 0, 1, 2, 3 or 4,
iii) each $R^{1'}$ is independently selected from the group consisting of hydroxyl, $NH_2$, SH, halogen, and a $C_1$-$C_4$ organic radical, and iv) $R^2$ has 3 to 15 carbon atoms and is a branched alkyl, a cycloalkyl ring, or a heterocyclic ring, optionally substituted with 1, 2, 3, or 4 substituent groups independently selected from the group consisting of hydroxyl, $NH_2$, SH, halogen, and a $C_1$-$C_4$ organic radical, or one or more comestibly acceptable salts thereof, The subgenuses of aromatic or heteroaromatic amide compounds of Formula (IT) described immediately above contain many excellent agonists of T1R1/T1R3 savory ("umami") taste receptors, that are effective to bind to the receptors at very low concentrations of the amide compound on the order of micromolar concentrations or less, and can induce a noticeable sensation of a savory umami flavor in humans, and/or can serve as enhancers of the savory umami flavor of MSG.

Accordingly, many of the aromatic or heteroaromatic amide compounds of Formula (II) can be utilized as savory flavoring agents or savory flavor enhancers when contacted with a wide variety of comestible products and/or compositions, or their precursors, as is described elsewhere herein.

Oxalamide Compounds

In another subgenus of the amide compounds of Formula $(I)_5$ the amide compound is an oxalamide compound having Formula (V):

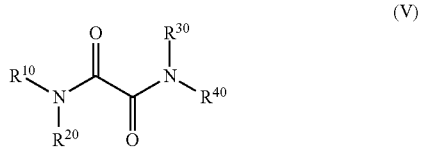

(V)

wherein $R^{10}$ and $R^{30}$ are each independently selected from a hydrocarbon residue that may contain one or more heteroatoms, or preferably, $R^{10}$ and $R^{30}$ are independently selected from the group consisting of arylalkyl, heteroarylalkyl, heterocycle-alkyl, or optionally substituted groups thereof, and $R^{20}$ and $R^{40}$ are each independently H or a hydrocarbon residue that may contain one or more heteroatoms; preferably $R^{20}$ and $R^{40}$ are H or $C_1$-$C_3$ alkyl, or optionally substituted groups thereof. More preferably $R^{20}$ and $R^{40}$ are H. Moreover, there can be 0, 1, 2, 3, or 4 optional substituent groups for $R^{10}$ and $R^{30}$ independently selected from hydroxy, fluoro, chloro, $NH_2$, $NHCH_3$, $N(CH_3)_2$, $CO_2CH_3$, $SCH_3$, SEt, methyl, ethyl, isopropyl, vinyl, trifluoromethyl, methoxy, ethoxy, isopropoxy, and trifluoromethoxy groups.

In preferred embodiments of the oxalamide compounds of Formula (V), $R^{10}$ and $R^{30}$ are independently selected hydrocarbon residues having at least three carbon atoms and optionally one to ten heteroatoms independently selected from oxygen, nitrogen, sulfur, halogens, or phosphorus, and wherein $R^{20}$ and $R^{40}$ are independently selected from hydrogen and a hydrocarbon residue having at least three carbon atoms and optionally one to ten heteroatoms independently selected from oxygen, nitrogen, sulfur, halogens, or phosphorus.

In many preferred embodiments of the oxalamide compounds of Formula (V), $R^{20}$ and $R^{40}$ are hydrogen. In such embodiments, $R^{10}$ and $R^{30}$ can be independently selected from the group consisting of arylalkyls, heteroarylalkyls, cycloalkyl-alkyls, and heterocycle-alkyls comprising five to 15 carbon atoms, wherein each of $R^{10}$ and $R^{30}$ can optionally comprise one to four substituents independently selected from hydrogen, hydroxy, fluoro, chloro, $NH_2$, $NHCH_3$, $N(CH_3)_2$, $CO_2CH_3$, SEt, $SCH_3$, methyl, ethyl, isopropyl, vinyl, trifluoromethyl, methoxy, ethoxy, isopropoxy, and trifluoromethoxy groups.

In many embodiments of the oxalamide compounds of Formula (V), the oxalamide compound has the Formula (Va):

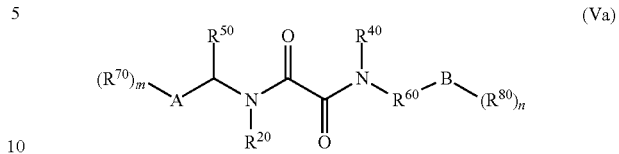

(Va)

wherein A and B are independently an aryl, heteroaryl, cycloalkyl, or a heterocycle comprising 5 to 12 ring atoms; m and n are independently 0, 1, 2, 3 or 4-8; $R^{20}$ and $R^{40}$ are hydrogen, $R^{50}$ is hydrogen or an alkyl or substituted alkyl residue comprising one to four carbon atoms; $R^{60}$ is absent or a $C_1$-$C_5$ alkylene or a $C_1$-$C_5$ substituted alkylene; $R^{70}$ and $R^{80}$ are independently selected from the group consisting of hydrogen, alkyl, alkoxyl, alkoxy-alkyl, OH, $SR^9$, halogen, CN, $NO_2$, $CO_2R^9$, $COR^9$, $CONR^9R^{10}$, $NR^9R^{10}$, $NR^9COR^{10}$, $SOR^9$, $SO_2R^9$, $SO_2NR^9R^{10}$, $NR^9SO_2R^{10}$, alkenyl, cycloalkyl, cycloalkenyl, aryl, heteroaryl, and heterocycle; $R^9$ and $R^{10}$ are independently selected from H, $C_1$-$C_6$ alkyl, $C_3$-$C_6$ cycloalkyl, and $C_1$-$C_6$ alkenyl.

In preferred embodiments of the oxalamide compounds of Formula (Va), $R^{60}$ is a —$CH_2CH_2$. group, A and B are independently selected from phenyl, pyridyl, furanyl, thiofuranyl and pyrrolyl rings and $R^{70}$ and $R^{80}$ are independently selected from hydroxy, fluoro, chloro, $NH_2$, $NHCH_3$, $N(CH_3)_2$, $CO_2CH_3$, SEt, $SCH_3$, methyl, ethyl, isopropyl, vinyl, trifluoromethyl, methoxy, ethoxy, isopropoxy, and trifluoromethoxy groups.

In some embodiments of the oxalamide compounds of Formula (Va), A and B are independently a phenyl, pyridyl, furanyl, benzofuranyl, pyrrole, benzothiophene, piperidyl, cyclopentyl, cyclohexyl, or cycloheptyl ring; m and n are independently 0, 1, 2, or 3; $R^{20}$ and $R^{40}$ are hydrogen; $R^{50}$ is hydrogen or methyl; $R^{60}$ is a $C_1$-$C_5$ or preferably $C_2$ alkylene; $R^{70}$ and $R^{80}$ are independently selected from hydrogen, hydroxy, fluoro, chloro, $NH_2$, $NHCH_3$, $N(CH_3)_2$, $CO_2CH_3$, SEt, $SCH_3$, methyl, ethyl, isopropyl, vinyl, trifluoromethyl, methoxy, ethoxy, isopropoxy, and trifluoromethoxy groups.

In many embodiments of the oxalamide compounds of Formula (V), the oxalamide compound has the Formula (Vb):

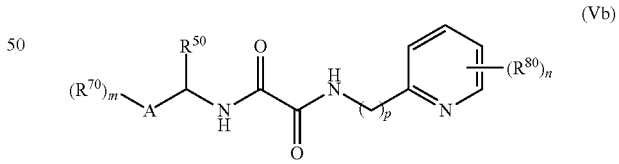

(Vb)

wherein A is a phenyl, pyridyl, furanyl, pyrrole, piperidyl, cyclopentyl, cyclohexyl, or cycloheptyl ring; m and n are independently 0, 1, 2, or 3; $R^{50}$ is hydrogen or methyl; P is 1 or 2; and $R^{70}$ and $R^{80}$ are independently selected from the group consisting of hydrogen, hydroxy, fluoro, chloro, $NH_2$, $NHCH_3$, $N(CH_3)_2$, $COOCH_3$, $SCH_3$, SEt, methyl, ethyl, isopropyl, vinyl, trifluoromethyl, methoxy, ethoxy, isopropoxy, and trifluoromethoxy, or two of le together form a methylenedioxy ring. In some embodiments of the oxalamide compounds of Formula (Vb), the pyridyl-$R^{80}$ radical has the structure:

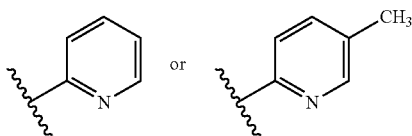

In certain preferred embodiments of the amide compounds of Formula (V), the oxalamide compound has the Formula (Vc):

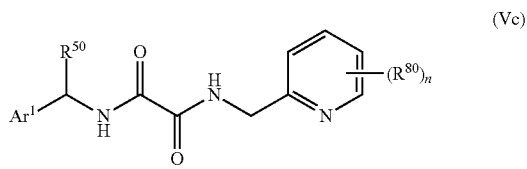

wherein $Ar^1$ is a substituted aryl or heteroaryl ring comprising five to 12 carbon atoms; $R^{50}$ is hydrogen or methyl; n is 0, 1, 2, or 3; each $R^{80}$ is independently selected from the group consisting of hydroxy, fluoro, chloro, $NH_2$, $NHCH_3$, $N(CH_3)_2$, $CO_2CH_3$, SEt, $SCH_3$, methyl, ethyl, isopropyl, vinyl, trifluoromethyl, methoxy, ethoxy, isopropoxy, and trifluoromethoxy groups. In some embodiments of the oxalamide compounds of Formula (Vc), $Ar^1$ is a 2-, 3-, or 4-monosubstituted phenyl, 2,4-, 2,3-, 2,5, 2,6, 3,5-, or 3,6-disubstituted phenyl, 3-alkyl-4-substituted phenyl, a tri-substituted phenyl wherein the substituent groups are independently selected from the group consisting of hydrogen, hydroxy, fluoro, chloro, $NH_2$, $NHCH_3$, $N(CH_3)_2$, $CO_2CH_3$, SEt, $SCH_3$, methyl, ethyl, isopropyl, vinyl, trifluoromethyl, methoxy, ethoxy, isopropoxy, and trifluoromethoxy, or two adjacent substituents together form a methylenedioxy ring on the phenyl ring. In some embodiments of the oxalamide compounds of Formula (Vc), $Ar^1$ is a substituted heteroaryl ring comprising 5 to 12 carbon atoms and wherein the substituent groups are independently selected from the group consisting of hydrogen, hydroxy, fluoro, chloro, $NH_2$, $NHCH_3$, $N(CH_3)_2$, $CO_2CH_3$, SEt, $SCH_3$, methyl, ethyl, isopropyl, vinyl, trifluoromethyl, methoxy, ethoxy, isopropoxy, and trifluoromethoxy.

In certain preferred embodiments of the amide compounds of Formula (V), the oxalamide compound has the Formula (Vd):

(Vd)

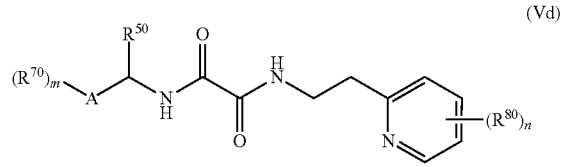

wherein A is a substituted aryl or heteroaryl ring comprising five to 12 carbon atoms; $R^{50}$ is hydrogen or methyl; n is 0, 1, 2, or 3; each $R^{80}$ is independently selected from the group consisting of hydrogen, hydroxy, fluoro, chloro, $NH_2$, $NHCH_3$, $N(CH_3)_2$, $COOCH_3$, $SCH_3$, SEt, methyl, ethyl, isopropyl, vinyl, trifluoromethyl, methoxy, ethoxy, isopropoxy, and trifluoromethoxy. Preferably, A is a phenyl, pyridyl, furanyl, pyrrole, piperidyl, cyclopentyl, cyclohexyl, or cycloheptyl ring optionally substituted with 1, 3, or 3 substituent groups independently selected from the group consisting of hydrogen, hydroxy, fluoro, chloro, $NH_2$, $NHCH_3$, $N(CH_3)_2$, $COOCH_3$, $SCH_3$, SEt, methyl, ethyl, isopropyl, vinyl, trifluoromethyl, methoxy, ethoxy, isopropoxy, and trifluoromethoxy groups.

In some aspects of the amide compounds of Formula (V), the oxalamide compound has the Formula (Ve):

(Ve)

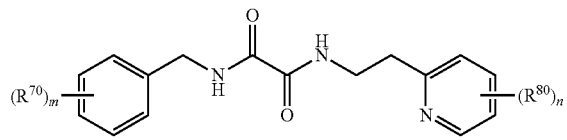

wherein m and n are independently 0, 1, 2, or 3; $R^{70}$ and $R^{80}$ are independently selected from the group consisting of hydrogen, alkyl, alkoxyl, alkoxy-alkyl, OH, $SR^9$, halogen, CN, $NO_2$, $CO_2R^9$, $COR^9$, $CONR^9R^{10}$, $NR^9R^{10}$, $NR^9COR^{10}$, $SOR^9$, $SO_2R^9$, $SO_2NR^9R^{10}$, $NR^9SO_2R^{10}$, alkenyl, cycloalkyl, cycloalkenyl, aryl, heteroaryl, and heterocycle; and $R^9$ and $R^{10}$ are independently selected from H, $C_1$-$C_6$ alkyl, $C_3$-$C_6$ cycloalkyl, and $C_1$-$C_6$ alkenyl groups, hi related aspects, $R^{70}$ and $R^{80}$ are independently selected from the group consisting of hydrogen, hydroxy, fluoro, chloro, $NH_2$, $NHCH_3$, $N(CH_3)_2$, $COOCH_3$, $SCH_3$, SEt, methyl, ethyl, isopropyl, vinyl, trifluoromethyl, methoxy, ethoxy, isopropoxy, and trifluoromethoxy groups. Preferably, the pyridyl-$R^{80}$ radical of the oxalamide compound of Formula (Ve) has the structure:

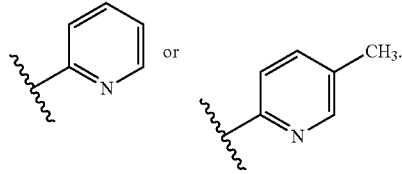

Lastly, in some aspects related to processes for making savory flavorant concentrate compositions described hereinbelow, another subgenus of oxamamide compounds that includes numerous high potency agonists of T1R1/T1R3 savory ("umami") taste receptors include compounds having the following structures:

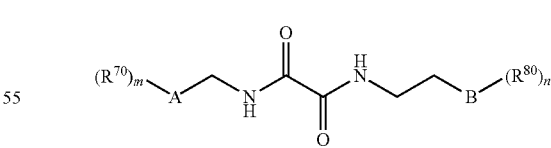

wherein
i) A and B are independently an aryl, heteroaryl, cycloalkyl, or heterocycle comprising 5 to 12 ring atoms,
ii) m and n are independently 0, 1, 2, 3 or 4-8,
iii) $R^{70}$ and $R^{80}$ are independently selected from the group consisting of hydrogen, alkyl, alkoxyl, alkoxy-alkyl, OH, $SR^9$, halogen, CN, $NO_2$, $CO_2R^9$, $COR^9$, $CONR^9R^{10}$, $NR^9R^{10}$, $NR^9COR^{10}$, $SOR^9$, $SO_2R^9$, $SO_2NR^9R^{10}$, $NR^9SO_2R^{10}$, alkenyl, cycloalkyl, cycloalkenyl, aryl, heteroaryl, and heterocycle, and $R^9$ and $R^{10}$ are independently selected from H, $C_1$-$C_6$ alkyl, $C_3$-$C_6$ cycloalkyl, and $C_1$-$C_6$ alkenyl, or two of $R^{70}$ together form a methylenedioxy ring, or one or more comestibly acceptable salts thereof;

As can be noted by inspection of the Examples attached hereinbelow, the oxalamide compounds described above are excellent agonists of T1R1/T1R$^3$ savory ("umami") taste receptors at very low concentrations on the order of micromolar concentrations or less, and can induce a noticeable sensation of a savory umami flavor in humans, and/or can serve as enhancers of the savory umami flavor of MSG. Accordingly, oxalamide compounds can be utilized as savory flavoring agents or savory flavor enhancers when contacted with a wide variety of comestible products and/or compositions, or their precursors, as is described elsewhere herein.

Comestible or Pharmaceutically Acceptable Compounds

Many of the amide compounds of Formula (I) or its various enumerated subgenuses comprise acidic or basic groups, so that depending on the acidic or basic character ("pH") of the comestible or medicinal compositions in which they are formulated, they may be present as salts, which are preferably comestibly acceptable (i.e. designated as generally recognized as safe, or GRAS) or pharmaceutically acceptable salts (many of which have been recognized by the Federal Food and Drug Administration).

The amide compounds of Formula (I) having acidic groups, such as carboxylic acids, will tend (at near neutral physiological pH) to be present in solution in the form of anionic carboxylates, and therefore will in preferred embodiments have an associate comestibly and/or pharmaceutically acceptable cation, many of which are known to those of ordinary skill in the art. Such comestibly and/or pharmaceutically acceptable cations include alkali metal cations (lithium, sodium, and potassium cations), alkaline earth metal cations (magnesium, calcium, and the like), or ammonium $(NH_4)^+$ or organically substituted ammonium cations such as $(R—NH_3)^{4+}$ cations.

The amide compounds of Formula (I) having basic substituent groups, such as amino or nitrogen containing heterocyclic groups, will tend (at near neutral physiological pH, or at the acidic pH common in many foods) to be present in solution in the form of cationic ammonium groups, and therefore will in preferred embodiments have an associate comestibly and/or pharmaceutically acceptable anion, many of which are known to those of ordinary skill in the art. Such comestibly and/or pharmaceutically acceptable anionic groups include the anionic form of a variety of carboxylic acids (acetates, citrates, tartrates, anionic salts of fatty acids, etc.), halides (especially fluorides or chlorides), nitrates, and the like.

The amide compounds of Formula (I) and its various subgenuses should preferably be comestibly acceptable, i.e. deemed suitable for consumption in food or drink, and should also be pharmaceutically acceptable. The typical method of demonstrating that a flavorant compound is comestibly acceptable is to have the compound tested and/or evaluated by an Expert Panel of the Flavor and Extract Manufacturers Association and declared as to be "Generally Recognized As Safe" ("GRAS"). The FEMA/GRAS evaluation process for flavorant compounds is complex but well known to those of ordinary skill in the food product preparation arts, as is discussed by Smith et al. in an article entitled "GRAS Flavoring Substances 21," Food Technology, 57(5), pgs 46-59, May 2003, the entire contents of which are hereby incorporated herein by reference.

When being evaluated in the FEMA/GRAS process, a new flavorant compound is typically tested for any adverse toxic effects on laboratory rats when fed to such rats for at least about 90 days at a concentration 100-fold, or 1000-fold, or even higher concentrations than the proposed maximum allowable concentration of the compound in a particular category of food products being considered for approval. For example, such testing of the amide compounds of the invention might involve combining the amide compound with rat chow and feeding it to laboratory rats such as Crl:CD(SD)IGS BR rats, at a concentration of about 100 milligrams/Kilogram body weight/day for 90 days, and then sacrificing and evaluating the rats by various medical testing procedures to show that the amide compound of Formula (I) causes no adverse toxic effects on the rats.

Four of the compounds (further described in the examples 1, 24, 26, and 30 below) have been successfully evaluated in the FEMA-GRAS process, declared to be "Generally Recognized As Safe."

The Compounds of the Invention as Savory Taste Enhancers

The amide compounds of Formula (I) and its various compound sub-geniuses and species, as described above are intended to be savory taste flavorant compounds or flavor modifiers for comestible or medicinal products. As is apparent from the teachings and Examples herein, many compounds of Formula (I) are agonists of an hT1R1/hT1R3 "savory" receptor, at least at relatively high amide compound concentrations, and accordingly many of the amide compounds of Formula (I) can have utility as savory flavorants or flavor enhancers, at least at relatively high concentrations.

Nevertheless, it is preferable to use as little of such artificial flavorants as possible, so as to minimize cost. Moreover, it is desirable to develop comestible compositions that do not have any "off-tastes" that may result if the compounds described above are used at unnecessarily high concentrations. Accordingly, it is desirable to test the compounds of Formula (I) for their effectiveness as taste receptor agonists at lower concentration levels, so as to identify the best and most effective amide compounds within the compounds of Formula (I). As was disclosed in WO 03/001876, and U.S. Patent Publication No. US 2003-0232407 A1, and as described hereinbelow, laboratory procedures now exist for measuring the agonist activities of compounds for hT1R1/hT1R3 "savory" receptors. Such measurement methods typically measure an "$EC_{50}$", i.e. the concentration at which the compound causes 50% activation of the relevant receptor.

Preferably, the amide compounds of Formula (I) that are savory flavor modifiers have an EC50 for the hT1R1/hT1R3 receptor of less than about 10 μM. More preferably, such amide compounds have an $EC_{50}$ for the hT1R1/hT1R3 receptor of less than about 5 μM, 3 μM, 2 μM, 1 μM, or 0.5 μM.

In some embodiments, the amide compounds of Formula (I) are savory flavor modulators or enhancers of the agonist activity of monosodium glutamate for an hT1R1/hT1R3 receptor. Hereinbelow is described an assay procedure for so-called $EC_{50}$ ratios, i.e. for dissolving a compound of Formula (I) in water containing MSG, and measuring the degree to which the amide compound lowers the amount of MSG required to activate 50% of the available hT1R1/hT1R$^3$ receptors. Preferably, the amide compounds of Formula (I), when dissolved in a water solution comprising about 1 μM of the amide compound will decrease the observed $EC_{50}$ of monosodium glutamate for an hT1R1/hT1R3 receptor expressed in an HEK293-Gα15 cell line by at least 50%, i.e. the amide compound will have an EC50 ratio of at least 2.0, or preferably 3.0, 5.0, or 7.0.

The above identified assays are useful in identifying the most potent of the amide compounds of Formula (I) for savory taste modifier or enhancer properties, and the results of such assays are believed to correlate well with actual savory taste perception in animals and humans, but ultimately the results of the assays can be confirmed, at least for the most potent of the compounds of Formula (I), by human taste testing. Such human taste testing experiments can be well quantified and controlled by tasting the candidate compounds in aqueous solutions, as compared to control aqueous solution, or alternatively by tasting the amides of the inventions in actual food compositions.

Accordingly, in order to identify the more potent of the savory taste modifiers or agents, a water solution comprising a savory flavor modifying amount of the amide compound should have a savory taste as judged by the majority of a panel of at least eight human taste testers.

Correspondingly, in order to identify the more potent of the savory taste enhancers, a water solution, comprising a savory flavor modifying amount of an amide compound of Formula (I) and 12 mM monosodium glutamate, would have an increased savory taste as compared to a control water solution comprising 12 mM monosodium glutamate, as determined by the majority of a panel of at least eight human taste testers. Preferably, in order to identify the more potent of the savory taste enhancers, a water solution comprising a savory flavor modifying amount (preferably about 30, 10, 5, or 2 ppm) of the amide compound of Formula (I) and 12 mM monosodium glutamate will have an increased savory taste as compared to a control water solution comprising 12 mM monosodium glutamate and 100 μM inosine monophosphate, as determined by the majority of a panel of at least eight human taste testers.

Moreover, as described hereinbelow, human taste testors have taste tested several of the amide and/or oxalamide compounds described above as formulated in model comestible formulations, and have typically reported that the modified comestible compositions do have the "savory, Umami" taste and/or mouth-watering characteristics characteristic of foods containing MSG, particularly if the amide and/or oxalamide compounds are well dispersed in the comestible composition, at concentrations of from about 0.1 to about 3 ppm, or from about 0.2 to about 2 ppm. Accordingly, when properly formulated and applied to appropriate comestible food and drinks novel, and favorable uses for the compounds described above include but are not limited to:

i. Intensified savory, meaty, and/or salty perceptions in flavor concentrate ingredients such as bases, stocks, seasoning mixes, autolyzed yeast extracts, and hydrolyzed vegetable proteins ii. Intensified and enhanced spice intensities in flavoring ingredients such as whole/ground/oleoresin extracts of various herbs and spices, iii. Increased flavor intensities of food acids such as acetic, citric, malic, tartaric, phosphoric acids, and iv. A novel savory dimensional flavor that intensifies kokumi flavor and the flavors of other hydrolyzed protein-based flavorants. Kokami is a Japanese word for the intensity and continuity of a savory flavor.

If however the amide and/or oxalamide compounds are not adequately dispersed in the composition, or concentrations of those compounds are too high, the savory flavor can "linger" longer than the taste of MSG, and metallic side tastes and/or a physical sensation of tingling can be perceptible. Such "off-tastes" can sometimes be masked, but to ensure consistency and homogeneity of the flavors, careful processing, formulation, and application of the compounds into diluted "user-friendly" flavor concentrate compositions, which can be easily handled and applied to traditional comestible compositions are among the inventions described herein. Such flavorant concentrate compositions can be either liquid or solid, or be composed of hydrophilic or hydrophobic flavor diluent components.

The savory amide and/or oxalamide compounds of the invention typically have at least some water solubility, so that for appropriate end use applications, simply dissolving the savory amide and/or oxalamide compounds in water can form an aqueous solution of the savory amide and/or oxalamide compounds and/or MSG, AYE, or HVP, or other desirable components. Nevertheless, higher concentrations of the savory amide and/or oxalamide compounds in savory flavorant concentrate compositions can often be achieved by dissolving the compounds and other components in comestibly acceptable organic solvents. Accordingly, in some aspects, the inventions relate to processes for preparing a liquid savory flavorant concentrate composition, comprising:

a) mixing in any order
   i) a liquid phase comprising one or more comestibly acceptable solvents selected from the group consisting of benzyl alcohol, triethyl citrate, benzyl benzoate, triacetin, glycerin, propylene glycol or a methyl or ethyl ether thereof or an acetate ester thereof,
   ii) monosodium glutamate or glutamic acid, and
   iii) one or more amide compounds having the formula

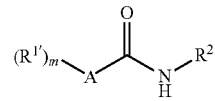

wherein
(1) A is a 5 or 6 membered aryl or heteroaryl ring,
(2) m is 0, 1, 2, 3 or 4,
(3) each $R^{1'}$ is independently selected from the group consisting of hydroxyl, $NH_2$, SH, halogen, and a $C_1$-$C_4$ organic radical, and
(4) $R^2$ has 3 to 15 carbon atoms and is a branched alkyl, a cycloalkyl ring, or a heterocyclic ring, optionally substituted with 1, 2, 3, or 4 substituent groups independently selected from the group consisting of hydroxyl, $NH_2$, SH, halogen, and a $C_1$-$C_4$ organic radical, or one or more comestibly acceptable salts thereof, to form a liquid savory flavorant concentrate composition comprising at least about 10 ppm of the one or more amide compounds or a comestibly acceptable salt thereof.

In related aspects, the inventions relate to processes for preparing a liquid savory flavorant concentrate composition, comprising:

a) mixing in any order
   i) a liquid phase comprising one or more comestibly acceptable solvents selected from the group consisting of benzyl alcohol, triethyl citrate, benzyl benzoate, triacetin, glycerin, propylene glycol or a methyl or ethyl ether thereof or an acetate ester thereof,
   ii) monosodium glutamate or glutamic acid, and one or more oxalamide compounds having the formula

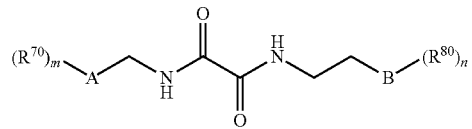

wherein
(1) A and B are independently an aryl, heteroaryl, cycloalkyl, or heterocycle comprising 5 to 12 ring atoms,
(2) m and n are independently 0, 1, 2, 3 or 4-8,
(3) $R^{70}$ and $R^{80}$ are independently selected from the group consisting of hydrogen, alkyl, alkoxyl, alkoxy-alkyl, OH, $SR^9$, halogen, CN, $NO_2$, $CO_2R^9$, $COR^9$, $CONR^9R^{10}$, $NR^9R^{10}$, $NR^9COR^{10}$, $SOR^9$, $SO_2R^9$, $SO_2NR^9R^{10}$, $NR^9SO_2R^{10}$, alkenyl, cycloalkyl, cycloalkenyl, aryl, heteroaryl, and heterocycle, and $R^9$ and $R^{10}$ are independently selected from H, $C_1$-$C_6$ alkyl, $C_3$-$C_6$ cycloalkyl, and $C_1$-$C_6$ alkenyl, or two of $R^{70}$ together form a methylenedioxy ring,
or one or more comestibly acceptable salts thereof
to form a liquid savory flavorant concentrate composition comprising at least about 10 ppm of the one or more oxalamide compounds or a comestibly acceptable salt thereof.

In many aspects, such liquid savory flavorant concentrate compositions can comprise higher concentrations of from about 10 ppm to about 10,000 ppm, from about 50 ppm to about 5,000 ppm, or from about 100 ppm to about 1000 ppm of the one or more amide or oxalamide compounds, or a comestibly acceptable salt thereof, and the molar ratio of the sum of the moles of the monosodium glutamate or glutamic acid divided by the sum of the moles of the one or more amide compounds is from about 5:1 to about 1000:1, or from about 10:1 to about 500:1, or from about 20:1 to about 300:1. In many aspects, the liquid savory flavorant concentrate composition further comprises water.

Moreover, as noted above, it has been unexpectedly discovered that in favorable applications involving liquid and/or semi-solid comestible compositions, the presence of the savory amide and/or oxalamide compounds described above can notably intensify the human perception of salt (sodium chloride), so as to enable the production of reduced sodium formulations of comestible compositions. Moreover, previously known reduced sodium formulations of comestible compositions substitute potassium chloride (KCl) for sodium chloride (NaCl), but the potassium chloride can, if used in increasing concentrations, introduce a metallic off-taste, an effect which Applicants have surprising discovered that the amide and/or oxalamide compounds can partially or completely mask. Accordingly, in some aspects, the inventions relate to a process for reducing sodium content in a savory soup, broth, bullion, sauce, or gravy comprising sodium chloride and monosodium glutamate by
a) reformulating an existing soup, broth, bullion, sauce, gravy or a precursor thereof to comprise at least about 0.01 ppm of an amide compound having the formula

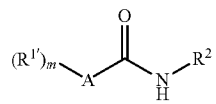

wherein
i) A is a 5 or 6 membered aryl or heteroaryl ring,
ii) m is 0, 1, 2, 3 or 4,
iii) each $R^1$ is independently selected from the group consisting of hydroxyl, $NH_2$, SH, halogen, and a $C_1$-$C_4$ organic radical, and
iv) $R^2$ has 3 to 15 carbon atoms and is a branched alkyl, a cycloalkyl ring, or a heterocyclic ring, optionally substituted with 1, 2, 3, or 4 substituent groups independently selected from the group consisting of hydroxyl, $NH_2$, SH, halogen, and a $C_1$-$C_4$ organic radical,
or one or more comestibly acceptable salts thereof,
b) and reducing the amount of one or more sodium salts added to the reformulated soup, broth, bullion, sauce, or gravy by at least about 5% as compared to the existing soup, broth, bullion, sauce, or gravy.

In related aspects, the inventions relate to a process for reducing sodium content in a savory soup, broth, bullion, sauce, or gravy comprising sodium chloride and monosodium glutamate by
i) reformulating an existing soup, broth, bullion, sauce, gravy or a precursor thereof to comprise at least about 0.01 ppm of one or more oxalamide compounds having the formula

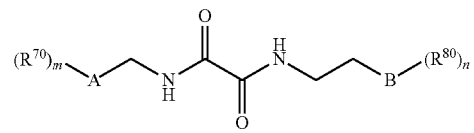

wherein
(1) A and B are independently an aryl, heteroaryl, cycloalkyl, or heterocycle comprising 5 to 12 ring atoms,
(2) m and n are independently 0, 1, 2, 3 or 4-8,
(3) $R^{70}$ and $R^{80}$ are independently selected from the group consisting of hydrogen, alkyl, alkoxyl, alkoxy-alkyl, OH, $SR^9$, halogen, CN, $NO_2$, $CO_2R^9$, $COR^9$, $CONR^9R^{10}$, $NR^9R^{10}$, $NR^9COR^{10}$, $SOR^9$, $SO_2R^9$, $SO_2NR^9R^{10}$, $NR^9SO_2R^{10}$, alkenyl, cycloalkyl, cycloalkenyl, aryl, heteroaryl, and heterocycle, and $R^9$ and $R^{10}$ are independently selected from H, $C_1$-$C_6$ alkyl, $C_3$-$C_6$ cycloalkyl, and $C_1$-$C_6$ alkenyl, or two of $R^{70}$ together form a methylenedioxy ring,
or one or more comestibly acceptable salts thereof;
b) and reducing the amount of one or more sodium salts added to the reformulated soup, broth, bullion, sauce, or gravy by at least about 5% as compared to the existing soup, broth, bullion, sauce, or gravy.

In such reformulation processes, the amount of sodium added to the soup, broth, bullion, sauce, or gravy comprising the amide compound can be reduced by at least about 10, or optionally 15, 20, 25, 30, 35, 40, 45, or 50% by weight, as compared to previously existing soup, broth, bullion, sauce, or gravy formulations, yet maintain good taste as perceived by humans. Ideally, the salt content of the reformulated soup, broth, bullion, sauce, or gravy is indistinguishable by taste from that of the previously existing soup, broth, bullion, sauce, or gravy as judged by a majority of a panel of at least eight human taste testers.

In other aspects the inventions relate to a process for preparing a solid flavorant concentrate composition, comprising:
a) providing one or more amide compounds having the formula

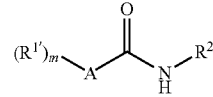

wherein
i) A is a 5 or 6 membered aryl or heteroaryl ring,
ii) m is 0, 1, 2, 3 or 4,
iii) each $R^1$ is independently selected from the group consisting of hydroxyl, $NH_2$, SH, halogen, and a $C_1$-$C_4$ organic radical, and
iv) $R^2$ has 3 to 15 carbon atoms and is a branched alkyl, a cycloalkyl ring, or a heterocyclic ring, optionally substituted with 1, 2, 3, or 4 substituent groups independently selected from the group consisting of hydroxyl, $NH_2$, SH, halogen, and a $C_1$-$C_4$ organic radical, or one or more comestibly acceptable salts thereof, and b) dissolving the one or more amide compounds or comestibly acceptable salts thereof in one or more comestibly acceptable liquids to form a flavorant solution;

c) contacting the flavorant solution with one or more comestibly acceptable solid carriers or a solution, dispersion, or emulsion thereof, to form an intermediate composition; and d) removing or permitting the loss of liquids from the intermediate composition so as to form a solid flavorant concentrate composition.

Similar aspects of the inventions relate to a process for preparing a solid flavorant concentrate composition, comprising:

a) providing one or more oxalamide compounds having the formula

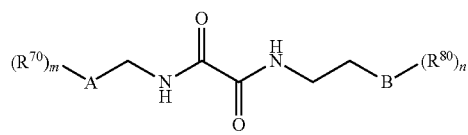

wherein
i) A and B are independently an aryl, heteroaryl, cycloalkyl, or heterocycle comprising 5 to 12 ring atoms,
ii) m and n are independently 0, 1, 2, 3 or 4-8,
iii) $R^{70}$ and $R^{80}$ are independently selected from the group consisting of hydrogen, alkyl, alkoxyl, alkoxyalkyl, OH, $SR^9$, halogen, CN, $NO_2$, $CO_2R^9$, $COR^9$, $CONR^9R^{10}$, $NR^9R^{10}$, $NR^9COR^{10}$, $SOR^9$, $SO_2R^9$, $SO_2NR^9R^{10}$, $NR^9SO_2R^{10}$, alkenyl, cycloalkyl, cycloalkenyl, aryl, heteroaryl, and heterocycle, and $R^9$ and $R^{10}$ are independently selected from H, $C_1$-$C_6$ alkyl, $C_3$-$C_6$ cycloalkyl, and $C_1$-$C_6$ alkenyl, or two of $R^{70}$ together form a methylenedioxy ring, or one or more comestibly acceptable salts thereof;

b) dissolving the one or more oxalamide compounds or comestibly acceptable salts thereof in one or more comestibly acceptable liquids to form a flavorant solution;

c) contacting the flavorant solution with one or more comestibly acceptable solid carriers or a solution, dispersion, or emulsion thereof, to form an intermediate composition; and d) removing or permitting the evaporation of liquids from the intermediate composition so as to form a solid flavorant concentrate composition.

In such processes, the amide or oxalamide compound having a highly potent flavoring effect is first diluted by dissolving it in one or more comestibly acceptable liquids to form a flavorant solution wherein the flavorant molecules are dispersed or dissolved to lower and homogeneous concentrations. Useful comestibly acceptable liquids for dispersing or dissolving the compounds include but are not limited to water, ethanol, propylene glycol, glycerin, triacetin, edible fats or oils comestibly acceptable glyceride triesters, benzyl alcohol, triethyl citrate, and benzyl benzoate.

The flavorant solution is then contacted with one or more comestibly acceptable solid carriers or a solution, dispersion, or emulsion thereof, to form an intermediate composition that can be optionally processed further to insure uniform distribution of the Umami compounds in the intermediate composition. Suitable solid carriers including edible polysaccharides such as natural or modified starches, vegetable flours, maltodextrin, gelatin type A, gelatin type B, polyphosphate, alginate, chitosan, carrageenan, pectin, starch, gum arabic, alfa-lactalbumin, beta-lactoglobumin, ovalbumin, polysorbitol, cyclodextrin, cellulose, methyl cellulose, ethyl cellulose, hydropropylmethylcellulose, carboxymethylcellulose, powdered milk, milk protein, whey protein, soy protein, canola protein, albumin, kosher gelatin, non-kosher gelatin, Halal gelatin, and non-Halal gelatin.

The further processing of the intermediate composition can comprise simple mixing processes or more complex and effective processes such as milling or homogenization. Any homogenization technique or apparatus known in the art can be used, and many suitable homogenizers are commercially available. Homogenization can involve the use of sonication, pressure, and/or mechanical devices to homogenize a fluid. For example, the homogenization can be a two-step or two-stage homogenization, a high pressure homogenization, a very-high pressure homogenization, a rotator-stator homogenization, a blade homogenization, and the like.

In some aspects, a homogenization step can be a pressure-based homogenization technique operating at pressures of from about 500 to about 12,000 psi, from about 1,000 to about 9,000 psi, or from about 3,000 to about 6,000 psi. In still other examples, the homogenization step can be performed at about 500, 1000, 1500, 2000, 2500, 3000, 3500, 4000, 4500, 5000, 5500, 6000, 6500, 7000, 7500, 8000, 8500, 9000, 9500, 10000, 10500, 11000, 11500, or 12000 psi, where any of the stated values can form an upper or lower endpoint when appropriate. Homogenization can be used to create uniform and/or smaller particle sizes, down to the order a micron or less.

After homogenization, the intermediate compositions can undergo further processing, such as being sterilized or pasteurized in solution, emulsion, or fluid dispersion form. Additional ingredients can also be added, such as monosodium glutamate, inosine monophosphate, guanosine monophosphate, autolyzed yeast extracts, hydrolyzed vegetable proteins, spices, stabilizers, buffers, anti-oxidants, and other conventional food additives and flavorings.

In the processes discussed above, after the intermediate composition has been processed to insure uniform dispersion of the amide or oxalamide compounds, removal of or loss of liquids from the intermediate composition is permitted, so as to form a solid flavorant concentrate composition that will be employed to flavor final comestible compositions. Such loss of liquids can be induced by heating or evaporation, or active removal of liquids by well known processes such as spray drying, to form the final solid flavorant concentrate composition. It must be noted however that the solid flavorant concentrate composition can retain some of the liquids (such as small amounts of water, fats, or oils) even when in "solid" form.

In many aspects of the invention, the one or more amide compounds are present in the solid flavorant concentrate composition in an amount of from about 100 to about 100,000 ppm, or alternatively 200 to 50,000, 500 to 30,000, 700 to 20,000, or from 1000 to about 10,000 ppm.

Special processing issues can be encountered with attempting to prepare lipophilic flavorant concentrate compositions comprising comestibly acceptable fats or oils, in which the amide and/or oxalamide compounds have limited solubility, and hence may be present in a solid form which is not easily dispersed. One solution to this problem is to mill or homogenize a mixture of the fats or oils and the particles of the amide or oxalamide compounds, so as to form a dispersion of microparticles. Accordingly, in some aspects, the inventions herein relate to a process for preparing a lipophilic savory flavorant concentrate composition, comprising:

a) contacting one or more comestibly acceptable fats or oils, and one or more amide compounds having the formula

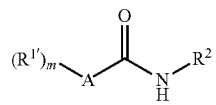

wherein
i) A is a 5 or 6 membered aryl or heteroaryl ring,
ii) m is 0, 1, 2, 3 or 4,
iii) each $R^1$ is independently selected from the group consisting of hydroxyl, $NH_2$, SH, halogen, and a $C_1$-$C_4$ organic radical, and
iv) $R^2$ has 3 to 15 carbon atoms and is a branched alkyl, a cycloalkyl ring, or a heterocyclic ring, optionally substituted with 1, 2, 3, or 4 substituent groups independently selected from the group consisting of hydroxyl, $NH_2$, SH, halogen, and a $C_1$-$C_4$ organic radical, or one or more comestibly acceptable salts thereof, to form a precursor flavorant mixture, and b) processing the precursor flavorant mixture to form a lipophilic savory flavorant concentrate composition wherein at least a major portion of the one or more amide compounds or comestibly acceptable salt thereof are present in the form of dispersed and undissolved microparticles.

In related aspects, the inventions relate to a process for preparing a lipophilic savory flavorant concentrate composition, comprising:

a) contacting one or more comestibly acceptable fats or oils, and one or more oxalamide compounds having the formula

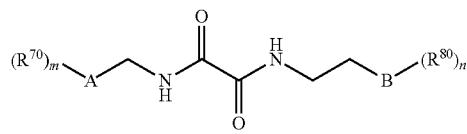

wherein
i) A and B are independently an aryl, heteroaryl, cycloalkyl, or heterocycle comprising 5 to 12 ring atoms,
ii) m and n are independently 0, 1, 2, 3 or 4-8,
iii) $R^{70}$ and $R^{80}$ are independently selected from the group consisting of hydrogen, alkyl, alkoxyl, alkoxyalkyl, OH, $SR^9$, halogen, CN, $NO_2$, $CO_2R^9$, $COR^9$, $CONR^9R^{10}$, $NR^9R^{10}$, $NR^9COR^{10}$, $SOR^9$, $SO_2R^9$, $SO_2NR^9R^{10}$, $NR^9SO_2R^{10}$, alkenyl, cycloalkyl, cycloalkenyl, aryl, heteroaryl, and heterocycle, and $R^9$ and $R^{10}$ are independently selected from H, $C_1$-$C_6$ alkyl, $C_3$-$C_6$ cycloalkyl, and $C_1$-$C_6$ alkenyl, or two of $R^{70}$ together form a methylenedioxy ring, or one or more comestibly acceptable salts thereof; to form a precursor flavorant mixture, and b) processing the precursor flavorant mixture to form a lipophilic savory flavorant concentrate composition wherein at least a major portion of the one or more amide compounds or comestibly acceptable salt thereof are present in the form of dispersed and undissolved microparticles.

In such processes, the processing step, normally comprises a mechanical step that reduces the size of the particles of the amide or oxalamide compound to desired size ranges of microparticles of the compound dispersed in the oil or fat. The desired size range of the microparticles as dispersed in the oil or fat will vary with the intended application, but in many applications the desired microparticles will have an average particle size of less than about 100, 50, 40, 30, 20, 10, 5, 2, or 1 μm.

Mixtures of Savory Compounds

It has been found the various samide and oxalamide compounds disclosed herein, while typically having very high individual potency as savory flavoring agents, also have somewhat differing solubilities, rapidity in inducing and degrees of lingering savory flavors, side-tastes, etc. Applicants have surprisingly discovered that the savory flavoring effect, or savory flavor enhancing effect, of the amide and/or oxalamide compounds of the invention can be improved by using mixtures of one or two or more savory compounds of the invention when formulating compositions.

Accordingly, in some embodiments, the invention relates to comestible compositions comprising a) a savory flavor modulating amount of one or more amide compounds having the formula

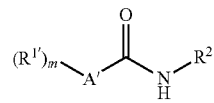

wherein
i) A' is a 5 or 6 membered aryl or heteroaryl ring,
ii) m is 0, 1, 2, 3 or 4,
iii) each $R^{1'}$ is independently selected from the group consisting of hydroxyl, $NH_2$, SH, halogen, and a $C_1$-$C_4$ organic radical, one or two of the $R^1$ substituent groups are bonded together to form a saturated alkylenedioxy ring and
iv) $R^2$ has 3 to 15 carbon atoms and is a branched alkyl, a cycloalkyl ring, or a heterocyclic ring, optionally substituted with 1, 2, 3, or 4 substituent groups independently selected from the group consisting of hydroxyl, $NH_2$, SH, halogen, and a $C_1$-$C_4$ organic radical, or one or more comestibly acceptable salts thereof; and b) a savory flavor modulating amount of one or more oxalamide compounds having the formula

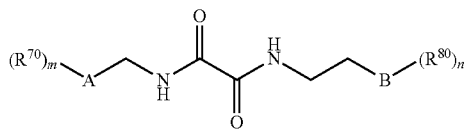

wherein for the one or more oxalamide compounds
  i) A and B are independently an aryl, heteroaryl, cycloalkyl, or heterocycle comprising 5 to 12 ring atoms,
  ii) m and n are independently 0, 1, 2, 3 or 4-8,
  iii) $R^{70}$ and $R^{80}$ are independently selected from the group consisting of hydrogen, alkyl, alkoxyl, alkoxyalkyl, OH, $SR^9$, halogen, CN, $NO_2$, $CO_2R^9$, $COR^9$, $CONR^9R^{10}$, $NR^9R^{10}$, $NR^9COR^{10}$, $SOR^9$, $SO_2R^9$, $SO_2NR^9R^{10}$, $NR^9SO_2R^{10}$, alkenyl, cycloalkyl, cycloalkenyl, aryl, heteroaryl, and heterocycle, and $R^9$ and $R^{10}$ are independently selected from H, $C_1$-$C_6$ alkyl, $C_3$-$C_6$ cycloalkyl, and $C_1$-$C_6$ alkenyl, or two of $R^{70}$ together form a methylenedioxy ring, or one or more comestibly acceptable salts thereof.

In such compositions comprising both amide and oxalamide compounds, in many embodiments the compositions further comprise monosodium glutamate (MSG). In such compositions, the combination of the amide and oxalamide compounds can enhance the savory flavor of the MSG present, so that less MSG and/or it's associated sodium ions are necessary to achieve the desired level of savory flavoring effect, while providing for a healthier comestible composition.

In such compositions comprising both amide and oxalamide compounds, the composition can comprise from about 0.1 to about 3 ppm, or from about 0.2 to about 1 ppm of the one or more amide compounds, and from about 0.1 to about 3 ppm, or from about 0.2 to about 1 ppm of the one or more oxalamide compounds. In some embodiments, the total of the amide and oxalamide compounds is from about 0.2 to about 3 ppm, or from about 0.5 to about 1.0 ppm. The amide and oxalamide compounds may be present in any molar or weight ratio, but in many embodiments the oxalamide to amide weight ratios are from about 1:1 to about 1:6, or from about 1:2 to about 1:4.

The comestible compositions comprising the mixture of one or more amide compounds and one or more oxalamide compounds can be any of the large variety of classes, subclasses and species of comestible compositions described hereinbelow, but in some desirable embodiments, the comestible composition is a bullion, broth, or soup; or a sauce or condiment; or a vegetable or tomato juice, or a salad dressing or mayonnaise; or a savory seasoning composition, or a battered fried food.

The comestible compositions comprising the mixture of one or more amide compounds and one or more oxalamide compounds can also be a flavor concentrate composition. Such flavor concentrate compositions may or may not comprise MSG, and can comprise from about 10 to about 10,000 ppm of the one or more amide or oxalamide compounds. Such flavor concentrate composition can be a liquid composition, or a solid composition.

In some embodiments, the comestible compositions comprising the mixture of one or more amide compounds and one or more oxalamide compounds comprise an amide compound having the formula

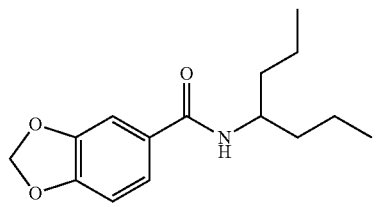 [SMILES: CCCC(CCC)NC(=O)c1ccc2c(c1)OCO2]

and an oxalamide compound have the formula

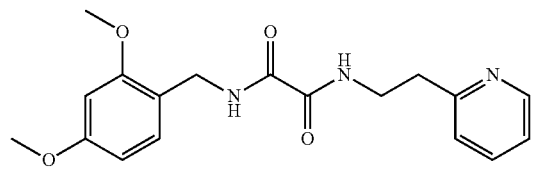 [SMILES: COc1ccc(CNC(=O)C(=O)NCCc2ccccn2)c(OC)c1]

Using the Compounds of Formula (I) to Prepare Comestible Compositions

Flavors, flavor modifiers, flavoring agents, flavor enhancers, savory ("umami") flavoring agents and/or flavor enhancers, according to the invention have application in foods, beverages and medicinal compositions wherein savory compounds are conventionally utilized. These compositions include compositions for human and animal consumption. This includes foods for consumption by agricultural animals, pets and zoo animals.

Those of ordinary skill in the art of preparing and selling comestible compositions (i.e edible foods or beverages, or precursors or flavor modifiers thereof) are well aware of a large variety of classes, subclasses and species of the comestible compositions, and utilize well-known and recognized terms of art to refer to those comestible compositions while endeavoring to prepare and sell various of those compositions. Such a list of terms of art is enumerated below, and it is specifically contemplated hereby that the various subgenuses and species of the compounds of Formula (I) could be used to modify or enhance the savory of the following list comestible compositions, either singly or in all reasonable combinations or mixtures thereof:

Bread, pastries, cakes, packaged/industrial cakes, unpackaged/artisanal cakes, cookies, chocolate coated biscuits, sandwich biscuits, filled biscuits, savoury biscuits and crackers, bread substitutes, breakfast cereals, rte cereals, family breakfast cereals, flakes, muesli, other rte cereals, children's breakfast cereals, hot cereals, dairy products, milk, fresh/pasteurised milk, full fat fresh/pasteurised milk, semi skimmed fresh/pasteurised milk, long-life/uht milk, full fat long life/uht milk, semi skimmed long life/uht milk, fat-free long life/uht milk, goat milk, condensed/evaporated milk, plain condensed/evaporated milk, flavoured, functional and other condensed milk, flavoured milk drinks, dairy only flavoured milk drinks, flavoured milk drinks with fruit juice, soy milk, sour milk drinks, fermented dairy drinks, coffee whiteners, powder milk, flavoured powder milk drinks, cream, cheese, processed cheese, spreadable processed cheese, unspreadable processed cheese, unprocessed cheese, spreadable unprocessed cheese, hard cheese, packaged hard cheese, unpackaged hard cheese, yoghurt, plain/natural yoghurt, flavoured yoghurt, fruited yoghurt, probiotic yoghurt, drinking yoghurt, regular drinking yoghurt, probiotic drinking yoghurt, chilled snacks, fromage frais and quark, plain fromage frais and quark, flavoured fromage frais and quark, savoury fromage frais and quark, sweet and savoury snacks, fruit snacks, chips/crisps, extruded snacks, tortilla/corn chips, popcorn, pretzels, nuts, other sweet and savoury snacks, snack bars, granola bars, breakfast bars, energy bars, fruit bars, other snack bars, meal replacement products, slimming products, convalescence drinks, ready meals, canned ready meals, frozen ready meals, dried ready meals, chilled ready meals, dinner mixes, frozen pizza, chilled pizza, soup, canned soup, dehydrated soup, instant soup, chilled soup, uht soup, frozen soup, pasta, canned pasta, dried pasta, chilled/fresh pasta, noodles, plain noodles, instant noodles, cups/bowl instant noodles, pouch instant noodles, chilled noodles, snack noodles, canned food, canned meat and meat products, canned fish/seafood, canned vegetables, canned tomatoes, canned beans, canned fruit, canned ready meals, canned soup, canned pasta, other canned foods, frozen food, frozen processed red meat, frozen processed poultry, frozen processed fish/seafood, frozen processed vegetables, frozen meat substitutes, frozen potatoes, oven baked potato chips, other oven baked potato products, non-oven frozen potatoes, frozen bakery products, frozen desserts, frozen ready meals, frozen pizza, frozen soup, frozen noodles, other frozen food, dried food, dessert mixes, dried ready meals, dehydrated soup, instant soup, dried pasta, plain noodles, instant noodles, cups/bowl instant noodles, pouch instant noodles, chilled food, chilled processed meats, chilled fish/seafood products, chilled processed fish, chilled coated fish, chilled smoked fish, chilled lunch kit, chilled ready meals, chilled pizza, chilled soup, chilled/fresh pasta, chilled noodles, oils and fats, olive oil, vegetable and seed oil, cooking fats, butter, margarine, spreadable oils and fats, functional spreadable oils and fats, sauces, dressings and condiments, tomato pastes and purees, bouillon/stock cubes, stock cubes, gravy granules, liquid stocks and fonds, herbs and spices, fermented sauces, soy based sauces, pasta sauces, wet sauces, dry sauces/powder mixes, ketchup, mayonnaise, regular mayonnaise, mustard, salad dressings, regular salad dressings, low fat salad dressings, vinaigrettes, dips, pickled products, other sauces, dressings and condiments, baby food, milk formula, standard milk formula, follow-on milk formula, toddler milk formula, hypoallergenic milk formula, prepared baby food, dried baby food, other baby food, spreads, jams and preserves, honey, chocolate spreads, nut-based spreads, and yeast-based spreads.

Preferably, the compounds of Formula (I) can be used to modify or enhance the savory flavor of one or more of the following sub-genuses of comestible compositions: confectioneries, bakery products, dairy products, sweet and savory snacks, snack bars, meal replacement products, ready meals, soups, pastas, noodles, canned foods, frozen foods, dried foods, chilled foods, oils and fats, baby foods, or spreads, or a mixture thereof. Among the more favored sub-genera of food compositions are the comestible compositions listed in the following table:

| Product Usage | Sensory and flavor attributes |
| --- | --- |
| Bouillon, Broths, Soups, Ramen Noodles | Umami flavor, MSG flavor characteristics and enhancement of savory, brothy and meat flavors. |
| Low Sodium Broth, Soups | Umami flavor, enhancement of savory, brothy and meat flavors; diminishment of KCl off-tastes such as bitter and metallic notes. |
| Savory sauces such as tomato based, gravy, cheeses, soy sauce based, condiments | Intensified savory, spice flavors, cheese flavors; umami and MSG flavor characteristics; blending and rounding of all flavors. |
| Vegetable and tomato juices | Savory, umami, mouth-watering flavor enhancements, reduced tartness |
| Salad Dressings and Mayonnaise | Cheese or ranch type flavors, acid flavor is diminished and savory flavor blends. Mayonnaise and high acid type dressings and the acid flavor is intensified along with savory, umami flavor qualities. |
| Side dishes: Battered French fries, fried appetizers, rice and potato sides | Umami, savory and mouth-watering flavor. Intensified spice and savory flavors. Rounded flavor characteristics, increased perceptions of salt or sodium. |
| Savory topical seasonings for snack foods and French fries, etc. | Umami, savory and mouth-watering flavors. Intensified spices and savory flavors. Rounded flavor characteristics. |
| Meat, Poultry, Seafood seasonings and marinades | Umami, savory and mouth-watering flavors. Intensified spices and savory flavors. Rounded flavor characteristics. |

In general an ingestible composition will be produced that contains a sufficient amount of at least one compound within the scope of Formula (I) or its various subgenuses described hereinabove to produce a composition having the desired flavor or taste characteristics such as "savory" taste characteristics.

Typically at least a savory flavor modulating amount, a savory flavoring agent amount, of one or more of the compounds of Formula (I), or the savory flavorant concentrate compositions described herein will be added to the comestible or medicinal product, so that the savory modified comestible or medicinal product has an increased savory and/or sweet taste as compared to the comestible or medicinal product prepared without the amide compound, as judged by human beings or animals in general, or in the case of formulations testing, as judged by a majority of a panel of at least eight human taste testers, via procedures described elsewhere herein.

The concentration of savory or sweet flavoring agent needed to modulate or improve the flavor of the comestible or medicinal product or composition will of course vary dependent on many variables, including the specific type of ingestible composition, what savory compounds are present and the concentrations thereof, and the effect of the particular compound on such savory compounds. As noted, a significant application of the compounds of Formula (I) is for modulating (inducing, enhancing or inhibiting) the savory or sweet tastes or other taste properties of other natural or synthetic savory tastants. A broad but also low range of concentrations of the amide compounds of Formula (I) would typically be required, i.e. from about 0.001 ppm to 100 ppm, or narrower alternative ranges from about 0.1 ppm to about 10 ppm, from about 0.01 ppm to about 30 ppm, from about 0.05 ppm to about 15 ppm, from about 0.1 ppm to about 5 ppm, or from about 0.1 ppm to about 3 ppm.

Examples of foods and beverages wherein compounds according to the invention may be incorporated include by way of example the Wet Soup Category, the Dehydrated and Culinary Food Category, the Beverage Category, the Frozen Food Category, the Snack Food Category, and seasonings or seasoning blends.

"Wet Soup Category" means wet/liquid soups regardless of concentration or container, including frozen Soups. For the purpose of this definition soup(s) means a food prepared from meat, poultry, fish, vegetables, grains, fruit and other ingredients, cooked in a liquid which may include visible pieces of some or all of these ingredients. It may be clear (as a broth) or thick (as a chowder), smooth, pureed or chunky, ready-to-serve, semi-condensed or condensed and may be served hot or cold, as a first course or as the main course of a meal or as a between meal snack (sipped like a beverage). Soup may be used as an ingredient for preparing other meal components and may range from broths (consommé) to sauces (cream or cheese-based soups).

"Dehydrated and Culinary Food Category" means: (i) Cooking aid products such as: powders, granules, pastes, concentrated liquid products, including concentrated bouillon, bouillon and bouillon like products in pressed cubes, tablets or powder or granulated form, which are sold separately as a finished product or as an ingredient within a product, sauces and recipe mixes (regardless of technology); (ii) Meal solutions products such as: dehydrated and freeze dried soups, including dehydrated soup mixes, dehydrated instant soups, dehydrated ready-to-cook soups, dehydrated or ambient preparations of ready-made dishes, meals and single serve entrees including pasta, potato and rice dishes; and (iii) Meal embellishment products such as: condiments, marinades, salad dressings, salad toppings, dips, breading, batter mixes, shelf stable spreads, barbecue sauces, liquid recipe mixes, concentrates, sauces or sauce mixes, including recipe mixes for salad, sold as a finished product or as an ingredient within a product, whether dehydrated, liquid or frozen.

"Beverage Category" means beverages, beverage mixes and concentrates, including but not limited to, alcoholic and non-alcoholic ready to drink and dry powdered beverages.

Other examples of foods and beverages wherein compounds according to the invention may be incorporated included by way of example carbonated and non-carbonated beverages, e.g., fruit or vegetable juices, alcoholic and non-alcoholic beverages, confectionery products, e.g., salad dressings, and other condiments, cereal, and other breakfast foods, canned fruits and fruit sauces and the like.

Additionally, the subject compounds can be used in flavor preparations to be added to foods and beverages. In preferred instances the composition will comprise another flavor or taste modifier such as a savory tastant.

The amide compounds of Formula (I) and its various sub-genuses can be combined with or applied to the comestible or medicinal products or precursor thereof in any of innumerable ways known to cooks the world over, or producers of comestible or medicinal products. For example, the amide compounds of Formula (I) could be dissolved in or dispersed in or one of many comestibly acceptable liquids, solids, or other carriers, such as water at neutral, acidic, or basic pH, fruit or vegetable juices, vinegar, marinades, beer, wine, natural water/fat emulsions such as milk or condensed milk, edible oils and shortenings, fatty acids, certain low molecular weight oligomers of propylene glycol, glyceryl esters of fatty acids, and dispersions or emulsions of such hydrophobic substances in aqueous media, salts such as sodium chloride, vegetable flours, solvents such as ethanol, solid edible diluents such as vegetable powders or flours, and the like, and then combined with precursors of the comestible or medicinal products, or applied directly to the comestible or medicinal products.

Other techniques of food preparation and/or flavorant application can be used to formulate the compounds of the invention to prepare comestible composition. In "dry blending" particles the high potency savory compounds of the inventions, or solid flavor concentrate compositions thereof are simply mixed as solids with other flavoring ingredients and/or carriers or diluents, to hopefully produce a homogenous flavor powder. The carriers or diluents are well known in the art, such as maltodextrin, modified food starch, various hydrocolloid gums such as gum acacia, gum Arabic, etc, or salt or sugar can be used alone or in combination. Properly formulated dry blended compositions should not separate, stratify, or segregate particles, which can cause flavor inhomogeneity or inconsistency.

In another example, solid flavorant concentrate compositions can be prepared by a process of agglomeration, which can also be referred to as fluid bed processing. In this process the compounds of the invention or concentrate compositions thereof are spray coated as solid particles onto diluent or carrier core material particles (such as edible polysaccharides, starches, etc) suspended in a column of moving air at controlled temperatures and humidity. The movement of the particles from the bottom of the chamber through the aerosol to the top of the chamber is random and produces a uniform coating of the compounds of the invention on the core material. The particles coalesce to form porous agglomerates. The finished product is removed from the chamber, and often put through a final drying step and cooling procedure prior to packaging. The final agglomerate material is a matrix of pores, crystallization, coagulation and or polymerization. The resulting coarse particles can induce flavor effects such as flavor masking, varied time release of flavor or delayed flavor release to reduce any 'umami lingering' of the compounds described herein, and/or match the umami flavor release to match the time/intensity and flavor release of MSG.

Another technique for modifying the flavor release characteristics of the compounds described herein is the technique of non-thermal flavor infusion and complexing. In this technique, the compounds described herein are processed so that they become complexed by a modified food starch, typically a beta cyclodextrin. The savory compound of the invention is complexed by the ring structure of the modified starch, to modify the rate and extent of flavor release or specific flavor delivery. Various methods can be used to complexing a cyclodextrin and the compounds of the invention. Typically a high shear mixer or shaker is used to solubilize the compound of the inventions and the cyclodextring into an aqueous solution (typically 20-40% water) then filtering off the resulting precipitated complex. The resulting paste may be used as is, or it can be dried and or ground to a powder form. The aqueous paste can be dried using conventional hot air ovens, spray dryers, vacuum dryers, freeze dryers and or agglomerators. More frequently employed methods of drying the agglomerates is freeze drying or vacuum drying at comparatively lower drying temperatures of 140-185° F. An alternative method is to blend the solid cyclodextrin with flavor molecules in a kneading application. This forms a solid water/flavor molecule water paste. This also can be used or further dried and ground into a powder form. This technology can reduce or increase the 'umami lingering' (dependent upon consumer liking and preference) and/or improve the umami flavor release to match the time/intensity and flavor release of MSG, or to provide for controlled flavor delivery in various food formulations.

The liquid flavor concentrate compositions of the invention are often prepared using the technique of Liquid Flavor Compounding, which involves attempting to "load" the flavor concentrate with as much of the savory compounds as possible while reducing the water content as much as possible in the liquid flavor concentrate composition.

Making The Amide Compounds of Formula (I)

The starting materials used in preparing the compounds of the invention, i.e. the various structural subclasses and species of the amide compounds of Formula (I) and their synthetic precursors, as well as methods for making the compounds described above are disclosed in U.S. Patent Publication No. US 2005/0084506 A1 and U.S. Patent Publication No. US 2006/0045953 A1, incorporated herein by reference, or as described below.

Synthetic Methods

The following Schemes and Examples are provided for the guidance of the reader, and represent a variety of methods for making the amide compounds disclosed herein. The disclosed methods are exemplary only, not limiting, and it will be apparent to one or ordinary skill in the art that other methods, many of which are known in the art, may be employed to prepare the amide compounds of the various embodiments of the invention. Such methods specifically include solid phase based chemistries, including combinatorial chemistry.

Amides are often prepared by the condensation of carboxylic acids and/or their derivatives (such as esters, acid halides etc) with primary or secondary amines, often in the presence of dehydrating agents, coupling agents, and/or appropriate catalysts. Large numbers of suitable starting materials, such as primary and secondary amines, and carboxylic acids and their derivatives, can be readily synthesized by methods known in the literature or are readily available commercially. In some cases, methods for synthesis of certain amine or carboxylic acid starting materials are given below.

Scheme 1a

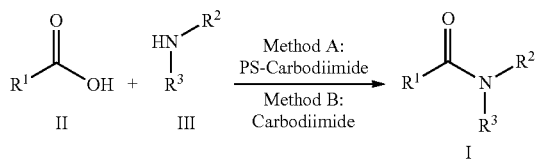

As shown in Scheme 1a, amide derivatives (I) can be prepared from the coupling of acid derivatives (II) with amines (III), for example in the presence of a coupling reagent such as 1-ethyl-3-(3-dimethylaminopropyl)-carbodiimide hydrochloride and a base. In Method A, a polymer supported (PS) carbodiimide is used. Method B uses a non-polymer supported carbodiimide.

Scheme 1b-Alternative Method for Preparing Amides

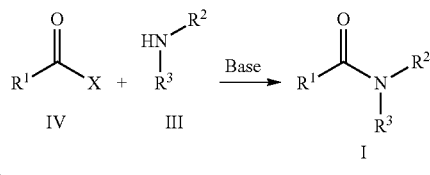

X = halide

As shown in Scheme 1b, amide derivatives (I) are alternatively prepared from the coupling of acid halides, esters, or anhydrides (IV) with amines (III) in the presence of a base.

For example, the compound of Example 1 shown below can be prepared and then purified by the procedures shown in Examples 1 and 1-1.

In related aspects, the inventions disclosed herein include a process for preparing the compound of Example 1, i.e. 2-H-benzo[3,4-d]1,3-dioxolan-5-yl-N-(propylbutyl)-carboxamide having the formula:

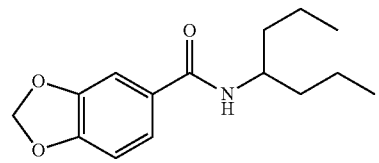 [SMILES: CCCC(CCC)NC(=O)c1ccc2c(c1)OCO2]

The improved process provides several improvements over the original laboratory procedure by taking advantage of a number of surprising discoveries which will be discussed herein below in detail.

The process comprises:

a) reacting piperonylic acid having the formula:

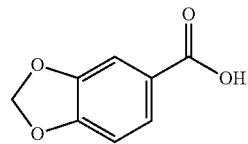 [SMILES: O=C(O)c1ccc2c(c1)OCO2]

with a reagent capable of reacting with the carboxylic acid to forming an acid chloride, such reagents include but are not limited to thionyl chloride, oxalyl chloride, and phosphorous oxychloride to form piperonoyl chloride having the formula:

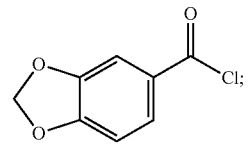 [SMILES: O=C(Cl)c1ccc2c(c1)OCO2]

and b) reacting piperonoyl chloride formed in step (a) with 4-heptylamine having the formula:

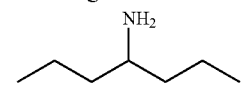

to form 2-H-benzo[3,4-d]1,3-dioxolan-S-yl-N-(propylbutyl)-carboxamide.

Step (a)

Step (a) relates to the formation of piperonoyl chloride from piperonylic acid. The piperonylic acid starting material is readily available from manufacturers, for example, Alfa Aesar GmbH & Co. KG®, Alfa Aesar A Johnson Matthey Company®, and Alfa Aesar Johnson Matthey Plc®.

Step (a) utilizes a reagent capable of reacting with a carboxylic acid to form an activate carbonyl group in the form of an acid chloride. Non-limiting reagents with are suitable for this step include reagents comprising thionyl chloride, oxalyl chloride, and phosphorous oxychloride, or mixtures thereof.

To catalyze the formation of the acid chloride a small or catalytic amount of a reagent such as dimethylformamide can be used to increase reaction rates and yield of the acid chloride.

The reaction may also be conducted in the presence of a solvent, non-limiting examples of which include a solvent chosen from methylene chloride, chloroform, and tetrahydrofuran.

In some embodiments, step (a) comprises one or more of the further steps of:
i) combining piperonylic acid, methylene chloride and dimethylformamide to form a liquid admixture;
ii) cooling the admixture to about 0° C. to form a cooled admixture;
iii) adding said reagent capable of forming an acid chloride to said cooled admixture at or below a temperature of about 10° C. to form a reaction mixture; or
iv) heating to reflux said reaction mixture after the addition of said acid chloride forming reagent to form a solution of piperonoyl chloride.

Step (a)(i) relates to the use of methylene chloride as a solvent and the additional use of dimethylformamide as a catalyst for the formation of piperonoyl chloride.

Step (a)(ii) relates to the reaction step wherein the admixture formed in step (a)(i) is pre-cooled to about 0° C. prior to the addition of the acid chloride forming reagent.

Step (a)(iii) relates to the iteration wherein the acid chloride forming reagent is thionyl chloride and it is added at or below a temperature of about 10° C.

Step (a)(iv) relates to the fact the formulator also has the choice of heating, to reflux the reaction mixture formed in step (a)(iii) after the addition of thionyl chloride to insure complete formation of piperonoyl chloride.

Step (a) may also be conducted in the presence of an organic base as described herein above for the purpose of acting as an acid sponge. Many tertiary amines are suitable, and triethylamine is a readily available, inexpensive, and safely utilized organic base which has been found to be compatible with the process of the present invention.

Step (b)

Step (b) relates to the formation of the final product 2-H-benzo[3,4-d]1,3-dioxolan-5-yl-N-(propylbutyl)-carboxamide, and comprises reacting piperonoyl chloride formed in step (a) with 4-heptylamine. 4-aminoheptane is readily available commercially.

In some embodiments, step (b) comprises:
i) combining 4-heptylamine, triethylamine, methylene chloride, and dimethylformamide to form a solution of 4-heptylamine;
ii) adding to the piperonoyl chloride to said solution of 4-heptylamine at a temperature below about 5° C., to form a reaction mixture; and
iii) warming the reaction mixture to a temperature from about 20° C. to about 25° C. to form a crude reaction solution comprising 2-H-benzo[3,4-d]1,3-dioxolan-5-yl-N-(propylbutyl)-carboxamide.

Step (b)(i) relates to the use of methylene chloride as a solvent and the additional use of dimethylformamide as a catalyst for the formation of the final product.

Step (b)(ii) relates to one iteration of the reaction step wherein piperonoyl chloride is added to the solution formed in step (b)(i) at a temperature below about 5° C.

Step (b)(iii) relates to the iteration wherein the formulator can warm the solution, for example to a temperature from about 20° C. to about 25° C. to insure completeness of the reaction.

However, the formulator can choose to add further steps to step (b), for example,
iv) cooling the crude reaction solution obtained in step (b)(iii) to a temperature of from about 0° C. to about 5° C. and adding water to form a biphasic solution;
v) working up said biphasic solution by removing the aqueous phase and treating the resulting organic phase with the following solutions in the order of:
1. an aqueous solution of hydrochloric acid having a normality of from about 0.1 N to about 2.0 N;
2. a saturated aqueous solution of sodium bicarbonate; and
3. a saturated aqueous solution of sodium chloride; to form a solution of 2-H-benzo[3,4-d]1,3-dioxolan-5-yl-N-(propylbutyl)-carboxamide;
vi) removing the organic phase to form crude 2-H-benzo[3,4-d]1,3-dioxolan-5 yl-N-(propylbutyl)-carboxamide; and
vii) forming a slurry of the crude 2-H-benzo[3,4-d]1,3-dioxolan-5-yl-N-(propylbutyl)-carboxamide and isolating by filtration 2-H-benzo[3,4-d]1,3-dioxolan-5-yl-N-(propylbutyl)-carboxamide.

These workup steps will, depending upon the needs of the formulator, provide a procedure for isolation of the desired product.

Scheme 1c. Preparation of Oxalamides

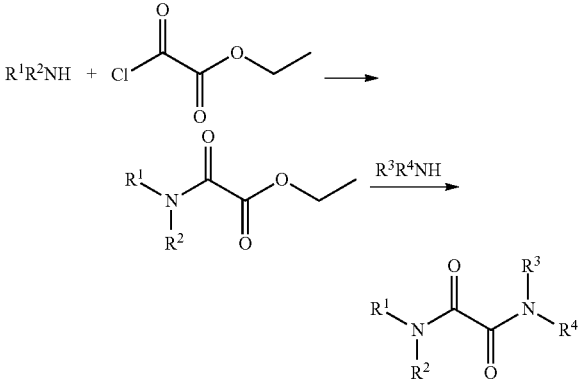

As a general procedure, one amine is allowed to react with ethyl oxalyl chloride in the presence of tertiary amine in organic solvent, such as dioxane, acetonitrile, tetrahydrofuran, tetrahydropyran, and dimethylformamide, at room temperature for 0.5-2 hours. Then the second amine is added and the suspension is heated at 80° C. using oil bath overnight or at 160° C. in a microwave reactor for 5 minutes. The reaction mixture can be subject to preparative HPLC, or an aqueous work-up and the crude product can typically be readily purified by recrystallization, flash column chromatography, or other methods well known to those of ordinary skill in the art to afford the pure oxalamide.

A very wide variety of carboxylic acid derivatives that are suitable precursors of the $R^1$ groups of the amides of Formulas (I), and various subgenuses of the compounds of Formula (I) are readily available by methods or ready adaptation of methods known in the prior art, or are available commercially. In particular, the substituted aryl or heteroaryl carboxylic acid compounds that are precursors of the compounds of Formula (II) are often readily available commercially, or through use of very well known synthetic methodologies. Similarly, many amine compounds that are suitable precursors of the amide compounds of Formula (I) are readily available commercially or through known methods of synthesis. Nevertheless, disclosed in the Schemes and/or Examples below are methods for synthesizing certain starting building block precursors of the $R^1$, $R^2$, and $R^3$ groups.

In some aspects, the inventions relate to improved methods of synthesizing the oxalamide compounds described above, and their synthetic precursors.

In some embodiments, the inventions disclosed herein relate to a process for preparing N-(2,4-dimethoxybenzyl)-N'-[2-(pyridin-2-yl)ethyl]oxalamide having the formula:

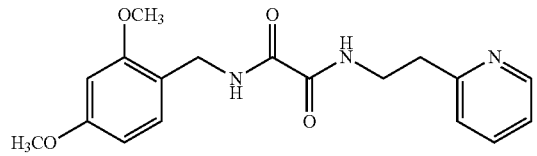 [SMILES: COc1ccc(CNC(=O)C(=O)NCCc2ccccn2)c(OC)c1]

N-(2,4-Dimethoxybenzyl)-N'[2-(pyridin-2-yl)ethyl]oxalamide is a new FEMA-GRAS approved high intensity savory compound that can substitute for or significantly enhance the savory flavor of monosodium glutamate (MSG). The process disclosed here provides several improvements over the known laboratory procedures by taking advantage of a number of surprising discoveries which will be discussed herein below in detail.

In some embodiments, the improved processes comprise:
a) condensing 2,4-dimethoxybenzylamine or a salt thereof with a 2-chloro-2-oxoacetate ester having the formula:

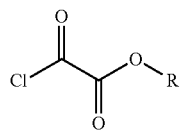

in the presence of a tertiary amine base and a solvent or solvent mixture or aromatic solvents comprising one or more of toluene, o-xylene, m-xylene, p-xylene, or nitrobenzene, to form a solution of a 2-(2,4-dimethoxybenzylamino)-2-oxoacetate ester having the formula:

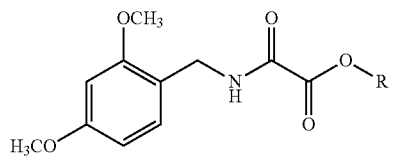

wherein R is $C_1$-$C_4$ linear or branched alkyl; and
b) reacting the solution of the 2-(2,4-dimethoxybenzylamino)-2-oxoacetate ester formed in step (a) with 2-(pyridin-2-yl)ethylamine having the formula:

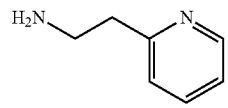

to form N-(2,4-dimethoxybenzyl)-N'[2-(pyridin-2-yl) ethyl]oxalamide.

Step (a)

Step (a) relates to the formation of a 2-(2,4-dimethoxybenzylamino)-2-oxoacetate ester having the formula:

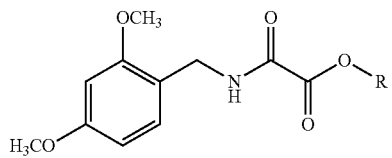

wherein R is $C_1$-$C_4$ linear or branched alkyl. The formulator dealing with large scale processes will appreciate that the large scale synthesis of a molecule entails many considerations, as well as variables. One important factor is the availability of starting materials. The process of the present invention makes use of 2-chloro-2-oxoacetate esters having the formula:

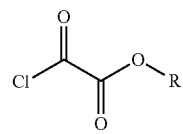

wherein R is a $C_1$-$C_4$ linear or branched alkyl group. This material may be prepared by procedures well known to those of ordinary skill in the art by procedures from readily available starting materials, inter alia, oxalyl chloride and corresponding alcohols; methanol, ethanol, tert-butanol and the like. These reagents have the further advantage that they can be prepared as needed or can be stored for later use. Example 1 herein below utilizes ethyl 2-chloro-2-oxoacetate.

2,4-Dimethoxybenzylamine is conveniently stored as a salt, for example, as an ammonium salt, inter alia, the hydrochloride and the hydrobromide, which (in contrast to the free amine form), are oxidatively stable crystalline solids with long shelf life. In addition, 2,4-dimethoxybenzylamine hydrochloride is readily available as a starting material, for example, from Fisher Scientific® (Catalogue No. AC17651-0050).

The choice of solvent, however, as in the case of the present invention, is important. As a general rule of thumb, for every ten degrees rise in reaction temperature, the reaction rate is doubled. Although many other factors may mitigate the actual increase in reaction rate over a particular temperature range, all things being equal, increasing the temperature favors faster, more complete, and more productive chemical reactions. The present invention discloses the surprising finding that aromatic solvent mixtures, which are high boiling and immiscible with water can be used to provide higher rates and productivity, as well as easy subsequent product processing by extraction. When the first step of the reaction is conducted in a solvent or solvent mixture comprising one or more of toluene, o-xylene, m-xylene, p-xylene, nitrobenzene, especially toluene, the reaction through put is enhanced, and the resulting solutions can be readily processed downstream.

The choice of one of these solvents or mixtures of solvents also improves the separation of the organic and aqueous phases if the formulator chooses to isolate and/or purify the product formed in step (a) by extraction. In particular, toluene can be obtained in high purity and at low cost from a wide range of suppliers and can also be used to azeotropically remove any water which may persist after any optional drying step.

Although the 2,4-dimethoxybenzylamine can be used as a free base, step (a) can be conducted in the presence of an organic base for several purposes, inter alia, to liberate the 2,4-dimethoxybenzylamine from its hydrochloride salt or to act as a sponge for any acid formed in the reaction. Any non-reactive tertiary organic base capable of coordination of the liberated acid is acceptable. Trialkylamines, trialkoxyamines, or heteroaromatic amines are particularly suitable. Non-limiting examples of trialkyl amines include triethylamine, diisopropylethylamine, and methyldiisopropylamine. A non-limiting example of a trialkoxyamine includes triethanolamine. Non-limiting examples of heteroaromatic amines includes pyridine and lutidine. Other non-nucleophilic amines, inter alia, 1,8-diazabicyclo[5.4.0]undec-7-ene are also suitable for use in the process of the present invention. Triethylamine is a readily available, inexpensive, and safely utilized organic base which has been found to be compatible with the process of the present invention.

In one embodiment, the process for preparing N-(2,4-dimethoxybenzyl)-N'-[2-(pyridin-2-yl)ethyl]oxalamide step (a) comprises:
a) reacting 2,4-dimethoxybenzylamine, or a salt thereof, with ethyl 2-chloro-2-oxoacetate ester in the presence of triethylamine and toluene, said step having one or more of the further steps of:
  i) combining 2,4-dimethoxybenzylamine, or an ammonium salt thereof, triethylamine, and toluene to form an admixture;
  ii) cooling said admixture to about 0° C. to form a cooled admixture;
  iii) adding to said cooled admixture, while maintaining the temperature of said admixture at or below about 10° C., ethyl 2-chloro-2-oxoacetate ester to form a reaction solution; and
  iv) allowing said reaction solution to warm to from about 20° C. to about 27° C. to form impure ethyl 2-(2,4-dimethoxybenzylamino)-2-oxoacetate.

Step (a)(i) relates to the use of toluene as a solvent and the use of triethylamine to serve as a source for removing the HCl which is formed, as well as to liberate the 2,4-dimethoxybenzyl free amine when an ammonium salt is used as a starting material.

Step (a)(ii) relates to one iteration of the reaction step wherein the admixture which is formed is cooled to about 0° C. prior to the addition of ethyl 2-chloro-2-oxoacetate ester, which in this iteration, as indicated in step (a)(iii) is added at a temperature at or below about 10° C.

Step (a)(iv) relates to the final step of this iteration wherein the reaction solution which comprises the impure ethyl 2-(2, 4-dimethoxybenzylamino)-2-oxoacetate and any unreacted starting materials is allowed to warm to from about 20° C. to about 27° C. to ensure reaction completion.

In a further iteration of Step (a), this step may also comprise one or more of the additional steps of:
v) adding an aqueous solution of hydrochloric acid to the solution of a 2-(2,4-dimethoxybenzylamino)-2-oxoacetate ester to form an organic liquid phase comprising the 2-(2,4-dimethoxybenzylamino)-2-oxoacetate ester and an aqueous phase;
vi) drying said organic liquid phase comprising the 2-(2,4-dimethoxybenzylamino)-2-oxoacetate ester to form a dry solution of the 2-(2,4-dimethoxybenzylamino)-2-oxoacetate ester.

Such an extraction procedure can be used to remove any water soluble impurities or salts formed in the first reaction Step (a).

If desired or necessary, the intermediate can be fully purified before reaction, the formulator may also choose to add the following procedures to Step (a):
vii) removing the toluene from said dry solution of ethyl 2-(2,4-dimethoxybenzylamino)-2-oxoacetate in toluene to form a solid ethyl 2-(2,4-dimethoxybenzylamino)-2-oxoacetate; and
viii) purifying said solid ethyl 2-(2,4-dimethoxybenzylamino)-2-oxoacetate.

The formulator will recognize that the addition of these steps will afford the user of the present process many options, one of which is to have purified intermediate ethyl 2-(2,4-dimethoxybenzyl-amino)-2-oxoacetate. This option is especially important because the final products of the present processes are tastants which are, in some aspects, anticipated for use in food products consumed by humans. Therefore, the final step may necessarily be required to be conducted in a facility different from the facility where step (a) is performed. Having the intermediate in pure form allows the formulator to finish the process of the present invention in a second facility or in segregated reactors.

Step (b)

Step (b) relates to the formation of the final product N-(2,4-dimethoxybenzyl)-N'-[2-(pyridin-2-yl)ethyl]oxalamide comprising reacting the 2-(2,4-dimethoxybenzylamino)-2-oxoacetate ester formed in step (a) with 2-(pyridin-2-yl)ethylamine having the formula:

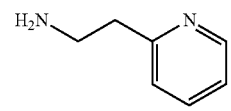

Again this step can utilize the aforementioned solvents, for example, toluene if desired by the formulator. Once again the choice of steps by which the final product is formed takes advantage of the fact that 2-(2-aminoethyl)pyridine is available commercially, for example, by ABCR GmbH & Co. KG, Chemos GmbH, Connect Marketing GmbH, and Rich Fine Chemicals Co., Ltd.

In additional embodiments of the process for preparing N-(2,4-dimethoxybenzyl-N'-[2-(pyridin-2-yl)ethyl]oxalamide relates to the following, step (b) comprises one or more of:
i) mixing 2-(2-aminoethyl)pyridine to the solution of step (a) to form a reaction solution, and
ii) heating said reaction solution to form N-(2,4-dimethoxybenzyl)-N'-[2-(pyridin-2-yl)ethyl]oxalamide.

Step (b)(i) utilizes the solution obtained in step (a) without performing any optional work-up steps.

Step (b)(ii) affords the formulator a temperature range option for conducting the reaction, for example, bringing the solution to reflux in the higher boiling solvent toluene which is used as the solvent in step (a), thereby, increasing the reaction through put.

Accordingly, in some embodiments of Step (b), this step may also comprise the steps of:
  iii) cooling the reaction solution to form a cooled solution of N-(2,4-dimethoxybenzyl)-N'-[2-(pyridin-2-yl)ethyl]oxalamide;
  iv) solidifying said N-(2,4-dimethoxybenzyl)-N'-[2-(pyridin-2-yl)ethyl]oxalamide from said cooled solution by adding a dialkyl ether; and
  v) collecting said solid N-(2,4-dimethoxybenzyl)-N'-[2-(pyridin-2-yl)ethyl]oxalamide.

However, it is the choice of the formulator which means is utilized to isolate the final product. For example, other additional steps which may facilitate improved yields and/or purity, include:
  vi) treating the solid N-(2,4-dimethoxybenzyl)-N'-[2-(pyridin-2-yl)ethyl]-oxalamide obtained in step (b)(vi) with hexane to form a slurry of N-(2,4-dimethoxybenzyl)-N'-[2-(pyridin-2-yl)ethyl]-oxalamide; and
  vii) collecting said N-(2,4-dimethoxybenzyl)-N'-[2-(pyridin-2-yl)ethyl]-oxalamide from said slurry to form purified N-(2,4-dimethoxybenzyl)-N'-[2-(pyridin-2-yl)ethyl]-oxalamide.

In another aspect, the inventions relate to a process for preparing N-(2,4-dimethoxybenzyl)-N'-[2-(pyridin-2-yl)ethyl]oxalamide which comprises:
  a) dissolving 2,4-dimethoxybenzylamine or an ammonium salt thereof having the formula:

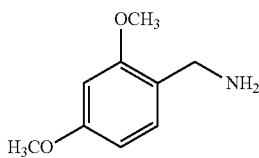

in triethylamine and toluene to form an admixture;
  b) adding ethyl 2-chloro-2-oxoacetate having the formula:

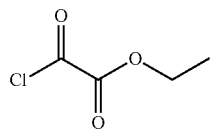

to said admixture formed in step (a) at a temperature at or below about 10° C., to form ethyl 2-(2,4-dimethoxybenzylamino)-2-oxoacetate having the formula:

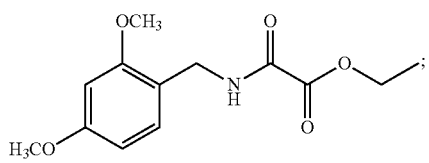 [SMILES: CCOC(=O)C(=O)NCc1ccc(OC)cc1OC]

and
  c) reacting said ethyl 2-(2,4-dimethoxybenzylamino)-2-oxoacetate formed in step (b) with 2-(pyridin-2-yl)ethylamine having the formula:

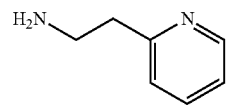

to form a reaction solution and subsequently heating the reaction solution to form N-(2,4-dimethoxybenzyl)-N'-[2-(pyridin-2-yl)ethyl]oxalamide; and
  d) optionally, isolating the product of step (c) by:
    i) cooling the refluxing solution to a temperature of from about 25° C. to about 35° C. to form a cooled solution of N-(2,4-dimethoxy-benzyl)-N'-[2-(pyridm-2-yl)ethyl]oxalamide;
    ii) precipitating said N-(2,4-dimemoxybenzyl)-N'-[2-(pyridin-2-yl)ethyl3-oxalamide from said cooled solution by adding methyl tert-butyl ether; and
    iii) collecting said N-(2,4-dimethoxybenzyl)-N'-[2-(pyridin-2-yl)ethyl]oxalamide.

Other oxalamide compounds disclosed herein may be prepared by methods similar to those disclosed above.

Other improved methods of synthesis of synthesis disclosed herein relate to improved methods of preparing starting materials.

For example, some aspects of the inventions relate to improved processes of preparing 2-methoxy-4-methyl-benzylamine or a salt thereof, by the reaction sequence shown below:
  comprising:
  a) methylating 2-hydroxy-4-methyl-benzamide with a methylating agent, to provide 2-methoxy-4-methyl-benzamide; and
  b) reducing 2-methoxy-4-methyl-benzamide with a hydride reducing agent, to provide 2-methoxy-4-methyl-benzylamine or a salt thereof s illustrated by the drawing below:

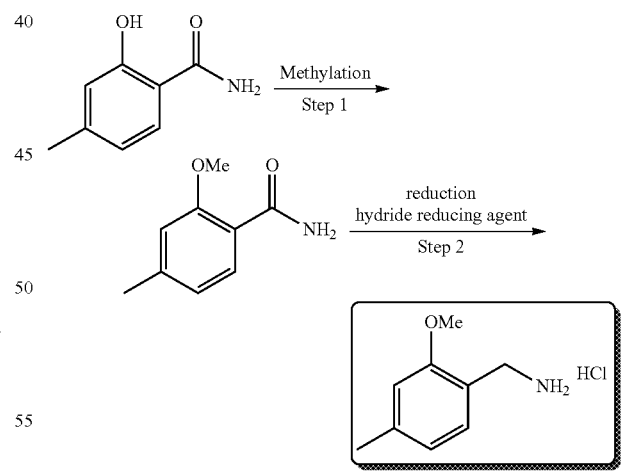

In such processes for producing precursors of oxalamide compounds, the methylating agent can include a variety of reagents well known to those of ordinary skill in the art, such as methyl halides, dimethyl sulfate, methyl tosylates, and the like. Similarly, a variety of hydride reducing agents (such as lithium aluminum hydride, lithium diisobutyl-aluminum hydride, lithium tri-tertbutoxide-aluminum hydride, or sodium bis(2-methoxyethoxy)aluminum hydride, or similar boron hydride reagents) that will selectively reduce the carbonyl group of the amide to an amine are well known in the art. See for example Example 30-1.

Similarly, the inventions also relate to processes for producing other precursors for oxalamide compounds, as exemplified by a process of preparing 2-(5-methylpyridin-2-yl) ethamine or a salt thereof, comprising:

a) treating acetonitrile with a strong base to remove a hydrogen ion therefrom,
b) condensing 2-bromo-5-methylpyridine with the base-treated acetonitrile, to provide 2-(5-methylpyridin-2-yl) acetonitrile; and
c) reducing the nitrile group of 2-(5-methylpyridin-2-yl) acetonitrile, to provide 2-(5-methylpyridin-2-yl) ethamine or a salt thereof. This process is illustrated below:

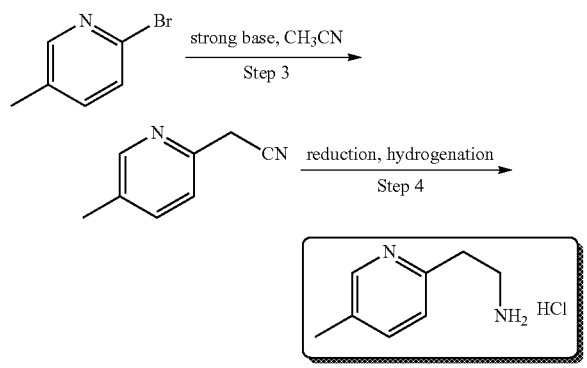

In such processes, one of the hydrogens of acetonitvile can be removed with very strong bases, such as alkyl or aryl lithium reagents, or a lithium salt of a dialkyl amine, to generate highly nucleophilic organometallic salts of acetonitrile, which can readily displace a halogen from an aryl halide such as 2-bromo-5-methylpyridine, to synthesize 2-(5-methylpyridin-2-yl) acetonitrile, which can be reduced to the corresponding 2-(5-methylpyridin-2-yl)ethamine, by a variety of known stoichiometric hydride reducing agents, or by catalytic hydrogenation. A well known catalyst for such catalytic hydrogenations is Raney nickel.

Lastly, the final oxalamide compounds can be synthesized by sequentially condensing oxalamide precursors such as those exemplified above. For example, in a "one pot" procedure, such as that detailed in Example 30-1 below.

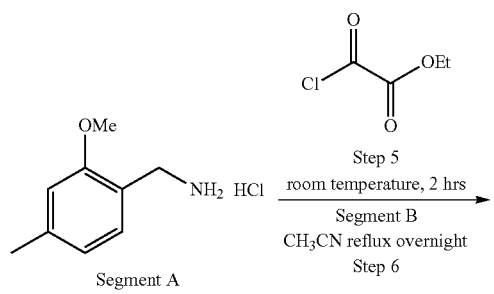

-continued

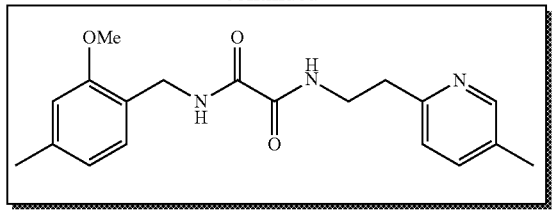

Such a "one pot" process for preparing $N^1$-(2-methoxy-4-methylbenzyl)-$N^2$-(2-(5-methylpyridin-2-yl)ethyl) oxalamide, comprises:

a) reacting 2-methoxy-4-methylbenzylamine with 2-chloro-oxoacetate, to provide N-(2-methoxy-4-methyl-benzyl)-oxalamic acid ethyl ester; and
b) reacting N-(2-methoxy-4-methyl-benzyl)-oxalamic acid ethyl ester with 2-(5-methylpyridin-2-yl)ethamine, to provide $N^1$-(2-methoxy-4-methylbenzyl)-$N^2$-(2-(5-methylpyridin-2-yl)ethyl) oxalamide.

Both steps of "one pot" processes are typically conducted in a single solvent, such as acetonitrile, and a mild organic or inorganic base, such as triethylamine. However, Applicants have unexpectedly discovered that yields can sometimes be significantly improved by employing an isolation and purification procedure between the two steps, as illustrated by Example 30-2.

Lastly, Applicants have discovered that many of the amide and/or oxalamide compounds of the invention are largely insoluble in highly a polar media such as hydrocarbons, fats, or oils, but can often be beneficially recrystallized to high purity levels by dissolving and heating the compounds in a mixture of hepatane and ethyl acetate, then cooling the solution. In particular, as is described in detail in Example 30-2, the inventions relate to processes for crystallizing N-(heptan-4-yl)-benzo[d][1,3]dioxol-5-carboxamide, comprising:

c) dissolving a composition comprising N-(heptan-4-yl)-benzo[d][1,3]dioxol-5-carboxamide in ethyl acetate and heptane at elevated temperatures to form a solution; and
d) cooling the solution, thereby forming a solid comprising N-(heptan-4-yl)-benzo[d][1,3]dioxol-5-carboxamide.

In many embodiments of such purification processes, the crystallization is conducted under an atmosphere of dry nitrogen, and the dissolving step carried out at a temperature of from about 40° C. to about 60° C., then the resulting solution is cooled to a temperature from about 0° C. to about 30° C., then the resulting solid crystals are isolated and dried to yield a dry product that can be greater than 99% pure N-(heptan-4-yl)-benzo[d][1,3]dioxol-5-carboxamide.

Measuring the Biological Activity of the Compounds of The Invention

Cell based technologies and assays, such as those disclosed in WO 02/064631 and WO 03/001876, and U.S. Patent Publication No. US 2003/0232407 A1 were used both to initially screen a wide variety of classes of compounds for agonist or antagonist activity for T1R1/T1R3 "savory" taste receptors, or T1R2/T1R3 "sweet" taste receptors that had been expressed in appropriate cell lines. Once initial "hits" were obtained for amide compounds in such cell lines, the same assays and also certain cell and/or receptor-based assays were used as analytical tools to measure the ability of the compounds of Formula (I) to enhance the savory taste of MSG or the sweet taste of known sweeteners such as sucrose, fructose, and were used to provide empirical data to guide an interative process of synthesizing and testing structural variants of the amide compounds, in combination with occasional human taste testing of high interest compounds, so as to design, test, and identify species and genuses of compounds with increased and optimized levels of desirable biological activities.

Many embodiments of the inventions relate to the identification of specific compounds and classes of the amide compounds of Formula (I) that modulate (increase or decrease) the activity of the T1R1/T1R3 (preferably hT1R1/hT1R3) savory taste receptor (umami receptor), alone or in combination with another compound that activates hT1R1/hT1R3, e.g., MSG. Particularly, in many embodiments the invention relate to the amides of Formula (I) that modulate the activity of hT1R1/hT1R3 (human umami receptor) in vitro and/or in vivo. In another aspect, the invention relates to compounds that modulate the human perception of savory (umami) taste, alone or in combination with another compound or flavorant, when added to a comestible or medicinal product or composition.

In some embodiments of the invention, it has been very unexpectedly discovered that at least some of the amide compounds of Formula (I) can modulate the human perception of umami taste, alone or in combination with another compound or flavorant composition, when added to a comestible or medicinal product or composition.

In Vitro hT1R1/hT1R3 Umami Taste Receptor Activation Assay

In order to identify new savory flavoring agents and enhancers, including compounds with savory agonist and enhancer activities (dual activity), the compounds of Formula (I) were screened in primary assays and secondary assays including compound dose response and enhancement assay. In a primary assay for potential ability to modulate umami taste, amide compounds of Formula (I) that can be either savory flavoring agents in their own right or flavor enhancers of MSG are identified and scores of their activities are given as percentage of the maximum MSG intensity (%). In compound dose response, an $EC_{50}$ is calculated to reflect the potency of the compound as a savory agonist or enhancer.

An HEK293 cell line derivative (See e.g., Chandrashekar, et al., Cell (2000) 100: 703-711) which stably expresses Gα15 and hT1R1/hT1R3 under an inducible promoter (see WO 03/001876 A2) was used to identify compounds with savory tasting properties.

Compounds covered in this document were initially selected based on their activity on the hT1R1/hT1R3-HEK293-Gα15 cell line. Activity was determined using an automated fluorometric imaging assay on a FLIPR instrument (Fluorometric Intensity Plate Reader, Molecular Devices, Sunnyvale, Calif.) (designated FLIPR assay). Cells from one clone (designated clone 1-17) were seeded into 384-well plates (at approximately 48,000 cells per well) in a medium containing Dulbecco's modified Eagle's medium (DMEM) supplemented with GlutaMAX (Invitrogen, Carlsbad, Calif.), 10% dialyzed fetal bovine serum (Invitrogen, Carlsbad, Calif.), 100 Units/ml Penicillin G, 100 µg/ml Streptomycin (Invitrogen, Carlsbad, Calif.) and 60 pM mifepristone (to induce expression of hT1R1/hT1R3, (see WO 03/001876 A2). 1-17 cells were grown for 48 hours at 37° C. 1-17 cells were then loaded with the calcium dye Fluo-3AM (Molecular Probes, Eugene, Oreg.), 4 µM in a phosphate buffered saline (D-PBS) (Invitrogen, Carlsbad, Calif.), for 1.5 hours at room temperature. After replacement with 25 µl D-PBS, stimulation was performed in the FLIPR instrument and at room temperature by the addition of 25 µl D-PBS supplemented with different stimuli at concentrations corresponding to twice the desired final level. Receptor activity was quantified by determining the maximal fluorescence increases (using a 480 nm excitation and 535 run emission) after normalization to basal fluorescence intensity measured before stimulation.

For dose-responses analysis, stimuli were presented in duplicates at 10 different concentrations ranging from 1.5 nM to 30 µM. Activities were normalized to the response obtained with 60 mM monosodium glutamate, a concentration that elicits maximum receptor response. $EC_{50}{}^s$ (concentration of compound that causes 50% activation of receptor) were determined using a non-linear regression algorithm, where the Hill slope, bottom asymptotes and top asymptotes were allow to vary. Identical results were obtained when analyzing the dose-response data using commercially available software for nonlinear regression analysis such as GraphPad PRISM (San Diego, Calif.).

In order to determine the dependency of hT1R1/hT1R3 for the cell response to different stimuli, selected compounds were subjected to a similar analysis on 1-17 cells that had not been induced for receptor expression with mifepristone (designated as un-induced 1-17 cells). The un-induced 1-17 cells do not show any functional response in the FLIPR assay to monosodium glutamate or other savory-tasting substances. Compounds were presented to un-induced umami cells at 10 µM- or three times the maximum stimulation used in the dose-response analysis. Compounds covered in this document do not show any functional response when using un-induced umami cells in the FLIPR assay.

In some aspects of the present invention, an $EC_{50}$ of lower than about 10 mM is indicative of compounds that induce T1R1/T1R3 activity and is considered a savory agonist. Preferably a savory agonist will have $EC_{50}$ values of less than about 1 mM; and more preferably will have EC50 values of less than about 20 µM, 15 µM, 10 µM, 5 µM, 3 µM, 2 µM, 1 µM, 0.8 µM or 0.5 µM.

In umami taste enhancement activity assay experiments, which produce an "$EC_{50}$ ratio" measurement of how effectively the amide compounds of the invention enhance the savory flavorant (typically MSG) already in a test solution. A series of measurements of the dose response is run in solutions comprising MSG alone, then a second dose response is run with MSG in combination with predetermined amounts of a candidate compound of Formula (I) at the same time.

In this assay, increasing concentrations of monosodium glutamate (ranging from 12 µM to 81 mM) were presented, in duplicates, in the presence or absence of a fixed concentration of the test compound. Typical compound concentrations tested were 30 µM, 10 µM, 3 µM, 1 µM, 0.3 µM, 0.1 µM and 0.03 µM. The relative efficacy of compounds of Formula (J) at enhancing the receptor was determined by calculating the magnitude of a shift in the $EC_{50}$ for monosodium glutamate. Enhancement was defined as a ratio ($EC_{50}R$) corresponding to the $EC_{50}$ of monosodium glutamate, determined in the absence of the test compound, divided by the $EC_{50}$ of monosodium glutamate, determined in the presence of the test compound. Compounds exhibiting $EC_{50}R>2.0$ were considered enhancers.

Stated alternatively, "$EC_{50}$ ratio" as compared to MSG is calculated based on the following definitions:

$EC_{50}$ Ratio vs. MSG=$EC_{50}$ (MSG)/$EC_{50}$ (MSG+[Compound]) wherein "[compound]" refers to the concentration of the compound of Formula (I) used to elicit (or enhance or potentiate) the MSG dose response.

It should be noted that the $EC_{50}$ ratio measured can depend somewhat on the concentration of the compound itself. Preferred savory enhancers would have a high $EC_{50}$ Ratio vs. MSG at a low concentration of the compound used. Preferably the $EC_{50}$ ratio experiments to measure umami enhancement are run at a concentration of a compound of Formula (I) between about 10 μM to about 0.1 μM, or preferably at 1.0 μM or 3.0 μM.

An $EC_{50}$ ratio of greater than 1 is indicative of a compound that modulates (potentiates) hT1R1/hT1R3 activity and is a savory enhancer. More preferably, the savory taste enhancer compounds of Formula (I) will have $EC_{50}$ ratio values of at least 1.2, 1.5, 2.0, 3.0, 4.0, 5.0, 8.0, or 10.0, or even higher.

In one aspect, the extent of savory modulation of a particular compound is assessed based on its effect on MSG activation of T1R1/T1R3 in vitro. It is anticipated that similar assays can be designed using other compounds known to activate the T1R1/T1R3 receptor.

Specific compounds and generic classes of compounds that been shown to modulate hT1R1/hT1R3 based on their EC50 ratios evaluated according to the above formula are identified in the detailed description of the invention, the examples, and the claims.

The procedures used for human taste testing of the umami/savory compounds of Formula (I) are reported hereinbelow.

EXAMPLES

The following examples are given to illustrate a variety of exemplary embodiments of the invention and are not intended to be limiting in any manner.

For the purpose of this document, the compounds individually disclosed in the following Examples can be referred in shorthand by the number of the Example. For example, as shown immediately bellow, Example 1 discloses a synthesis of a particular compound (N-(heptan-4-yl)benzo[d][1,3]dioxole-5-carboxamide), and the results of experimental assays of its biological effectiveness, which compound is and can be referred to herein in shorthand form as Compound 1.

Example 1

N-(heptan-4-yl)benzo[d][1,3]dioxole-5-carboxamide

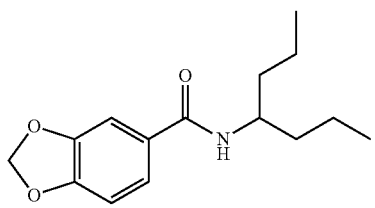 [SMILES: CCCC(CCC)NC(=O)c1ccc2c(c1)OCO2]

To a solution of heptan-4-amine (8.06 mL, 54 mmol) in triethylamine (15.3 mL, 108 mmol) and dichloromethane (135 mL), was added, dropwise at 0° C., a solution of benzo [1,3]dioxole-5-carbonyl chloride (10 g, 54 mmol) dissolved in dichloromethane (135 mL). The reaction mixture was stirred for 1 h. Solvent was removed under reduced pressure and the residue was dissolved in EtOAc. The organic layer was washed successively with 1 N aq. HCl, 1 N aq. NaOH, water, brine, dried (MgSO₄) and concentrated. The residue was recrystallized in EtOAc and Hexanes to afford 6.9 g of N-(heptan-4-yl)benzo[d][1,3]dioxole-5-carboxamide (48.3%) as a white solid. $^1$H NMR (500 MHz, CDCl₃): δ 0.92 (t, 6H), 1.38 (m, 6H), 1.53 (m, 2H), 4.11 (m, 1H), 5.63 (m, 1H), 6.01 (s, 2H), 7.98 (d, 1H), 7.27 (s, d, 2H). MS (M+H, 264).

The compound had $EC_{50}$ for activation of a hT1R1/hT1R3 umami receptor expressed in an HEK293 cell line of 0.2 μM, and when present at 0.03 μM enhanced the effectiveness of monosodium glutamate with an $EC5_0$ ratio of 6.92.

Example 1-1

Improved Preparation and Purification of N-(heptan-4-yl)benzo[d][1,3]dioxole-5-carboxamide

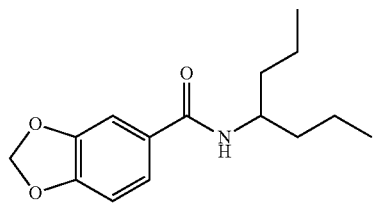 [SMILES: CCCC(CCC)NC(=O)c1ccc2c(c1)OCO2]

In a clean fume hood, a 3-neck round bottom flask equipped with a mechanical stirring assembly, addition funnel, thermocouple with display, nitrogen inlet, and drying tube was placed in a cooling bath. The flask was also blanketed with a nitrogen atmosphere. To the flask under nitrogen, 674 g of 4-heptylamine (1 equiv., 5.85 moles) was added. THF (3.37 L) was then added to the flask and the reaction mixture was stirred. Triethylamine (1184 g, 2 equiv., 11.7 moles) was next added to the reaction mixture under nitrogen and the reaction mixture was cooled to an internal temperature of from minus 5° C. to 0° C.

In a polyethylene pail, piperonyl chloride (1080 g, 5.85 moles) was dissolved in THF (3.37 L) and stored under a blanket of nitrogen. This solution was transferred to the addition funnel on the 3-neck flask. The solution was added to the reaction mixture in portions over 1-2 hours, keeping the internal temperature of the reaction mixture below 10° C. using external cooling as necessary. The piperonyl chloride in THF remained covered and blanketed with nitrogen between chargings. After the addition was complete, the reaction mixture was heated to from 20° C. to 25° C. and stirred an additional 30 minutes. The reaction was monitored by HPLC. When the reaction was complete (<1.0% piperonyl chloride remaining), methyl-t-butylether (6.73 L) was added with rapid stirring for 10 minutes. The resulting mixture was transferred to a reparatory funnel and washed with 1 N HCl (1.7 L). The organic layer was washed with 1 N NaOH (1.7 L), water (3.37 L), and brine (1.7 L) and dried with 100 g of magnesium sulfate. The reaction mixture was filtered through a Buchner funnel and concentrated under vacuum with a bath temperature of from 35° C. to 45° C. Heptane (1.76 L) was added to the crude solid with stirring to form a thick slurry. The slurry was filtered through a Buchner and washed once with heptane (0.88 L). The solids were transferred to a clean dry drying tray and vacuum dried at from 40° C. to 45° C., until a constant weight was obtained.

A 3-neck round bottom flask equipped with a mechanical stirring assembly, condenser, thermocouple with display, nitrogen inlet, and drying tube was placed in a heating mantle. The flask was blanketed with a nitrogen atmosphere and crude N-(heptan-4-yl)benzo[d][1,3]dioxole-5-carboxamide (1484 g) was added under nitrogen. Ethyl acetate (3.72 L) was also added. The reaction mixture was heated to an internal temperature of from 50° C. to 55° C. A clear solution was obtained. The solution was hot filtered through a Buchner funnel using a glass fiber filter on top of filter paper. A 3-neck round bottom flask was equipped with a mechanical stirring assembly, addition funnel, thermocouple with display, nitrogen inlet, and drying tube and was placed in a heating mantle. The flask was blanketed with a nitrogen atmosphere and the filtrate was transferred to the flask and stirred. The reaction mixture was heated to an internal temperature of from 40° C. to 50° C. Heptane (9.02 L Filtered through a Buchner funnel using a paper filter) was added in a steady stream over a minimum of 30 minutes while the internal temperature was maintained from 40° C. to 50° C. After the addition was complete, the reaction mixture was cooled to from 0° C. to 5° C. and kept at this temperature for 1 hour. The solution was filtered through a Buchner funnel using a polypropylene filter pad and washed with cold heptane (1.13 L, Filtered through a Buchner funnel using a paper filter and cooled to 0° C.). The solids were transferred to a clean dry drying tray and vacuum dried at from 40° C. to 45° C. for a minimum of 14 hours, until a constant weight was obtained. This protocol provided 1276 g of the N-(heptan-4-yl)ben2o[d][1,3]dioxole-5-carboxamide at greater than 99.9% purity (as determined by HPLC) for an overall yield of 86%.

Example 1-2

To a 500 mL 3-neck flask equipped with a magnetic stirrer, addition funnel, thermocouple, drying tube, and a cooling bath under nitrogen blanketing was charged piperonylic acid (25 g, 150 mmol), CH$_2$Cl$_2$ (200 mL) and DMF (2.5 mL). The resulting mixture was cooled to 0° C. and thionyl chloride (18.8 g, 158 mmol) was added over approximately 10 minutes. When the addition was complete the solution was heated to reflux for approximately 1 hour. The reaction was cooled to 0° C. and held until used subsequently.

To a 1 L 3-neck flask equipped with a magnetic stirrer, addition funnel, thermocouple, drying tube, and a cooling bath under nitrogen blanketing was charged 4-heptylamine (17.3 g, 150 mmol), triethylamine (30.5 g, 301 mmol), CH$_2$Cl$_2$ (125 mL) and DMF (2.5 mL). The solution was cooled to 0° C. and the cold solution of acid chloride was added drop wise over approximately 1 hour while maintaining the temperature below 10° C. When the addition was complete, water (100 mL) was added while holding the temperature below about 20° C. The contents of the reaction flask was then transferred to a reparatory funnel and the organic layer extracted with IN HCl (aq.) (2×40 mL), water (40 mL), 1N NaOH (aq.) (40 mL), water (40 mL), then NaCl (sat. aq.) (40 mL). The organic phase was dried over MgSO$_4$, filtered and concentrated to a reduced volume after which heptane (100 mL) was added and the solution concentrated to dryness under reduced pressure. The resulting crude product was treated with heptane (150 mL) and the resulting solid were collected by filtration, washed with heptane (50 mL) then dried under vacuum to afford the desired product. Yield was 37.4 g (94.4%).

Example 2

N-(2-raethylheptan-4-yl)benzo[d][1,3]dioxole-5-carboxamide

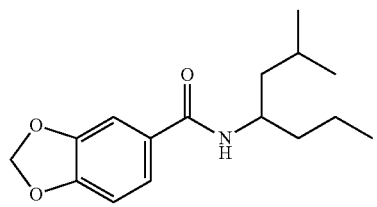 [SMILES: CCCC(CC(C)C)NC(=O)c1ccc2c(c1)OCO2]

Prepared in a similar manner to example 1 using benzo[d][1,3]dioxole-5-carbonyl chloride and 2-methylheptan-4-amine (example 2a). $^1$H NMR (500 MHz, CDCl$_3$): δ 0.93 (m, 9H); 1.38 (m, 5H); 1.53 (m, 1H); 1.66 (m, 1H); 4.21 (m, 1H); 5.61 (d, 1H); 6.01 (s, 2H); 6.82 (d, 1H); 7.26 (m, 2H). MS (278, M+H).

Preparation of 2-methylheptan-4-amine:

To a solution of 2-methylheptan-4-one (4.24 g, 33.07 mmol), in methanol (60 mL), were added ammonium acetate (25.50 g, 330.71 mmol) and sodium cyanoborohydride (2.08 g, 33.07 mmol). The reaction mixture was stirred at room temperature for about 24 hours. The solvent was removed under reduced pressure and the residue was diluted with water and basified with 15% NaOH aqueous and extracted with ether. The extract was washed with brine, dried over anhydrous magnesium sulfate, filtered and evaporated to give 3.3 g of 2-methylheptan-4-amine (77%). MS (M+H, 130).

The compound had EC$_{50}$ for activation of a hT1R1/hT1R3 umami receptor expressed in an HEK293 cell line of 0.22 μM.

Example 3

N-(2-methylhexan-3-yl)benzo[d][1,3]dioxole-5-carboxamide

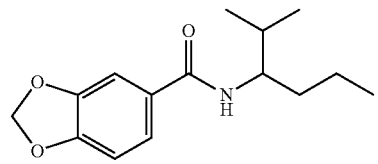 [SMILES: CCCC(NC(=O)c1ccc2c(c1)OCO2)C(C)C]

Prepared in a similar manner to example 1 using benzo[d][1,3]dioxole-5-carbonyl chloride and 2-methylhexan-3-amine (example 3a). $^1$H NMR (500 MHz, CDCl$_3$): δ 0.93 (m, 9H); 1.37 (m, 3H); 1.56 (m, 1H); 1.83 (m, 1H); 4.01 (m, 1H); 5.67 (d, 1H); 6.02 (s, 2H); 6.82 (d, 1H); 7.28 (m, 2H). MS (M+H, 264).

a. 2-methylhexan-3-amine was prepared using the same procedure described in example 2a starting from 2-methylhexan-3-one. Yield: 40%. $^1$H NMR (500 MHz, CDCl$_3$): δ 0.86 (d, 3H); 0.91 (m, 6H); 1.20-1.29 (m, 2H); 1.38-1.47 (m, 2H); 1.47 (s, 2H); 1.58 (m, 1H); 2.51 (m, 1H). MS (M+H.116).

The compound had EC$_{50}$ for activation of a hT1R1/hT1R3 umami receptor expressed in an HEK293 cell line of 0.61 μM.

Example 4

N-(2,3-dimethylcyclohexyl)benzo[d][1,3]dioxole-5-carboxamide

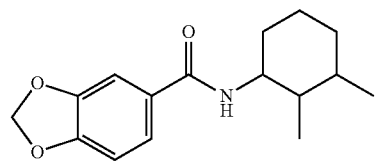 [SMILES: CC1CCCC(NC(=O)c2ccc3c(c2)OCO3)C1C]

2,3-dimethylcyclohexanamine (20 μmol) and benzo[d][1,3]dioxole-5-carboxylic acid (1.1 eq) were each dissolved in acetonitrile/dichloromethane (200 μL, 2:1). PS-Carbodiimide resin (2 eq) was loaded into a 1.2 mL 96 well Greiner plate, followed by the addition of amine and acid solutions. Hydroxybenzotriazole (1.1 eq) was dissolved in DMF (100 mL) and was added into the reaction well. The reaction was shaken overnight at room temperature. Once the reaction was completed, PS-Trisamine resin (1.5 eq) was added into the reaction mixture and the solution was allowed to shake overnight at room temperature. Acetonitrile (200 mL) was added into the reaction well, and the top clear solution was transferred into a new plate. The solution was evaporated to give N-(2,3-dimethylcyclohexyl)benzo[d][1,3]dioxole-5-carboxamide. MS (M+H, 276.20).

The compound had $EC_{50}$ for activation of a hT1R1/hT1R3 umami receptor expressed in an HEK293 cell line of 0.45 μM, and when present at 1 μM enhanced the effectiveness of monosodium glutamate with an $EC_{50}$ ratio of 8.4.

Example 5

(R)-methyl 2-(benzo[d][1,3]dioxole-6-carboxamido)-4-methylpentanoate

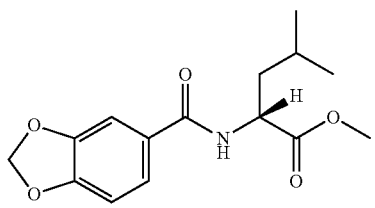 [SMILES: COC(=O)[C@@H](CC(C)C)NC(=O)c1ccc2c(c1)OCO2]

Prepared in a similar manner to example 1 using benzo[d][1,3]dioxole-5-carbonyl chloride and D-leucine methyl ester hydrochloride. Yield: 83%. $^1$H NMR (500 MHz, CDCl$_3$): δ 0.98 (m, 6H); 1.63-1.67 (m, 1H); 1.71-1.76 (m, 2H); 3.76 (s, 3H); 4.83 (m, 1H); 6.03 (s, 2H); 6.38 (d, 1H); 6.83 (d, 1H); 7.32 (s, 1H); 7.33 (d, 1H). MS (M+H, 294). m.p: 89-90° C.

The compound had $EC_{50}$ for activation of a hT1R1/hT1R3 umami receptor expressed in an HEK293 cell line of 0.34 μM, and when present at 0.1 μM enhanced the effectiveness of monosodium glutamate with an $EC_{50}$ ratio of 4.9.

Example 6

(R)-methyl 2-(benzo[d][1,3]dioxole-6-carboxamido)-3-methylbutanoate

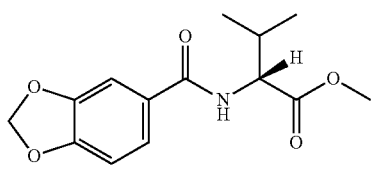 [SMILES: COC(=O)[C@H](NC(=O)c1ccc2c(c1)OCO2)C(C)C]

Prepared in a similar manner to example 4 using benzo[d][1,3]dioxole-5-carboxylic acid and (R)-methyl 2-amino-3-methylbutanoate. Yield: 50%. MS (M+H, 280.1).

The compound had an $EC_{50}$ for activation of a hT1R1/hT1R3 umami receptor expressed in an HEK293 cell line of 1.16 μM.

Example 7

N-(hexan-3-yl)-4-methoxy-3-methylbenzamide

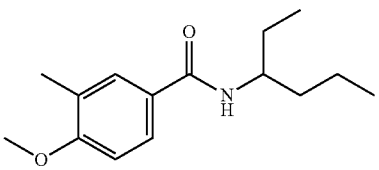 [SMILES: CCCC(CC)NC(=O)c1ccc(OC)c(C)c1]

Prepared in a similar manner to example 4 using 4-methoxy-3-methylbenzoic acid and hexan-3-amine (example 28a). $^1$H NMR (500 MHz, CDCl$_3$): δ 0.94 (m, 6H); 1.41 (m, 4H); 1.46 (m, 1H); 1.64 (m, 1H); 2.24 (s, 3H); 3.87 (s, 3H); 4.08 (m, 1H); 5.69 (d, 1H); 6.83 (d, 1H); 7.54 (s, 1H); 7.62 (d, 1H). MS (M+H, 250).

The compound had an $EC_{50}$ for activation of a hT1R1/hT1R3 umami receptor expressed in an HEK293 cell line of 0.12 μM.

Example 8

N-(heptan-4-yl)-6-methylbenzo[d][1,3]dioxole-5-carboxamide

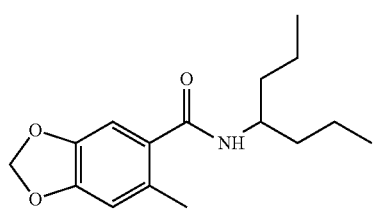 [SMILES: CCCC(CCC)NC(=O)c1cc2c(cc1C)OCO2]

Prepared in a similar manner to example 4 using 6-methylbenzo[d][1,3]dioxole-5-carboxylic acid and heptan-4-amine. MS (M+H, 278.67).

The compound had an $EC_{50}$ for activation of a hT1R1/hT1R3 umami receptor expressed in an HEK293 cell line of 0.11 μM.

Example 9

N-(heptan-4-yl)-2-methylbenzo[d][1,3]dioxole-5-carboxamide

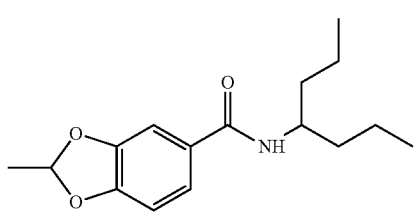 [SMILES: CCCC(CCC)NC(=O)c1ccc2c(c1)OC(C)O2]

N-(heptan-4-yl)-3,4-dihydroxybenzamide (0.5 mmol) was dissolved in toluene (1.6 mL). P-Toluenesulfonic acid monohydrate (0.3 eq) was added to the reaction, followed by addition of acetaldehyde (2 eq). The reaction was performed using microwave (180 C, 300W) and ran for 10 minutes. The solvent was evaporated. The residue was dissolved in methanol (1 ML) and purified by HPLC. Yield 20%, MS (M+H 278.10).

a. N-(heptan-4-yl)-3,4-dihydroxybenzamide was prepared in a similar manner to example 4 using 3,4-dihydroxybenzoic acid and heptan-4-amine. Yield: 25%. MS (M+H, 252.1).

The compound had an $EC_{50}$ for activation of a hT1R1/hT1R3 umami receptor expressed in an HEK293 cell line of 0.1 μM, and when present at 0.03 μM enhanced the effectiveness of monosodium glutamate with an $EC_{50}$ ratio of 3.68.

Example 10

N-(heptan-4-yl)-2,2-dimethylbenzo[d][1,3]dioxole-5-carboxamide

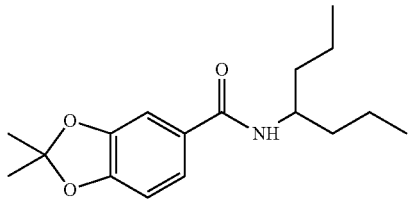 [SMILES: CCCC(CCC)NC(=O)c1ccc2c(c1)OC(C)(C)O2]

Prepared in a similar manner to example 4 using sodium 2,2-dimethylbenzo[d][1,3]dioxole-5-carboxylate and 4-heptylamine (example 10a). Yield 30%. $^1$H NMR: 0.92 (t, 6H, J=7.2 Hz), 1.42 (m, 6H), 1.53 (m, 2H), 1.68 (s, 6H), 4.12 (m, 1H), 5.61 (d, 1H, J=8.9 Hz), 6.72 (d, 1H, J=8 Hz), 7.16 (d, 1H, J=1.5 Hz), 7.22 (dd, 1H, J=1.5 Hz, J=17 Hz). MS (M+H, 292).

a. Sodium 2,2-dimethylbenzo[d][1,3]dioxole-5-carboxylate and 4-heptylamine:

Ethyl 2,2-dimethylbenzo[d][1,3]dioxole-5-carboxylate (example 10b)(461 mg, 2.08 mmol) was stirred in dioxane (16 mL) and 1.0N aqueous NaOH (4.16 mL) for 20 hours at room temperature. The solvent was removed under reduced pressure to afford the desired product (449 mg). (M–H, 193).

b. Ethyl 2,2-dimethylbenzo[d][1,3]dioxole-5-carboxylate:

Ethyl 3,4-dihydroxybenzoate (910.9 mg, 5 mmol) was combined with 2,2-dimethoxypropane (1.23 mL, 10 mmol) and a catalytic amount of p-toluene sulfonic acid in toluene. The mixture was heated to reflux using a Dean-Stark trap for 20 hours. After solvent removal under reduced pressure, the crude was dissolved in ethyl acetate and washed successively with a saturated aqueous solution of sodium bicarbonate, water, and brine. The organic layer was dried over anhydrous sodium sulfate. Purification by chromatography on silica gel using a gradient hexane:ethyl acetate, 90:10 to 75:25, afforded a white powder (539.1 mg, 49%). $^1$H NMR (CDCl$_3$): 1.36 (t, 3H, J=7.2 Hz), 1.69 (s, 6H), 4.32 (q, 2H, J=7.1 Hz, J=14.2 Hz), 6.74 (d, 1H, d, J=8.2 Hz), 7.38 (d, 1h, J=1.7 Hz), 7.61 (dd, 1H, J=1.8 Hz, J=8.3 Hz).

The compound had an EC$_{50}$ for activation of ahT1R1/hT1R3 umami receptor expressed in an HEK293 cell line of 2.7 μM.

Example 11

2,3-Dihydro-benzol[1,4]dioxine-6-carboxylic acid (1-propyl-butyL)-amide

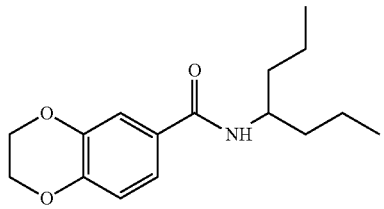 [SMILES: CCCC(CCC)NC(=O)c1ccc2c(c1)OCCO2]

Prepared in a similar manner to example 4 using 2,3-Dihydro-benzo[1,4]dioxine-6-carboxylic acid and heptan-4-amine. MS (M+H, 278.2).

The compound had an EC$_{50}$ for activation of a hT1R1/hT1R3 umami receptor expressed in an HEK293 cell line of 0.49 μM.

Example 12

Preparation of (R)-methyl 4-chloro-2-(5-methylbenzofuran-2-carboxamido)pentanoate

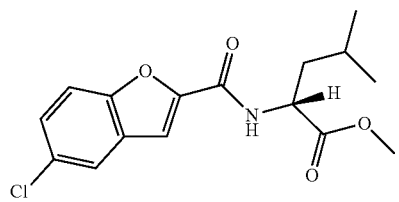 [SMILES: COC(=O)[C@@H](CC(C)C)NC(=O)c1cc2cc(Cl)ccc2o1]

Prepared in a similar manner to example 4 using 5-chlorobenzofuran-2-carboxylic acid and D-leucine methyl ester. MS (M+H, 324).

The compound had an EC$_{50}$ for activation of a hT1R1/hT1R3 umami receptor expressed in an HEK293 cell line of 0.82 μM.

Example 13

N-(heptan-4-yl)benzo[b]thiophene-2-carboxamide

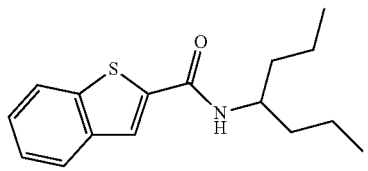 [SMILES: CCCC(CCC)NC(=O)c1cc2ccccc2s1]

Prepared in a similar manner to example 4 using benzo[b]thiophene-2-carboxylic acid and 4-hepthylamine. MS (M+H, 276).

The compound had an EC50 for activation of a hT1R1/hT1R3 umami receptor expressed in an HEK293 cell line of 0.21 μM.

Example 14

4-methyl-3-methylsulfanyl-N-(1-propylbutyl)benzamide

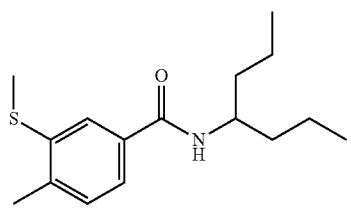 [SMILES: CCCC(CCC)NC(=O)c1ccc(C)c(SC)c1]

Prepared in a similar manner as example 4 using 4-methyl-3-(methylthio)benzoic acid (example 14a) and 4-heptylamine. Yield: 50%. $^1$H NMR (500 MHz, CDCl$_3$): δ 0.93 (t, 6H, J=7.2 Hz), 1.40-1.41 (m, 8H), 2.35 (s, 3H), 2.51 (s, 1H), 4.15 (m, 1H), 5.75 (d, 1H, J=8.5 Hz), 7.15 (d, 1H, J=7.8 Hz), 7.31 (d, 1H, J=7.8 Hz), 7.65 (d, 1H, J=1.5 Hz). MS (M+H, 280).

a. 4-methyl-3-(methylthio)benzoic acid: 3-Amino-4-methylbenzoic acid was suspended in ice-water (55 mL), and concentrated HCl (8.56 mL) was slowly added. An aqueous solution of sodium nitrite (2.4 g in 5.5 mL) was added to the suspension over a period of 15 minutes and the mixture was stirred for another 15 minutes. Then, an aqueous solution of sodium acetate (9.31 g in 18 mL) was added dropwise. The reaction was allowed to proceed for 45 min. A heavy orange precipitate was obtained. The precipitate was filtered off and washed with small portions of ice-cold water. The solid was combined with a solution of potassium xanthogenate (11.93 g) and potassium carbonate (8.22 g) in 250 mL of water. The reaction vessel was placed in a preheated oil bath at 70° C. and the mixture was stirred for 25 minutes. The reddish solution was taken out of the bath and stirred for 15 minutes or until the temperature reached 30° C. Sodium hydroxide (0.782 g) was added and stirred to dissolution. Dimethylsulfate (5.70 mL) was added. The mixture was stirred for 1 hour at room temperature then briefly refluxed. Solvent removal under reduced pressure yielded an orange solid. The solid was treated with a 2.0 N solution of $H_2SO_4$ and extracted with EtOAc. The extracts were washed with water then dried over anhydrous $MgSO_4$. The solvent was removed under reduced pressure to give a reddish crude solid. The solid was adsorbed on silica gel and purified by column chromatography (gradient 5 to 50% ethyl acetate in hexane) to give 4-methyl-3-(methylthio) benzoic acid as a pale yellow powder (2 g). $^1$H NMR (500 MHz, CDCl$_3$): δ 2.39 (s, 3H), 2.54 (s, 3H), 7.24 (d, 1H, J=7.8 Hz), 7.79 (d, 1H, J=7.8 Hz), 7.86 (d, 1H, J=1.5 Hz).

The compound had an $EC_{50}$ for activation of a hT1R1/hT1R3 umami receptor expressed in an HEK293 cell line of 0.21 µM.

Example 15

4-methoxy-3-methyl-N-(2-methylheptan-4-yl)benzamide

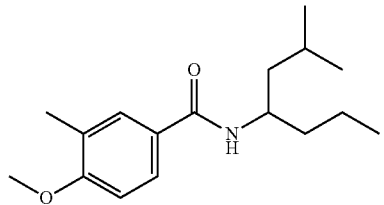 [SMILES: CCCC(CC(C)C)NC(=O)c1ccc(OC)c(C)c1]

Prepared in a similar manner as described in example 4 using 4-methoxy-3-methylbenzoic acid and 2-methyl-4-heptanamine (example 2a). Yield: 45%. $^1$H NMR (500 MHz, CDCl$_3$): δ 0.93 (m, 9H); 1.39 (m, 5H); 1.53 (m, 1H); 1.67 (m, 1H); 2.24 (s, 3H); 3.86 (s, 3H); 4.23 (m, 1H); 5.64 (d, 1H); 6.82 (d, 1H); 7.54 (s, 1H); 7.61 (d, 1H). MS (278, M+H).

The compound had an EC50 for activation of a hT1R1/hT1R3 umami receptor expressed in an HEK293 cell line of 0.1 µM.

Example 16

(R)-methyl 2-(3-chloro-4-methoxybenzamido)-4-methylpentanoate

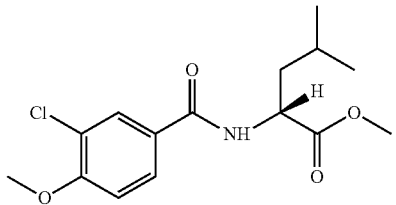

Prepared in a similar manner to example 4 using 3-chloro-4-methoxy benzoic acid and D-leucine methyl ester hydrochloride. MS (M+H, 314.10).

The compound had an $EC_{50}$ for activation of a hT1R1/hT1R3 umami receptor expressed in an HEK293 cell line of 0.08 µM, and when present at 0.01 µM enhanced the effectiveness of monosodium glutamate with an $EC_{50}$ ratio of 13.18.

Example 17

3,4-Dimethoxy-N-(1-propyl-butyl)-benzamide

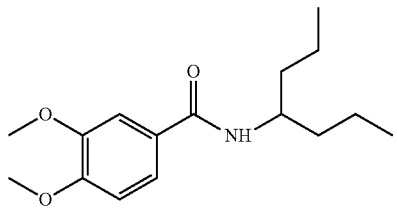 [SMILES: CCCC(CCC)NC(=O)c1ccc(OC)c(OC)c1]

Prepared in a similar manner to example 4 using 3,4-dimethoxy benzoic acid and heptan-4-amine. MS (M+H, 279.37).

The compound had an $EC_{50}$ for activation of a hT1R1/hT1R3 umami receptor expressed in an HEK293 cell line of 0.36 µM.

Example 18

(R)—N-(1-methoxy-4-methylpentan-2-yl)-3,4-dimethylbenzamide

To a solution of (R)—N-(1-hydroxy-4-methylpentan-2-yl)-3,4-dimethylbenzamide (1.59 g, 6.39 mmol) (example 18a) in dry DMF (20 mL) was added powdered NaOH (281 mg, 7 mmol) an the solution was stirred at 0° C. for 2 hrs. Iodomethane (1 eq, 6.39 mmol) was added in DMF (10 ml) drop-wise over period of 1 hr. The temperature was kept at 0° C. and the mixture was stirred for 1 hr. The reaction was quenched by adding 300 ml of water. The aqueous layer was extracted with dichloromethane, dried over MgSO$_4$ and evaporated. The residue was purified by flash chromatography on silica-gel (toluene-ethyl acetate; 5-20% gradient) to give 1.23 g (R)—N-(1-methoxy-4-methylpentan-2-yl)-3,4-dimethylbenzamide (73%). $^1$H NMR (500 MHz, CDCl$_3$): ÿ 0.94-0.97 (t, 6H), 1.41-1.47 (M, 1H), 1.54-1.60 (m, 1H), 1.64-1.68 (m, 1H), 2.29 (d, 6H)$_5$ 3.36 (s$_3$ 3H), 3.45-3.50 (m, 2H), 4.34-4.39 (m, 1H), 6.23-6.25 (d, 1H), 7.16-7.17 (d, 1H), 7.47-7.49 (dd, 1H), 7.56 (s, 1H). MS (M+H, 264.3).

a. (R)—N-(1-hydroxy-4-methylpentan-2-yl)-3,4-dimethylbenzamide was prepared in a similar manner as described in example 4 using 3,4-dimethylbenzoic acid and with (R)-aminoleucinol. Yield: 75%. MS (M+H, 250.3).

The compound had an $EC_{50}$ for activation of a hT1R1/hT1R3 umami receptor expressed in an HEK293 cell line of 0.2 µM.

Example 19

(R)-methyl 2-(2,3-dimethylfuran-5-carboxamido)-4-methylpentanoate

Prepared in a similar manner to example 4 using 4,5-dimethyl-furan-2-carboxylic acid and D-leucine methyl ester. Yield: 27%. $^1$H NMR (500 MHz, CDCl$_3$): ÿ 0.96 (t, 6H), 1.66

(m, 3H), 1.96 (s, 3H), 2.26 (s, 3H), 3.75 (s, 3H), 4.78 (m, 1H), 6.51 (d, 1H), 6.89 (s, 1H). MS (M+H, 268).

The compound had an $EC_{50}$ for activation of a hT1R1/hT1R3 umami receptor expressed in an HEK293 cell line of 0.59 μM.

Example 20

(R)-methyl 2-(2,6-dimethoxyisonicotinamido)-4-methylpentanoate

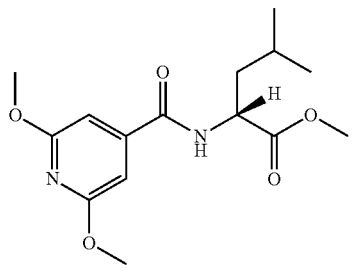 [SMILES: COC(=O)[C@@H](CC(C)C)NC(=O)c1cc(OC)nc(OC)c1]

Prepared in a similar manner to example 4 using 2,6-Dimethoxy-isonicotinic acid and D-leucine methyl ester. $^1$H NMR (500 MHz, CDCl$_3$): δ 0.92 (d, 3H, J=7.27 Hz), 0.93 (d, 3H, J=7.26 Hz), 1.41-1.58 (m, 8H), 3.95 (s, 3H), 4.08 (s, 3H), 4.15 (m, 1H), 6.43 (d, 1H, J=8.32 Hz), 7.47 (m, broad, 1H), 8.41 (d, 1H, J=8.34 Hz). MS (M+H; 311).

The compound had an $EC_{50}$ for activation of a hT1R1/hT1R3 umami receptor expressed in an HEK293 cell line of 1.91 μM.

Example 21

(S)—N-(2,3-Dihydro-1H-inden-1-yl)-4-methoxy-3-methylbenzamide

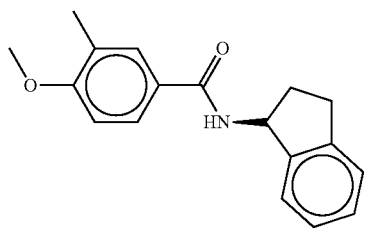

Prepared in a similar manner to example 4 using 4-methoxy-3-methylbenzoic acid and (S)-2,3-dihydro-1H-inden-1-amine. Yield 63%. $^1$HNMR (500 MHz, dMSO): δ 1.94-1.99 (m, 1H), 2.17 (s, 3H), 2.41-2.46 (m, 1H), 2.82-2.87 (m, 1H), 2.96-3.01 (m, 1H), 3.83 (s, 3H), 5.53-5.57 (dd, 1H), 6.98-6.99 (d, 1H), 7.16-7.23 (m, 3H), 7.26-7.27 (m, 1H), 7.75-7.80 (m, 2H), 8.54-8.55 (d, 1H). MS (M+H, 282).

The compound had $EC_{50}$ for activation of a hT1R1/hT1R3 umami receptor expressed in an HEK293 cell line of 0.08 μM.

Example 22

(R/S)-4-Methoxy-N-(5-methoxy-2,3-dihydro-1H-inden-1-yl)-3-methylbenzamide

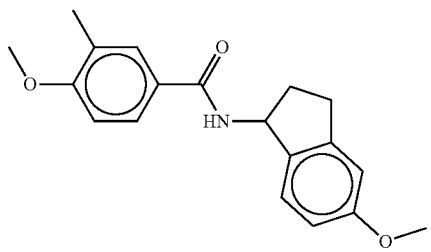

Prepared in a similar manner to example 4 using 4-methoxy-3-methylbenzoic acid and 5-methoxy-2,3-dihydro-1H-inden-1-amine (Example 121-2a)(47%). MS (M+H$_s$ 312).

The compound had $EC_{50}$ for activation of a hT1R1/hT1R3 umami receptor expressed in an HEK293 cell line of 0.08 μM.

Example 22-2a 5-methoxy-2,3-dihydro-1H-inden-1-amine

5-Methoxy-2,3-dihydromden-1-one (Ig, 6.17 mmol) was added to a solution of hydroxylamine HCl (730 mg, 10.5 mmol) in 10 ml of water. The mixture was brought up to 70° C. and a solution of sodium acetate (1.4 g, 16.7 mmol) in 7 mL of H$_2$O, 14 ml of MeOH, 3 ml of THF was added. After stirring for 1.5 h at 70° C., 10 ml of H$_2$O was added to produce a precipitate and the suspension was allowed to stir for 2 h. The precipitate was collected by filtration to give 5-methoxy-2,3-dihydroinden-1-one oxime almost quantitatively and was used in the next step without further purification. The oxime (0.5 g, 2.82 mmol) was dissolved in MeOH and a catalytic amount of Raney nickel and 25 mL of ammonia solution in MeOH (7N) was added. The reaction was stirred at r.t. overnight under H$_2$. The slurry was filtered over celite and concentrated in vacuo, diluted with EtOAc, washed with water and brine, dried over MgSO$_4$, filtered, and concentrated in vacuo to give the crude title amine (yield, 45%). The crude amine was used without further purification.

Numerous amide compounds of Formula (I) that fall within the subgenus of "oxalamide" compounds described elsewhere herein were also synthesized and experimentally tested for effectiveness as activator of a hT1R1/hT1R3 umami receptor expressed in an HEK293 cell line.

Example 23

General procedure A for the preparation of an oxalamide

Synthesis of N-(2-Methoxy-benzyl)-N'-(2-pyridin-2-yl-ethyl)-oxalamide

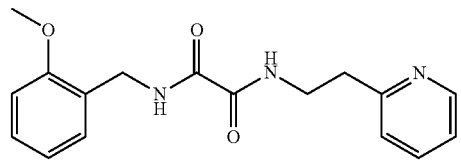 [SMILES: COc1ccccc1CNC(=O)C(=O)NCCc1ccccn1]

2-Methoxybenzyl amine (5 mmol) was mixed with triethylamine (2 equiv.) in anhydrous Dioxane. Ethyl oxalyl chloride (1 equiv.) was added and the mixture was shaken at room temperature for 0.5-2 hours. Then 2-(2-pyridinyl)ethyl amine (1 equiv.) was added and the suspension was heated at 80° C. overnight. The solution was concentrated and the residue was dissolved in ethyl acetate and washed with water. The organic layer was dried by sodium sulfate and solvent was evaporated to give the crude product, which was purified by flash column chromatography to afford the title compound: yield 70%, m.p. 118-119° C.; m/e=314 [M+1]; 1H NMR (CDCl$_3$): 3.02 (t, 2H), 3.76 (dt, 2H), 3.86 (s, 3H), 4.47 (d, 2H), 6.80-6.90 (m, 2H), 7.14-7.18 (m, 2H), 7.20-7.30 (m, 2H), 7.55-7.62 (m, 1H), 7.75-7.83 (m, 1H), 8.05-8.12 (m, 1H), 8.55-8.63 (m, 1H).

The compound had an $EC_{50}$ for activation of a hT1R1/hT1R3 umami receptor expressed in an HEK293 cell line of 0.34 μM, and when present at 0.3 μM enhanced the effectiveness of monosodium glutamate with an $EC_{50}$ ratio of 18.85.

Example 24

N-(2,4-Dimethoxy-benzyl)-N'-(2-pyridin-2-yl-ethyl)-oxalamide

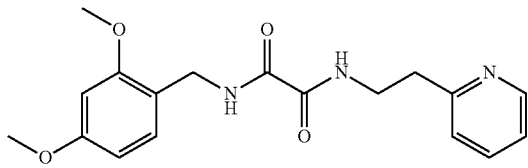 [SMILES: COc1ccc(CNC(=O)C(=O)NCCc2ccccn2)c(OC)c1]

Prepared in a similar manner to example 23 using 2,4-dimethoxybenzyl amine, ethyl oxalyl chloride and 2-(2-pyridinyl)ethyl amine. Yield 72%, m.p. 123-124° C.; m/e=344 [M+1]; $^1$H NMR (CDCl$_3$): δ 3.02 (t, 2H); 3.73 (dd, 2H); 3.78 (s, 3H); 3.82 (s, 3H); 4.38 (d, 2H) 6.40 (dd, 1H); 6.44 (d, 1H); 7.14 (m, 3H); 7.59 (m, 1H); 7.82 (t, 1H); 8.11 (t, 1H); 8.56 (d, 1H); $^{13}$C NMR: δ 36.9, 38.9, 39.4, 55.6, 55.6, 98.8, 104.1, 117.8, 121.9, 123.5, 130.7, 136.8, 149.6, 158.8, 158.8, 159.6, 160.1, 161.0.

The compound had an $EC_{50}$ for activation of a hT1R1/hT1R3 umami receptor expressed in an HEK293 cell line of 0.09 μM, and when present at 0.3 μM enhanced the effectiveness of monosodium glutamate with an $EC_{50}$ ratio of 6.51.

Example 24-1

Improved Preparation and Purification of N-(2,4-Dimethoxy-benzyl)-N'-(2-pyridin-2-yl-ethyl)-oxalamide

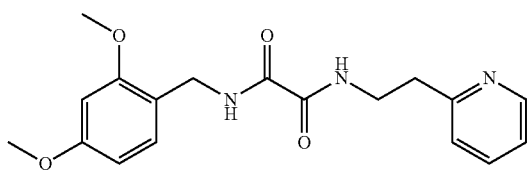 [SMILES: COc1ccc(CNC(=O)C(=O)NCCc2ccccn2)c(OC)c1]

A clean and dry jacketed reactor was equipped with a condenser, a Claisen adapter, a temperature probe, and an addition funnel or head column. The reactor was flushed with nitrogen gas for at least 15 minutes. The reactor was then charged with 1,396 g (1 equiv., 8.3 mol) of 2,4-dimethoxybenzylamine, 1,693 g (2 equiv., 16.7 mol) of triethylamine, and 25,086 mL of THF. The mixture was cooled to from 0 to 5° C. Ethyl chlorooxoacetate (1140 g, 1 equiv., 8.3 mol) was added to an addition funnel or head column and charged to the batch at such a rate that the internal temperature did not exceed 10° C. Solids formed approximately ⅓ into the addition. After the addition was complete, the cooling was turned off and the slurry was allowed to stir for 30 minutes at from 5° C. to 15° C. When complete, the reaction was warmed to from 20° C. to 25° C. The organic phase was washed twice with 22,580 mL of 1 N HCl. The organic phase was then washed with 12,600 mL saturated sodium bicarbonate. Next, the organic phase was washed with 12,463 mL of brine and dried over magnesium sulfate. The mixture was filtered through a thin pad of celite and concentrated at from 40° C. to 45° C. to a yellow oil. A total of 2,052 g (7.7 mol, 92%) of the crude N-(2,4-dimethoxy-benzyl)-oxalamic acid ethyl ester was isolated.

In a clean fume hood, a 3-neck round bottom flask equipped with a mechanical stirring assembly, addition funnel, thermocouple with display, nitrogen inlet and drying tube was placed in a heating mantle. The flask was blanketed with a nitrogen atmosphere. N-(2,4-Dimethoxy-benzyl)-oxalamic acid ethyl ester (1116 g, 1 equiv., 4.18 moles), acetonitrile (12.5 L), and 2-(2-pyridyl)-ethylamine (1 equiv., 4.18 moles) were added to the flask under nitrogen. The solution was heated to reflux and this temperature was maintained for a minimum of 20 hours (81° C.). After the reaction was complete, the reaction mixture was transferred to a cold water bath and cooled to 65° C. The solution was next transferred to a round bottom flask and concentrated under vacuum with a bath temperature of from 40° C. to 45° C. The residue was dissolved in 1N HCl (16 L×2 separatory funnels), transferred to a separatory funnel and extracted with isopropyl acetate. (13.95 L×2 separatory funnels). The combined organic layers were extracted with 1N HCl 13.61 L×2 separatory funnels). The combined aqueous layers were washed with isopropyl acetate (3.4 L×2 separatory funnels) and transferred to a 3-neck round bottom flask placed in a cooling bath with a mechanical stirring assembly, addition funnel, and thermocouple with display. 6N NaOH was added to the flask via the addition funnel, and the reaction mixture was maintained at from 20° C. and 30° C. Methylene chloride was added to dissolve the resulting slurry (9.82 L) and the resulting clear solution was transferred to a separatory funnel. The organic phase was collected and washed with aqueous NaOH (6.88 L), dried over $K_2CO_3$, and filtered through a Buchner funnel using a polypropylene cloth filter. The solution was transferred to a round bottom flask and concentrated under vacuum with a bath temperature of from 35° C. to 40° C. The solids were transferred to a clean dry drying tray and vacuum dried at from 40° C. to 45° C. until a constant weight was obtained.

A 3-neck round bottom flask equipped with a mechanical stirring assembly, condenser, thermocouple with display, nitrogen inlet, and drying tube was placed in a heating mantle. The flask was blanketed with a nitrogen atmosphere. 1317 g of crude N-(2,4-Dimethoxy-benzyl)-N'-(2-pyridin-2-yl-ethyl)-oxalamide was added under nitrogen and then 18.7 L of ethyl acetate was added. The reaction mixture was heated to an internal temperature of from 50° C. and 55° C. until a clear solution was obtained. The heat was removed and heptane was added via the addition funnel in a steady stream. After addition was complete, the reaction was placed in an ice bath and cooled to from 20° C. to 25° C. and maintained at this temperature for a minimum of 30 minutes. The material was filtered through a Buchner funnel using a polypropylene filter and transferred to a 2:3 mixture of heptane in ethyl acetate (7 L). The slurry was stirred for 30 minutes and filtered through a Buchner funnel using a polypropylene filter. Solids were rinsed with 800 mL of the 2:3 mixture of heptane in ethyl acetate and dried. The recrystallization wash procedure was repeated to afford 1079 g of the final product (63% yield) in greater than 99.5% purity as determined by HPLC. An additional recrystallization was occasionally necessary to obtain purities greater than or equal to 99.5%. In these cases the material was recrystallized from 8:2 ethyl acetate to heptane in a manner similar to that described above to produce the product in greater than 99.5% purity.

This recrystallization method can be used for the purification of other oxalamide analogs disclosed herein.

Example 24-2

Improved Preparation and Purification of N-(2,4-Dimethoxy-benzyl)-N'-(2-pyridin-2-yl-ethyl)-oxalamide

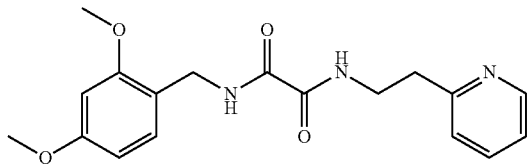 [SMILES: COc1ccc(CNC(=O)C(=O)NCCc2ccccn2)c(OC)c1]

To a 12 L 3-neck round bottom flask equipped with a mechanical stirrer, thermocouple, addition funnel, drying tube, and nitrogen blanketing, immersed in a cooling bath, was charged 2,4-dimethoxybenzylamine hydrochloride (500 g, 2.45 mol) and toluene (6 L). Triethylamine (1027 mL, 7.36 mol) was slowly added and the solution stirred for 1 hour at ambient temperature after which the reaction vessel was placed in a methanol/ice bath and the solution cooled to 0° C. Ethyl 2-chloro-2-oxoacetate (273 mL, 2.45 mol) was added over approximately 25 minutes while maintaining the reaction temperature below about 10° C. The reaction solution was then warmed to 22° C. and stirred at ambient temperature overnight. [The course of the reaction was monitored by gas chromatography by collecting an aliquout of the reaction solution and passing it through a filter syringe then subsequently rinsing the salts with a 1:1 mixture of TEA/THF. Reaction was judged complete when less than 1% of the 2,4-dimethoxybenzylamine is present]

Once the reaction was judged complete, the solution was re-cooled to 15° C. and 1N HCl (aqueous) (3 L) was added at a rate which did not allow the temperature to rise above about 23° C. The reaction solution was transferred to a polyethylene crock and slurried in toluene (2.5 to 4 mL/g of starting materials) and collected by filtration and the filtrate was set aside. The solids are re-slurried in toluene (2.5 to 4 mL/g of starting materials) and the liquid filtrate again collected by filtration.

The combined filtrates were transferred to a reparatory funnel and the organic phase decanted. The solids were treated again with toluene and the organic layer decanted. The combined organic layers were washed with 1N HCl (aq.) (2×2 L), NaHCO$_3$ (sat. aq.) (2×2 L), NaCl (sat. aq.) (2 L), dried over MgSO$_4$, and filtered. The filtrate was charged to a 12 L 3-neck round bottom flask equipped with a mechanical stirrer, thermocouple, addition funnel, drying tube, and heating mantle under nitrogen blanketing. 2-(2-Aminoethyl)pyridine (292 mL) was slowly added maintaining the temperature between 15° C. and 25° C. After addition was complete the reaction mixture was heated to reflux overnight. The reaction vessel was then cooled to approximately 35° C. and methyl tert-butyl ether (6.3 L) was added and the mixture cooled to approximately 20° C. after which the product began to precipitate. The solution was held at 10° C. for 4 hours then at 0° C. to 5° C. for an additional 30 minutes. The product was collected by filtration and washed with heptane (4×6 L) to afford 610 g of crude product. The crude material was charged to a 12 L 3-neck round bottom flask equipped with a mechanical stirrer, thermocouple, addition funnel, drying tube, and heating mantle under nitrogen blanketing. Ethyl acetate (9.15 L, 15 mL/g of crude material) was added and the solution was heated until a clear solution was obtained. Additional heptane (6.71 mL) was added and the resulting slurry was cooled to about 20° C. and stirred for 30 minutes. The resulting solid was collected by filtration then re-slurried in a mixture of heptane/ethyl acetate (2:3) (6.1 L). The solids were again collected by filtration, the filter cake washed with heptane/ethyl acetate (370 mL) and the collected product dried to a constant weight. Yield was 356 g (42%).

Example 25

General Procedure B for the Synthesis of an Oxalamide N-(4-methyl-benzyl)-N'-(2-pyridin-2-yl-ethyl)-oxalamide

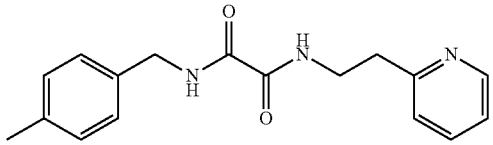 [SMILES: Cc1ccc(CNC(=O)C(=O)NCCc2ccccn2)cc1]

4-Methylbenzyl amine (1 mmol) was allowed to react with ethyl oxalyl chloride (1 equiv.) in the presence of triethyl amine (2 equiv.) in acetonitrile at room temperature for 0.5-1 hour. Then 2-(2-pyridinyl)ethyl amine (1 equiv.) was added and the suspension was heated at 160° C. in a microwave reactor for 5 minutes. The reaction mixture was subject to preparative HPLC to give the pure title oxalamide: yield 60%; m.p. 152-154° C.; m/e=298 [M+1]; $^1$H NMR (CDCl$_3$): δ 2.33 (s, 3H), 3.10 (t, 2H), 3.75 (dt, 2H), 4.43 (d, 2H), 7.10-7015 (m, 4H), 7.18-7.22 (m, 2H), 7.65-7.73 (ra, 2H), 8.12 (b, 1H), 8.60 (d, 1H).

The compound had an EC$_{50}$ for activation of a hT1R1/hT1R3 umami receptor expressed in an HEK293 cell line of 0.41 μM.

Example 26

N-(2-methoxy-4-methylbenzyl)-N'-(2-(pyridin-2-yl)ethyl)oxalamide

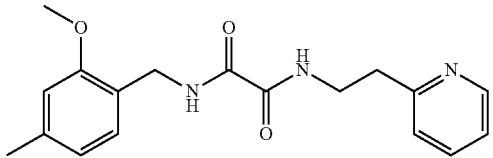 [SMILES: COc1cc(C)ccc1CNC(=O)C(=O)NCCc1ccccn1]

Prepared in a similar manner to example 25 using (2-methoxy-4-methylphenyl) methanamine (example 132a), ethyl oxalyl chloride, and 2-(2-pyridinyl)ethyl amine, yield 20%. m.p: 128-131° C.; m/e=328 [M+1]; $^1$H NMR (CDCl$_3$): 2.33 (s, 3H); 3.02 (t, 2H); 3.73 (m, 2H); 3.84 (s, 3H); 4.42 (d, 2H); 6.70 (m, 2H); 7.14 (m, 3H); 7.60 (m, 1H); 736 (s, 1H); 8.09 (s, 1H); 8.56 (d, 1H).

a. (2-methoxy-4-methylphenyl)methanamine: To a solution of 2-methoxy-4-methylbenzamide (example 132b) (200 mg, 1.21 mmol) in THF (0.5 mL) was added 1 M BH$_3$.THF (2.4 ml, 2.42 mmol) slowly at room temperature. The resulting mixture was heated in a microwave reactor at 130° C. for 7 min. Then 6 N aqueous HCl (1 mL) was added dropwise at room temperature. The resulting mixture was heated in a microwave reactor at 120° C. for 4 min. The reaction mixture was washed with Et$_2$O (3×3 mL), then cooled to 0° C. and 10 N aqueous NaOH (0.8 mL) was added. The aqueous solution was saturated with K$_2$CO$_3$. The product was extracted with CHCl$_3$ (6×5 mL). The organic extracts were dried (1:1

K$_2$CO$_3$/Na$_2$SO$_4$), filtered, concentrated in vacuo to afford 180 mg of (2-methoxy-4-methylphenyl)methanamine which was used directly.

b. 2-methoxy-4-methylbenzamide: 2-methoxy-4-methylbenzoic acid (500 mg, 3.01 mmol) was mixed with 1-ethyl-3-(3-dimethylaminopropyl)carbodiimide hydrochloride (577 mg, 3.01 mmol) and 1-hydroxybenzotriazole (407 mg, 3.01 mmol) in 25 ml of dichloromethane at r.t. and stirred for 5 min. 2M ammonia solution in methanol (4.5 ml, 9.03 mmol) was added, the reaction mixture was stirred at r.t. for about 5 hr. then it was diluted with dichloromethane, washed with 1N HCl, sat. NaHCO$_3$, water and brine, dried over MgSO$_4$, filtered and evaporated to give 440 mg of 2-methoxy-4-methylbenzamide, yield 88%.

The compound had an EC$_{50}$ for activation of a hT1R1/hT1R3 umami receptor expressed in an HEK293 cell line of 0.04 uM.

Example 27

N-(2,4-dimethylbenzyl)-N'-(2-(pyridin-2-yl)ethyl) oxalamide

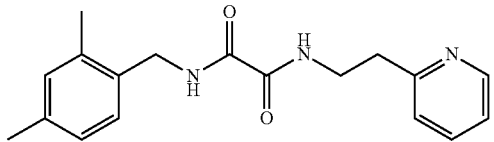 [SMILES: Cc1ccc(CNC(=O)C(=O)NCCc2ccccn2)c(C)c1]

Prepared in a similar manner to example 25 using (2,4-dimethylphenyl)methanamine (example 133a), ethyl oxalyl chloride, and 2-(2-pyridinyl)ethyl amine, yield 60%; m.p. 148-149° C.; m/e=312 [M+1]; $^1$H NMR (CDCl$_3$): 2.28 (s, 3H); 2.30 (s, 3H); 3.05 (t, 2H); 3.76 (dd, 2H); 4.43 (d, 2H); 6.99 (m, 2H); 7.11 (d, 1H); 7.17 (m, 2H); 7.54 (s, 1H); 7.62 (m, 1H); 8.17 (s, 1H); 8.58 (d, 1H).

a. (2,4-Dimethylphenyl)methanamine: Lithium aluminum hydride 1M solution in THF (15.2 ml, 15.2 mmol) was placed in a pre-dried flask under argon at 0° C.; a solution of 2,4-dimethylbenzonitrile (1.0 g, 7.6 mmol) in 15 ml of anhydrous ether was added drop wisely. After the addition, the reaction mixture was warmed up slowly to r.t. and stirred for 3 hr. then it was cooled to 0° C., anhydrous sodium sulfate was added, and 1 ml of water was added drop wisely. The mixture was diluted with ethyl acetate, the insoluble matter was filtered out, the filtrate was washed with water and brine, dried over MgSO$_4$, filtered and evaporated to give 1.03 g of pure (2,4-dimethylphenyl)methanamine in quantitative yield without purification.

The compound had an EC$_{50}$ for activation of a hT1R1/hT1R3 umami receptor expressed in an HEK293 cell line of 0.07 μM.

Example 28

N-(4-ethoxy-2-methoxybenzyl)-N'-(2-(pyridin-2-yl) ethyl)oxalamide

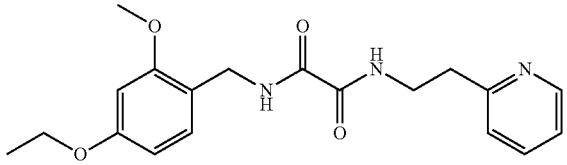 [SMILES: CCOc1ccc(CNC(=O)C(=O)NCCc2ccccn2)c(OC)c1]

Prepared in a similar manner to example 25 using (4-ethoxy-2-methoxyphenyl) methanamine (example 134a), ethyl oxalyl chloride, and 2-(2-pyridinyl)ethyl amine; yield 10%; m.p. 117-118° C.; m/e=358 [M+1]; $^1$H NMR (CDCl$_3$): 1.40 (t, 3H); 3.03 (t, 2H); 3.74 (dd, 2H); 3.82 (s, 3H); 4.01 (dd, 2H); 4.39 (d, 2H); 6.39 (d, 1H); 6.44 (s, 1H); 7.15 (m, 3H); 7.61 (m, 1H); 7.81 (s, 1H); 8.10 (s, 1H); 8.56 (d, 1H).

a. (4-ethoxy-2-methoxyphenyl)methanamine: To a solution of 4-ethoxy-2-methoxybenzaldehyde (example 134b) (880 mg, 4.88 mmol) in 50 ml of anhydrous methanol, were added ammonium acetate (7.5 g, 97.60 mmol) and sodium cyanoborohydride (613 mg, 9.76 mmol). The reaction mixture was stirred at r.t. for about 4 hr. then it was concentrated on a rotary evaporator, the residue was diluted with water and basified with 15% aqueous NaOH, extracted with ethyl acetate, washed with water and brine, dried over MgSO$_4$, filtered and the solvent was evaporated, the residue was column chromatographed on silica gel (DCM/MeOH 9:1) to afford 150 mg of product; yield 17% (The method was not optimized).

b. 4-Ethoxy-2-methoxybenzaldehyde: To a solution of 4-hydroxy-2-methoxybenzaldehyde (1.0 g, 6.57 mmol) in 10 ml of acetone, was added potassium carbonate (0.91 g, 6.57 mmol) and iodoethane (1.6 ml, 19.71 mmol), the reaction mixture was stirred at r.t. over night. Acetone was removed on a rotary evaporator; the residue was diluted with water and ethyl acetate; extracted with ethyl acetate, washed with brine, dried over MgSO$_4$, filtered and evaporated to give crude product, which was column chromatographed on silica gel (ethyl acetate/hexane=1:4) to give 943 mg of product; yield 80%.

The compound had an EC$_{50}$ for activation of a hT1R1/hT1R3 umami receptor expressed in an HEK293 cell line of 0.1 μM.

Example 29

N-(2-chlorobenzyl)-N'-(2-(pyridin-2-yl)ethyl)oxalamide

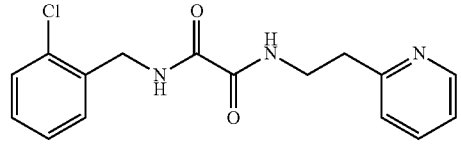 [SMILES: O=C(NCCc1ccccn1)C(=O)NCc1ccccc1Cl]

Prepared in a similar manner to example 25 using (2-chlorophenyl)methanamine, ethyl oxalyl chloride, and 2-(2-pyridinyl)ethyl amine; yield 45%; m/e=318 [MA].

The compound had an EC$_{50}$ for activation of a hT1R1/hT1R3 umami receptor expressed in an HEK293 cell line of 0.01 μM.

Example 30

N$^1$-(2-methoxy-4-methylbenzyl)-N$^2$-(2-(5-methylpyridin-2-yl)ethyl)oxalamide

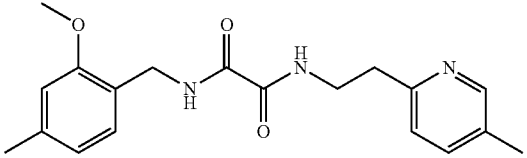

$^1$H NMR (CDCl$_3$, 500 MHz): δ 2.29 (3H, s); 2.33 (3H, s); 2.97 (2H, t, J=6.5 Hz); 3.71 (2H, q, J=6.5 Hz); 3.83 (3H$_5$ s); 4.40 (2H, d, J=6.2 Hz); 6.68 (1H, s); 6.69 (1H, d, J=7.7 Hz);

7.02 (1H, d, J=7.9 Hz); 7.09 (1H, d, J=7.5 Hz); 7.40 (1H, dd, J$_1$=1.8 Hz, J$_2$=7.8 Hz); 7.85 (1H, br t); 8.06 (1H, br t); 8.38 (1H, s, J=7.5 Hz).

13C NMR (CDCl$_3$, 500 MHz): 18.3, 21.8, 36.5, 39.1, 39.6, 55.5, 111.5, 121.3, 122.3, 123.0, 129.9, 131.3, 137.4, 139.6, 150.0, 155.7, 157.7, 159.7, 160.1.

Elemental Analysis: Calculated for C$_{18}$H$_{21}$N$_3$O$_3$.1/4H$_2$O: C, 65.97; H, 6.85; N, 12.15. Found. C, 66.10; H, 7.34; N, 12.17. MS (342, M+1). White powder, melting point=133.5-134° C.

The compound had an EC$_{50}$ for activation of a hT1R1/hT1R3 umami receptor expressed in an HEK293 cell line of 0.03 μM.

The compound was synthesized via the reaction sequence illustrated in the diagram below, and the details of each of the six synthetic steps are subsequently provided below.

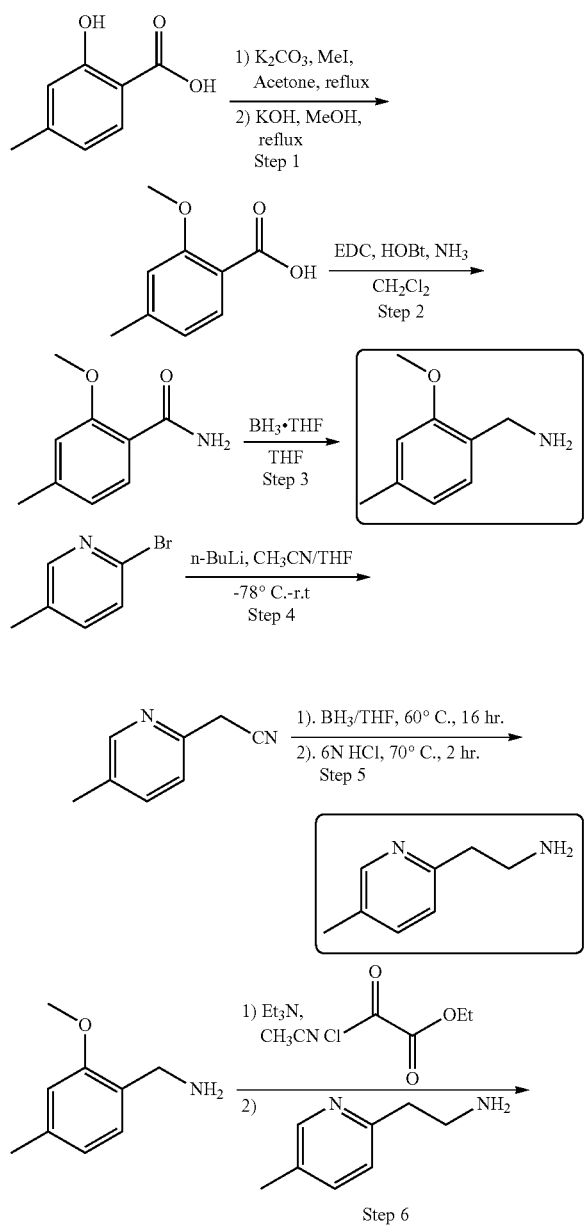

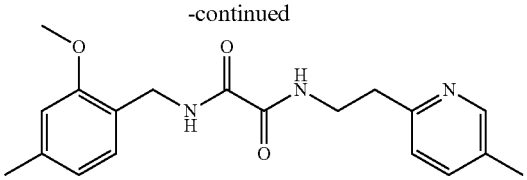

Step 1: To a solution of 2-hydroxy-4-methylbenzoic acid (25 g, 0.164 mol) in acetone (350 mL) was added K$_2$CO$_3$ (68 g, 0.492 mmol) followed by MeI (41 mL, 0.656 mmol) and the reaction mixture heated at reflux for 48 hrs. After cooling to r.t. the reaction mixture was filtered and the filtrate was evaporated to give the crude methyl 2-methoxy-4-methylbenzoate. KOH (11.3 g, 1.2 eq) was dissolved in MeOH (300 mL) and the crude ester was added to the mixture and the solution heated at reflux 48 hrs. After cooling the reaction mixture was acidified with aq. HCl (1N) and extracted with ethyl acteate. The organic layer was washed with brine, dried over MgSO$_4$, filtered and evaporated. The residue was triturated with Ethyl acetate/Hexane to give 20 g of 2-methoxy-4-methylbenzoic acid as a cream white solid (85% yield)

Step 2: To a mixture of 2-methoxy-4-methylbenzoic acid (20 g, 120.4 mmol), EDC (23.1 g, 120.4 mmol) and HOBt (16.3 g, 120.4 mmol) in dichloromethane (1 L) was added NH$_3$ (7N in MeOH, 52 mL, 3 eq) dropwise. The reaction mixture was stirred at room temperature overnight then washed successively with HCl (1N), saturated aq.NaHCO$_3$, water and brine, dried over MgSO$_4$, filtered and evaporated. The residue was recrystallized from ethyl acetate/hexane to give 16.5 gr of 2-methoxy-4-methylbenzamide (83% yield).

Step 3: To a solution of 2-methoxy-4-methylbenzamide (14.55 g, 88.08 mmol) in dry THF (50 mL) was added dropwise Borane-tetrahydrofuran complex (1.0 M in THF, 220 mL, 2.5 eq) at 0° C. under N$_2$ atmosphere. The reaction mixture was then heated to 60° C. overnight. The reaction was cooled to room temperature, aq.HCl (6 N, 37 mL) was added carefully and the reaction mixture was then heated at 70° C. for 2 hrs. After cooling, water was added and the resulting solution was washed with ether. The aqueous layer was basified with aq. NaOH (10 N) at 0° C. and saturated with K$_2$CO$_3$ then extracted with ethyl acetate. The organic layer was washed with brine, dried over MgSO$_4$, filtered and evaporated to give 8.5 g of (2-methoxy-4-methylphenyl)methanamine. (64% yield)

Step 4: To a solution of anhydrous acetonitrile (10.1 mL, 191.83 mmol, 3.3 eq) in dry THF (500 mL) was added dropwise n-BuLi (2.5 M in Hexane, 69.8 mL, 174.39 mmol, 3 eq) at −78° C. under N$_2$ atmosphere. The resulting white suspension was stirred at −78° C. for 1 hr, and then a solution of 2-bromo-5-methylpyridine (10.0 g, 58.13 mmol, 1 eq) in dry THF (30 mL) was added. The reaction mixture was kept at −78° C. for 1 hr then warmed up slowly to r.t and stirred for another 1 hr. Ice/water was added and the layer was separated. The organic layer was washed with water and brine, dried over MgSO$_4$, filtered and evaporated to give 18 g of crude 2-(5-methylpyridin-2-yl)acetonitrile. Since the product is very volatile, it was not dried under high vacuum and still contains some solvent.

Step 5: To a solution of 18 g of crude 2-(5-methylpyridin-2-yl)acetonitrile in dry THF (100 mL) was added dropwise Borane-tetrahydrofuran complex (1.0 M in THF, 232 mL, 232.5 mmol, 4 eq) at 0° C. under N$_2$ atmosphere. The reaction mixture was then heated to 60° C. overnight. The reaction was cooled to room temperature, aq.HCl (6 N, 40 mL) was added carefully and the reaction mixture was then heated at 70° C.

for 2 hrs. After cooling, water was added and the resulting solution was washed with ether. The aqueous layer was basified with aq. NaOH (10 N) at 0° C. and saturated with $K_2CO_3$ then extracted with ether (5×100 mL). The organic layer was dried over $MgSO_4$, filtered and evaporated to give 7.6 g of crude 2-(5-methylpyridin-2-yl)ethanamine. (96% crude yield)

When evaporating the ether, the water bath temperature was kept at 25° C. since the boiling point of the amine is probably around 100° C.

Step 6: A mixture of 2 g of (2-methoxy-4-methylphenyl)methanamine (from step 3) and $Et_3N$ (3.7 mL, 2 eq) in dry $CH_3CN$ (45 mL) was cooled to 0° C. under $N_2$ atmosphere and ethyl 2-chloro-2-oxoacetate (1.47 mL, 1 eq) was added dropwise. After the addition was complete, the reaction mixture was stirred at room temperature for 4 hours and 2-(5-methylpyridin-2-yl)ethanamine (2.52 g, 1.4 eq, from step 5) was added. The reaction was heated at reflux for 24 hours. After cooling the solvent was removed under reduced pressure and the residue was dissolved in ethyl acetate and washed successively with water and brine, dried over $MgSO_4$, filtered and evaporated. The residue was chromatographed on silica gel (eluent: 25-35% acetone in hexane) and recrystallized from ethyl acetate/hexane and ethanol/water to give 650 mg of $N^1$-(2-methoxy-4-methylbenzyl)-$N^2$-(2-(5-methylpyridin-2-yl)ethyl)oxalamide (15%).

Example 30-1

Improved Preparation and Purification of $N^1$-(2-methoxy-4-methylbenzyl)-$N^2$-(2-(5-methylpyridin-2-yl)ethyl)oxalamide $N^1$-(2-methoxy-4-methylbenzyl)-$N^2$-(2-(5-methylpyridin-2-yl)ethyl)oxalamide was prepared according to the synthetic strategy shown in Scheme 1. The following synthetic description makes reference to the compound numbering shown in this scheme.

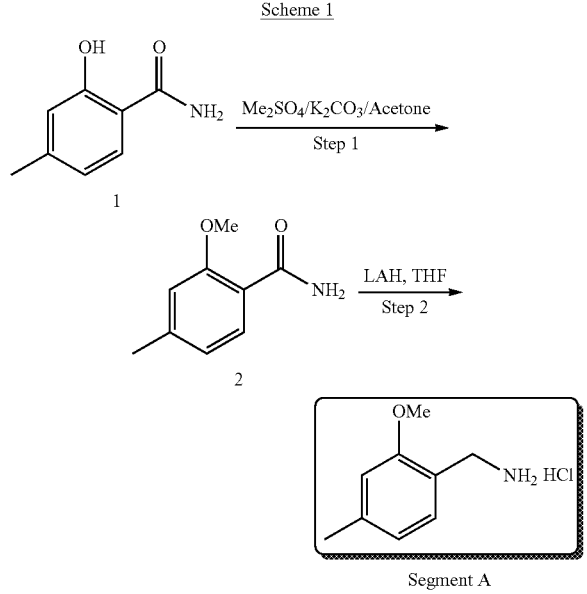

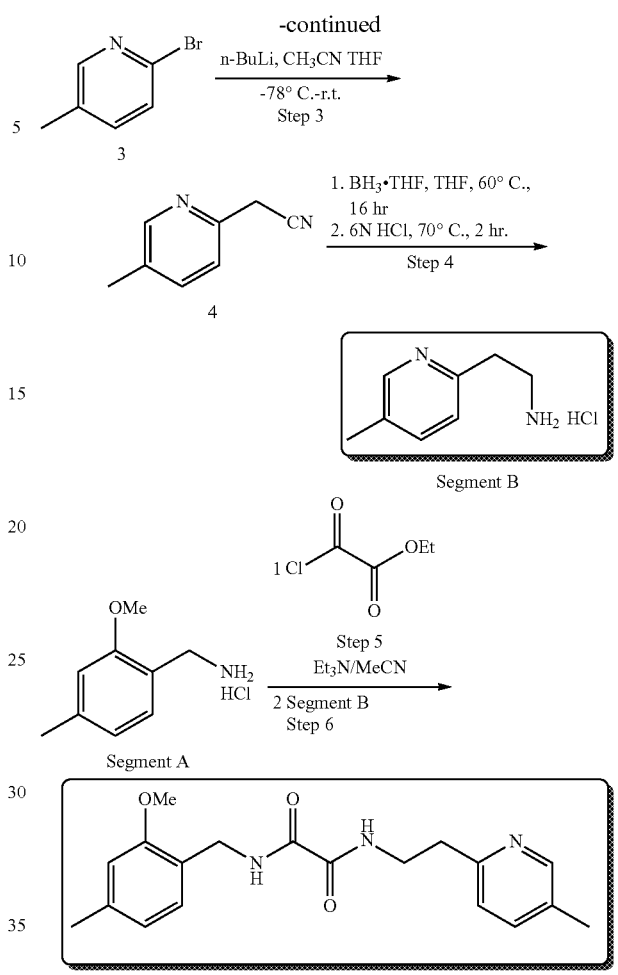

Step 1—Preparation of 2-methoxy-4-methyl-benzamide

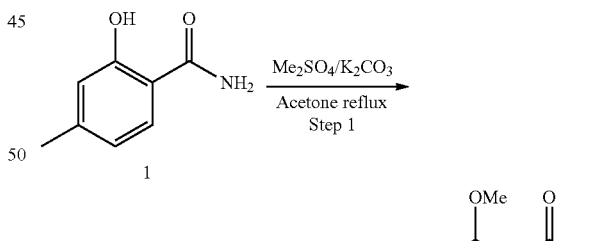

A mixture of 2-hydroxy-4-methyl-benzamide (15.1 g, 0.1 mol) and $K_2CO_3$ (41.7 g, 0.3 mol) in 1000 mL of acetone was heated to reflux for 1 hour before $Me_2SO_4$ was added at that temperature. The resulting mixture was refluxed overnight. The reaction mixture was then filtered and the filtrate was concentrated. The resulting residue was dissolved in 1000 mL of methanol/ammonia (1:1) and stirred at room temperature for 3 hours. After removal of the solvent, the residue was recrystallized from EtOAc/PE to afford 102 g of 2-methoxy-4-methyl-benzamide (yield 61%). $^1$H NMR (400 MHz, DMSO-$d_6$): δ 7.72 (d, J=7.6 Hz, 1H), 7.57 (br s, 1H), 7.46 (br s, 1H), 6.92 (s, 1 H), 6.81 (d, J=7.6 Hz, 1 H), 3.85 (s, 3H), 2.31 (s, 3H).

Step 2—Preparation of 2-methoxy-4-methyl-benzylamine hydrochloride salt

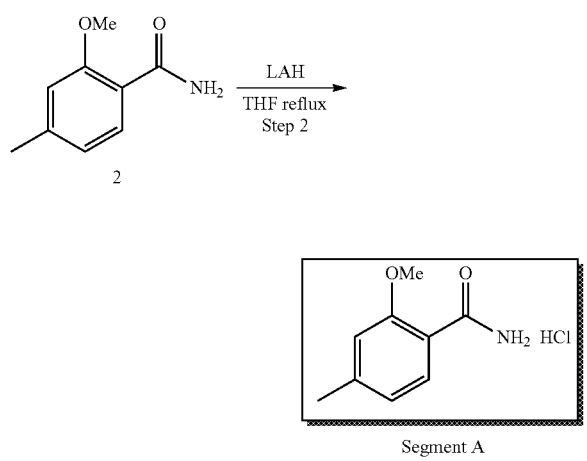

Segment A

To a solution of 2-methoxy-4-methyl-benzamide (41 g, 0.25 mol) in 1500 mL of THF was added lithium aluminum hydride (19 g, 0.5 mol) at 0° C. under $N_2$ atmosphere. The resulting mixture was heated to reflux overnight. After cooling, the reaction mixture was quenched by 10% NaOH aqueous solution. The reaction mixture was filtered and the filtrate was concentrated to the crude product. The residue was dissolved in $Et_2O$ and then added HCl/$Et_2O$ solution. The precipitate was collected and washed with TMBE to afford the segment A in Scheme 1 (35 g, yield 75%). $^1$H NMR (300 MHz, DMSO-$d_6$): δ 8.15 (br s, 3H), 7.25 (d, J=7.5 Hz, 1H), 6.88 (s, 1H), 6.77 (d, J=7.5 Hz, 1H), 3.94-3.86 (m, 2H), 3.79 (s, 3H), 2.30 (s, 3H).

Step 3—Preparation of 2-(5-methylpyridin-2-yl)acetonitrile

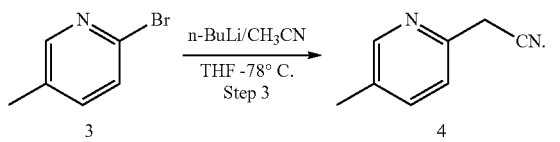

To a solution of anhydrous acetonitrile (10.1 mL, 191.83 mmol, 3.3 equiv.) in dry THF (500 mL) was added dropwise n-butyl lithium (2.5 M in hexane, 69.8 mL, 174.39 mmol, 3 equiv.) at minus 78° C. under a nitrogen atmosphere. The resulting white suspension was stirred at minus 78° C. for 1 hour, and then a solution of 2-bromo-5-methylpyridine (10.0 g, 58.13 mmol, 1 equiv.) in dry THF (30 mL) was added. The reaction mixture was kept at minus 78° C. for 1 hour and then warmed up slowly to room temperature and stirred for another hour. Ice/water was added and the layer was separated. The organic layer was washed with water and brine, dried over $MgSO_4$, filtered, and evaporated to give 18 g of crude product, which was used for next step reaction without further purification.

Step 4—Preparation of 2-(5-methylpyridin-2-yl)ethamine hydrochloride salt

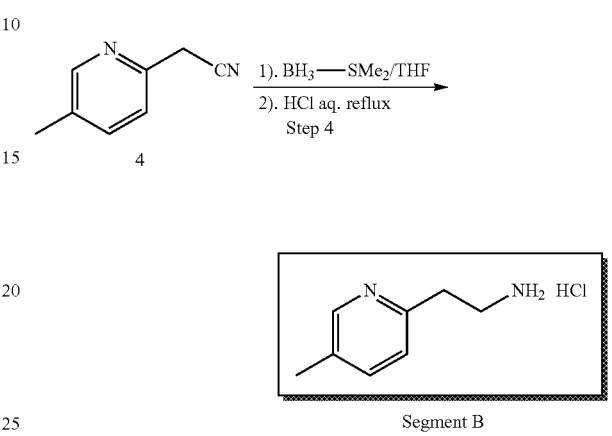

Segment B

To a solution of 18 g of crude 2-(5-methylpyridin-2-yl) acetonitrile in dry THF (100 mL) was added dropwise borane-dimethylsulfide complex (10 M in THF, 23.2 mL, 232.5 mmol, 4 equiv.) at 0° C. under nitrogen atmosphere. The reaction mixture was then heated to 60° C. overnight. The reaction was cooled to room temperature, aqueous HCl (6 N, 40 mL) was added carefully, and the reaction mixture was heated at 70° C. for 2 hours. After cooling, water was added and the resulting solution was washed with ether. The aqueous layer was basified with aqueous NaOH (10 N) at 0° C. and saturated with $K_2CO_3$, followed by extraction with ether (5×100 mL). The organic layer was dried over $MgSO_4$, filtered, and evaporated to give 7.6 g of crude product. The crude product was dissolved in $CH_2Cl_2$ and treated with HCl/$Et_2O$ to give 2-(5-methylpyridin-2-yl)ethamine hydrochloride salt (4 g, yield 40% based on compound 3), which was used for the next step reaction without further purification.

Step 5—Preparation of $N^1$-(2-methoxy-4-methylbenzyl)-$N^2$-(2-(5-methylpyridin-2-yl)ethyl)oxalamide (one pot)

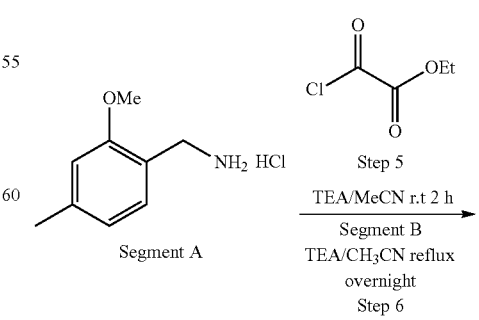

Segment A

-continued

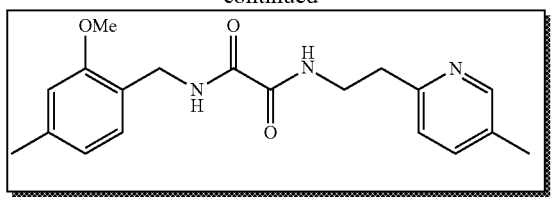

To a mixture of 1.8 g of (2-methoxy-4-methylphenyl)methanamine hydrochloride salt and triethylamine (5.1 mL, 3 equiv.) in dry acetonitrile (45 mL) was added ethyl 2-chloro-2-oxoacetate (1.47 mL, 1 equiv.) dropwise at 0° C. under nitrogen atmosphere. After the addition was complete, the reaction mixture was stirred at room temperature for 2 hours and 2-(5-methylpyridin-2-yl)ethanamine (2.52 g, 1.4 equiv.) was added. The reaction was heated at reflux for 24 hours. After removal of the solvent, the residue was dissolved in ethyl acetate and washed successively with water and brine, dried over MgSO$_4$, filtered, and evaporated. The residue was washed with methyl t-butyl ether (20 mL) and recrystallized from ethanol to give 1.3 g of N$^1$-(2-methoxy-4-methylbenzyl)-N$^2$-(2-(5-methylpyridin-2-yl)ethyl) oxalamide as a white powder (yield 30%).

m/e=342 [M+1]; m.p.=133.5-134° C.; $^1$H NMR (400 MHz, CDCl$_3$): δ 8.38 (s, 1H), 8.07 (br s, 1H), 7.85 (br s, 1H), 7.40 (dd, J$_1$=1.6 Hz, J$_2$=8 Hz, 1H), 7.12 (d, J=7.6 Hz, 1H), 7.03 (d, J=7.6 Hz, 1H), 6.71 (d, J=7.2 Hz, 1H), 6.68 (s, 1H), 4.42 (d, J=6.4 Hz, 2H), 3.84 (s, 3H), 3.71 (q, J=6.4 Hz, 2H), 2.97 (t, J=6.4 Hz, 2H), 2.33 (s, 3H), 2.30 (s, 3H); $^{13}$C NMR (400 MHz, CDCl$_3$): 18.6, 22.2, 36.9, 39.4, 39.9, 55.8, 111.9, 121.6, 122.6, 123.3, 130.2, 131.6, 137.7, 139.9, 150.5, 156.1, 158.1, 160.0, 160.5; Elemental Analysis: Calculated for C$_{18}$H$_{21}$N$_3$O$_3$.1/4 H$_2$O: C, 65.97; H, 6.85; N, 12.15. Found. C, 66.10; H, 7.34; N, 12.17.

Example 30-2

Alternative Improved Preparation and Purification of N$^1$-(2-methoxy-4-methylbenzyl)-N$^2$-(2-(5-methylpyridin-2-yl)ethyl)oxalamide N$^1$-(2-methoxy-4-methylbenzyl)-N$^2$-(2-(5-methylpyridin-2-yl)ethyl)oxalamide was also prepared according to the synthetic strategy shown in Scheme 2. The following synthetic description makes reference to the compound numbering shown in this scheme.

Scheme 2

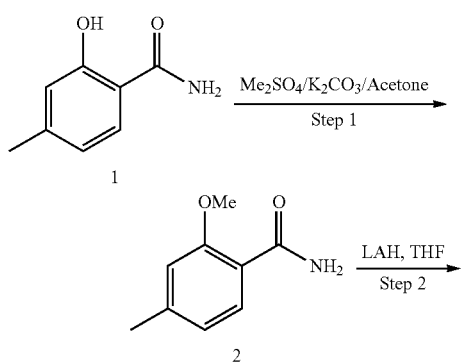

-continued

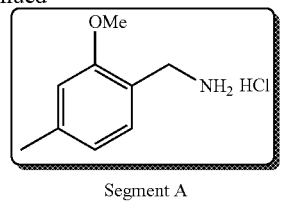

Segment A

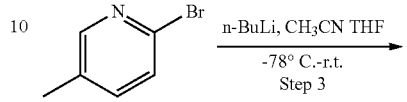

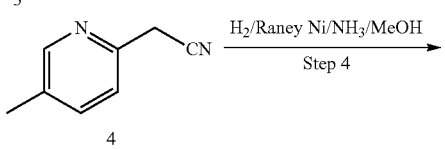

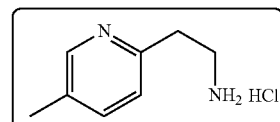

Segment B

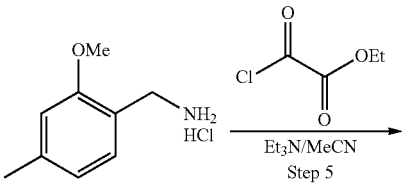

Segment A

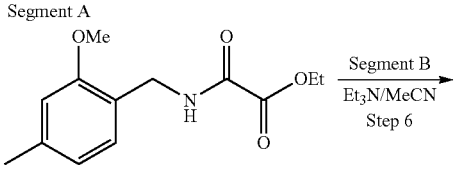

5

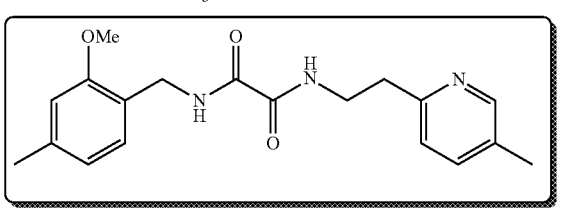

2-methoxy-4-methyl-benzamid and 2-methoxy-4-methyl-benzylamine hydrochloride salt were prepared as described above.

Step 3—Preparation of 2-(5-methylpyridin-2-yl)acetonitrile

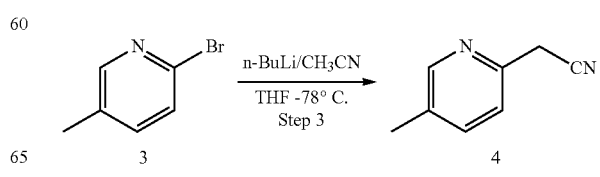

To a solution of anhydrous acetonitrile (10.1 mL, 191.83 mmol, 3.3 equiv.) in dry THF (500 mL) was added dropwise n-butyl lithium (2.5 M in hexane, 69.8 mL, 174.39 mmol, 3 equiv.) at minus 78° C. under nitrogen atmosphere. The resulting white suspension was stirred at minus 78° C. for 1 hour, and then a solution of 2-bromo-5-methylpyridine (10.0 g, 58.13 mmol, 1 equiv.) in dry THF (30 mL) was added. The reaction mixture was kept at minus 78° C. for 1 hour and then warmed up slowly to room temperature and stirred for another hour. Ice water was added and the layer was separated. The organic layer was washed with water and brine, dried over MgSO$_4$, filtered, and evaporated to give 18 g of crude product. The crude product was purified by silica-gel column chromatography (eluent, PE/EtOAc=15:1) to give 2-(5-methylpyridin-2-yl) acetonitrile (6.2 g, yield 80%). $^1$H NMR (300 MHz, CDCl$_3$): δ 8.40 (d, J=3.0 Hz, 1H), 7.54 (dd, J$_1$=3.0 Hz, J$_2$=6.0 Hz, 1 H), 7.32 (d, J=6.0 Hz, 1 H), 3.90 (s, 2H), 2.40 (s, 3H).

Step 4—Preparation of 2-(5-methylpyridin-2-yl)ethamine

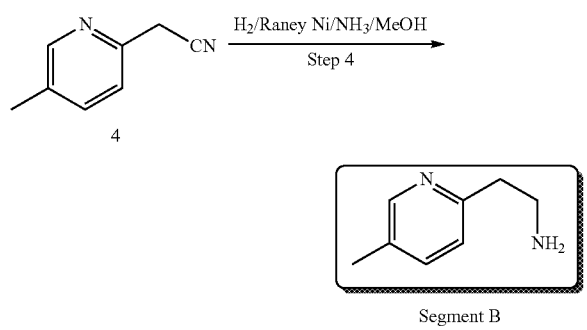

To a solution of crude 2-(5-methylpyridin-2-yl) acetonitrile (3 g, 22.7 mmol) in saturated NH$_3$-MeOH (50 mL) was added 0.5 g of Raney Ni. The reaction mixture was then hydrogenated under 6 MPa at room temperature overnight. The reaction mixture was filtered and the filtrate was concentrated in vacuo to afford 2-(5-methylpyridin-2-yl)ethamine (3.02 g, yield 97%), which was used without further purification. No impurities were detected by $^1$H-NMR. $^1$H NMR (400 MHz, DMSO-d$_6$): δ 8.27 (br s, 1H), 7.46 (d, J=8.4 Hz, 1H), 7.10 (d, J=8.4 Hz, 1 H), 2.69-2.83 (m, 4H), 2.21 (s, 3H).

Step 5-Preparation of ethyl 2-(2-methoxy-4-methylbenzylamino)-2-oxoacetate

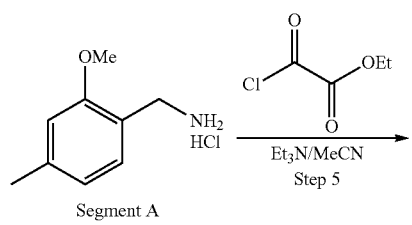

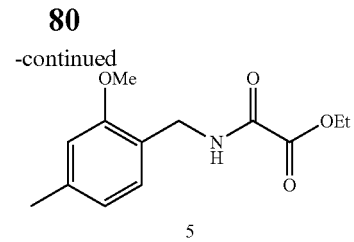

To a solution of 2-methoxy-4-methylbenzylamine hydrochloride salt (10 g, 0.053 mol) and triethylamine (30 g) in dry acetonitrile (100 mL) was added ethyl 2-chloro-2-oxoacetate (7.28 g, 0.053 mol) dropwise at 0° C. under nitrogen atmosphere. After the addition was completed, the reaction mixture was stirred at room temperature for 4 hours. The solvents were removed in vacuo and the residue was dissolved in ethyl acetate, washed with brine (100 mL×3), dried with Na$_2$SO$_4$, and the solvents were removed to afford the title compound 5 (12 g, yield 89%), which was used for next step reaction without further purification. No impurities were detected by $^1$H-NMR. $^1$H NMR (400 MHz, DMSO-d$_6$): δ 9.10 (br s, 1H), 6.98 (d, J=8 Hz, 1H), 6.79 (s, 1H), 6.70 (d, J=8 Hz, 1H), 4.19-4.27 (m, 4H), 3.77 (s, 3H), 2.26 (s, 3H), 1.26 (t, J=7.2 Hz, 3 H).

Step 6—Preparation of N$^1$-(2-methoxy-4-methylbenzyl)-N$^2$-(2-(5-methylpyridin-2-yl)ethyl) oxalamide

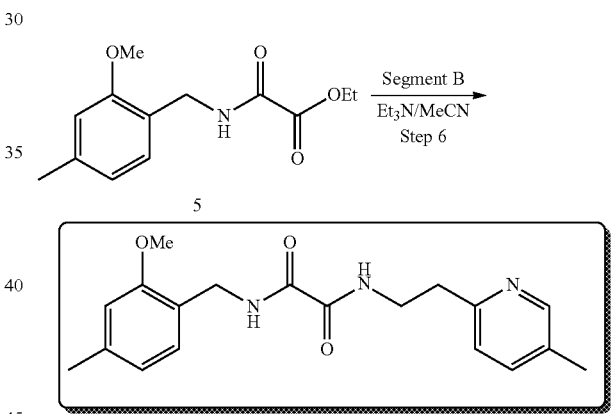

To a mixture of compound 5 (36.9 g, 0.147 mol) and Segment B (30 g, 0.22 mol) was added triethylamine (120 mL) and dry acetonitrile (800 mL). The reaction mixture was heated to reflux for 34 hours. The solvents were removed by evaporation in vacuo and the residue was dissolved in ethyl acetate (1 L), washed with water (300 mL×3), and dried with Na$_2$SO$_4$. After filtration and removal of solvents in vacuo, the residue was recrystallized from ethanol/water (10:1) to give 17 g of N$^1$-(2-methoxy-4-methylbenzyl)-N$^2$-(2-(5-methylpyridin-2-yl)ethyl) oxalamide (yield 44%). $^1$H NMR (300 MHz, DMSO-d$_6$): δ 8.83 (m, 2H), 8.30 (d, J=2.1 Hz, 1H), 7.49 (dd, J$_1$=2.1 Hz, J$_2$=8.4 Hz, 1H), 7.20 (d, J=7.8 Hz, 1H), 6.91 (d, J=7.5 Hz, 1H), 6.79 (s, 1H), 6.68 (d, J=7.5 Hz, 1 H), 4.23 (d, J=6 Hz, 2 H), 3.77 (s, 3H), 3.43-3.50 (q, J$_1$=7.5 Hz, J$_2$=14.4 Hz, 2H), 2.89 (t, J=7.5 Hz, 2 H), 2.23 (s, 3H), 2.26 (s, 3H).

This method resulted in an improved yield of 85% when compared to the previous example (40%) yield by purification of compound 4 with column chromatography and by using H$_2$/Raney Ni instead of BH$_3$-SMe$_2$. Further, the one-pot preparation of N$^1$-(2-methoxy-4-methylbenzyl)-N$^2$-(2-

(5-methylpyridin-2-yl)ethyl) oxalamide shown in the previous example, was divided into two steps in this example. The yield was improved to 44% by purification of 2-(2-methoxy-4-methylbenzylamino)-2-oxoacetate in this example, from 30% yield without any purification of 2-(2-methoxy-4-methylbenzylamino)-2-oxoacetate in the one pot preparation described in the previous example.

Umami/Savory Flavor Experiments Using Human Panelists:

General Panelist Selection: Basic screening of sensory taste testers: Potential panelists were tested for their abilities to rank and rate intensities of solutions representing the five basic tastes. Panelists ranked and rated intensity of five different concentrations of each of the five following compounds: sucrose (sweet), sodium chloride (salty), citric acid (sour), caffeine (bitter), and monosodium glutamate (savory). In order to be selected for participation in testing, panelists needed to correctly rank and rate samples for intensity, with a reasonable number of errors.

Preliminary Taste Tests: The panelists selected in the above procedure were deemed qualified for performing Preliminary Taste Testing procedures. The preliminary taste tests are used to evaluate new compounds for intensity of basic tastes and off-tastes. A small group of panelists (n=5) taste approximately 5 concentrations of the compound (range typically between 1-100 μM, in half-log cycles, e.g., 1, 3, 10, 30, and 100 μM) in water and in a solution of 12 mM MSG to evaluate enhancement. Panelists rate the five basic tastes (sweet, salty, sour, bitter, and savory) as well as off-tastes (such as chemical, metallic, sulfur) on a labeled magnitude scale. Samples are served in 10 mL portions at room temperature. The purpose of the test is to determine the highest concentration at which there is no objectionable off-taste, and determine if obvious savory taste or enhancement of savory taste exists at any of the concentrations tested.

If the compound is effective and does not have objectionable off-tastes, it is tested with a trained (expert panel) in a larger study.

Trained Panelist Selection: A trained expert panel was used to further evaluate compounds that had been tested with the preliminary taste test.

Panelists for the trained panel were selected from the larger group of qualifying taste panelists. Panelists were further trained on savory taste by ranking and rating experiments using MSG and IMP combinations. Panelists completed a series of ranking, rating, and difference from reference tests with savory solutions. In ranking and rating experiments, panelists evaluated easy MSG concentrations (0, 6, 18, 36 mM) and more difficult MSG concentrations (3, 6, 12, 18 mM MSG) in water.

Compound testing with Trained Panel: Compounds tested by the trained panel were evaluated in difference from reference experiments. Panelists were given a reference sample (12 mM MSG+100 μM IMP) and asked to rate samples on a scale of −5 to +5 in terms of difference in savory taste from the reference (score: −5=much less savory taste than the reference; 0=same savory taste as the reference; +5=much more savory taste than the reference). Test samples were solutions with varying amounts of MSG, IMP, and the compound. Typically, each session compares the reference sample to numerous test samples. Tests typically included various samples with varying concentrations of MSG and IMP, as well as one blind sample of the reference itself, to evaluate panel accuracy. Results of the taste tests are describe in table 3 and shows that compounds of the invention have been found to provide savory taste or enhancement of the savory taste at 3 μM+MSG when compared to 100 μM IMP+MSG. Compounds were tested against the reference in samples with and without 12 mM MSG. All samples were presented in 10 ml volumes at room temperature. Two sessions were completed for each compound tested to evaluate panel reproducibility.

Taste Test in Product Prototype: could be done similarly as described above.

TABLE 3

Savory Taste Test Results

| Compound No. | Chemical Name | Taste Data |
|---|---|---|
| Example 1 | N-(heptan-4-yl)benzo[d][1,3]dioxole-5-carboxamide | 12 mM MSG + 3 μM cpd as strong as 12 mM MSG + 100 μM IMP |
| Example 5 | (R)-methyl 2-(benzo[d][1,3]dioxole-6-carboxamido)-4-methylpentanoate | 12 mM MSG + 10 μM cpd as strong as 12 mM MSG + 100 μM IMP |
| Example 18 | (R)—N-(1-methoxy-4-methylpentan-2-yl)-3,4-dimethylbenzamide | 12 mM MSG + 3 μM cpd as strong as 12 mM MSG + 100 μM IMP |
| Example 19 | (R)-methyl-2-(2,3-dimethylfuran-5-carboxamido)-4-methylpentanoate | 12 mM MSG + 10 μM cpd as strong as 12 mM MSG + 100 μM IMP |
| Example 20 | 4-Methoxy-N-(1-methoxymethyl-3-methyl-butyl)-3-methyl-benzamide | 12 mM MSG + 3 μM cpd as strong as 12 mM MSG + 100 μM IMP |
| Example 24 | N-(2,4-Dimethoxy-benzyl)-N'-(2-pyridin-2-yl-ethyl)-oxalamide | 12 mM MSG + 1 μM cpd as strong as 12 mM MSG + 100 μM IMP; 1 μM cpd as strong as 12 mM MSG |
| Example 26 | N-(2methoxy-4-methylbenzyl)-N'-(2(5-methylpyridin-2-yl)ethyl)oxalamide | 12 mM MSG + 1 μM cpd as strong as 12 mM MSG + 100 μM IMP; 1 μM cpd as strong as 12 mM MSG |
| Example 30 | $N^1$-(2-methoxy-4-methylbenzyl)-$N^2$-(2-(5-methylpyridin-2-yl)ethyl)oxalamide | 12 mM MSG + 0.3 μM cpd as strong as 12 mM MSG + 100 μM IMP; 0.3 μM cpd as strong as 12 mM MSG |

TABLE 3-continued

Savory Taste Test Results

| Compound No. | Chemical Name | Taste Data |
|---|---|---|
| Example 22 | (S)—N-(2,3-Dihydro-1H-inden-1-yl)-4-methoxy-3-methylbenzamide | 12 mM MSG + 1 µM cpd as strong as 12 mM MSG + 100 µM IMP<br>1 µM cpd as strong as 12 mM MSG |

Example 31

Soup Preparation Using an Ethanol Stock Solution

A compound from Table 3 is diluted using 200 proof ethanol to 1000× the desired concentration in soup. The compound can be sonicated and heated to ensure complete solubility in ethanol. The soup from bouillon base is made by adding 6 g of vegetable bouillon base in 500 mL of hot water in a glass or stoneware bowl. The water is heated to 80° C. The concentration of MSG in the dissolved bouillon is 2.2 g/L and there is no IMP added. After the bouillon base is dissolved, the ethanol stock solution is added to the soup base. For 500 mL of soup, 0.5 mL of the 1000× ethanol stock is added for a final ethanol concentration of 0.1%. If the ethanol interferes with the taste of the soup, a higher concentration of ethanol stock solution can be prepared provided the compound is soluble.

Example 32

Chip Preparation

A salt mixture of a compound of the invention is made by mixing with salt such that a 1.4% of the salt mixture added w/w to chips would result in the desired concentration of the compound. For 1 ppm final of the compound on chips, 7 mg of the compound is mixed with 10 g of salt. The compound is ground using a mortar and pestle with the salt and the compound and salt are mixed well. The chips are broken into uniform small pieces by using a blender. For each 98.6 g of chips, 1.4 g of the salt mixture is weighed out. The chip pieces are first heated in a microwave for 50 seconds or until warm. The pieces are spread out on a large piece of aluminum foil. The salt mixture is spread evenly over the chips. The chips are then placed in a plastic bag making sure that all the salt is place in the bag as well. The salt mixture and chips are then shaken to ensure that the salt is spread evenly over the chips.

Example 33

Spicy Tomato Juice or Bloody Mary Mix

A compound of the invention is added as a dry ingredient to a spice blend, which may optionally include monosodium glutamate, and blended thoroughly. Spice blend is dispersed into a portion of tomato paste, blended, and that blended paste is further blended into the remaining paste. The paste is then diluted with water to make spicy tomato juice or Bloody Mary mix.

Example 34

Human Taste Tests of Low Sodium Tomato Juice

Human taste tests were conducted in order to evaluate the ability of the compounds of the invention to enhance the savory flavor of low sodium tomato juice (which naturally comprises some monosodium glutamate).

Sample Preparation Procedure

The final tomato juice samples for taste testing were prepared so as to comprise 90% (by volume) pre-made low sodium tomato juice stock (pH 4.2, 80-100 mg Na/8 oz, 16 mM of naturally occurring MSG), 5% (by volume) of stock solutions formulated to produce selected final levels of sodium of final juice, and 5% (by volume) of a stock solution of the compound of the invention. Selected oxalamide compounds of the invention were dissolved in LSB (low sodium phosphate buffer), to provide a stock solution at 20 times the desired final concentration in the final tomato juice. The desired final sodium concentration of the final tomato juice was most experiments 73.6 mM (400 mg sodium in 8 oz. of juice), therefore a stock solution of NaCl was made at 1.48 M NaCl. The pH for the stock solutions was adjusted to 4.2 using a 1 M citric acid solution, and the stock solutions were sonicated to ensure the additive compounds were completely dissolved. To produce a 1,000 mL final sample of tomato juice sample for taste testing, 50 mL of the test compound stock solution, and 50 mL of the sodium chloride were added to 900 mL of the pre-made low sodium tomato juice stock.

Human Taste Tests

Sixteen human subjects were used in the taste testing. The subjects refrained from eating or drinking (except water) for at least 1 hour prior to the test. Subjects ate a cracker and rinsed with water to cleanse the mouth before the start of the test. 15 mL samples were served in 2 oz. sample cups at room temperature. Panelists rinsed with water between samples, and were encouraged to eat a cracker to remove all tastes before moving to the next sample. Samples were presented in randomized counterbalanced order within each tasting session (with different blinding codes). The panelists were asked to evaluate umaminess (savory level) make comments on the samples on an unstructured line scale (scoring 0-10), in duplicate sessions. There were 5 minutes breaks between tasting sessions, and a total of 4 sessions over a 2 day period. The samples tasted are given below

| Samples Tasted |
|---|
| 400 mg Na/8 oz tomato juice |
| 400 mg Na + 3 uM Compound 24/8 oz tomato juice |
| 400 mg Na + 3 uM Compound 30/8 oz tomato juice |

Scores were averaged across panelists and sessions, and evaluated using a 2-way ANOVA (factors: panelists and samples) and Duncan's multiple comparison test (alpha=0.05) to determine significant differences in intensity ratings. Results are summarized below.

TABLE G

Tomato Juice Taste Test Results

| Compound | Chemical Name | Taste Data |
|---|---|---|
| 24 | N1-(2,4-dimethoxybenzyl) N2-(2-(pyridin-2-yl)ethyl) oxalamide | 3 µM cpd enhanced the savory taste of 16 mM glutamate (naturally existing) in low sodium tomato juice by 1.4 to 1.5-fold |
| 30 | N1-(2-methoxy-4-methylbenzyl)-N2-(2-(5-methylpyridin-2-yl)ethyl) oxalamide | 3 µM cpd enhanced the savory taste of 16 mM glutamate (naturally existing) in low sodium tomato juice by 1.8 to 1.9-fold |

Example 35

Preparation of Savory Flavor Concentrate Compositions by Spray Drying

As described elsewhere herein, the savory compounds described herein are extremely potent; and it is desirable to prepare diluted flavorant concentrate compositions in order to suitably formulate seasoning mixes and/or final comestible compositions. The spray-drying procedures described below were used to prepare two such solid flavorant concentrate compositions, one comprising 0.10% (w/w) of the amide compounds of Example 1 and the other comprising the oxalamide compound of Example 24.

344.74 grams of commercially available Neobee M-5 medium chain triglyceride composition was placed in a 2 liter stainless steel cylinder container and heated to 200 F on a steam table, with agitation by a Lightnin Mixer. 18.14 grams of the amide compound of Example 1 (Compound 1) was slowly added with high agitation and mixed for 30 minutes until the compound was thoroughly dissolved and the solution was clear, to form a savory pre-blend composition, then the temperature was lowered to 180° F.

In a separate 2 liter stainless steel cylinder container, 2721.60 g of water was stirred with a Lightnin mixer and heated to a temperature of 140° F., then the Lightnin Mixer speed was set to 500 rpm to create a vortex, and 1451.52 g of N-Lok 1930 modified food starch was slowly added, and mixed for 20 minutes. Then 1814.40 g of the savory pre-blend composition described above was slowly added to the aqueous N-lok solution and mixed for 30 minutes, at 500 rpms, and the temperature reduced to 120° F., then the mixture was homogenized using a Gaulin homogenizer, Model E, with a first stage set at 2000 psi and a second stage set at 500 psi, to form an emulsion.

The resulting emulsion was spray dried using a Stock-Bowen Conical Laboratory Spray-Aire spray dryer with an inlet temperature of 203° C., outlet temperature of 119° C. with a flow rate of 160 ml/minute and an air pressure of 40 psig, to form 1306.20 grams of a powder comprising 1% of the compound of Example 1. This was equal to a 71.99% yield, or a 18.01% loss of product in the evacuation chamber. One pound (453.6 g) of the spray dried powder was combined with 9.0 lbs (4082.4 g) of LODE maltodextrin (Tate and Lyle) in a 40 quart Hobart planetary mixer and mixed for 20 minutes, to create a dry savory flavor concentrate powder having 0.10% (wt/wt) of the compound of Example 1. HPLC analysis indicated 82% of the theoretical amount of Compound 1.

An equivalent processing procedure was used to prepare a savory flavor concentrate composition comprising 0.1% (wt/wt) of the compound of Example 24 (Compound 24). In particular, 349.272 g of Neobee M-5 and 13.608 g of the oxalamide compound of Example 24 were mixed at 200° F. until dissolved to form a savory pre-blend composition, and the temperature of the solution was lowered to 180° F.

1451.52 g of N-Lok 1930 and 2721.60 g of water was mixed and heated until it reached a temperature of 140° F., the a vortex was created using a Lightnin Mixer at 500 rpms and 1814.40 g of the savory pre-blend composition and mixed for 30" at 500 rpms, then the solution was held at 120° F. and homogenized using a Gaulin, model E, homogenizer. The resulting emulsion was spray dried with an inlet temperature of 203° C., outlet temperature of 119° C., with a flow rate of 160 ml/minute and an air pressure of 40 psi, to produce 1400.72 grams of spray dried powder having 0.75% (wt/wt) of the compound of Example 24.

1.334 lbs (605.1024 g) of the spray dried powder was mixed with 8.666 lbs (3930.8976 g) of a 10 DE maltodextrin (Tate and Lyle) to produce a final dry savory flavor concentrate powder having 0.10% (wt/wt) of the compound of Example 24.

Example 36

Replacement of MSG in Sausage Seasonings

Summary:

The savory flavor concentrates compositions comprising the compounds of Examples 1 or 24 were used to prepare sausage seasoning mixes for Italian sausage, and example sausages themselves, and compared in human taste tests to control sausages both with and without MSG. Human tasters compared the samples and reported that the sausage comprising both of the compounds of Examples 1 and 24 had a more savory flavor than the control sausages, perceived increased salty flavor, and increased spicy tastes as compared with the control sausages.

Sausage Preparations:

Three different dry Italian sausage seasoning mixes were formulated by dry blending the ingredients shown in the Tables below, then rehydrated during the formulation of corresponding sausages. One control sample of seasoning mix (Tables 36-1a, b) contained no MSG, and no compounds of the invention. A second sample of seasoning mix and sausage contained added MSG (Tables 36-2a, b). A third sample of Seasoning mix and corresponding sausage also contained added savory flavor concentrate compositions (prepared as per Example 34) containing (0.1% wt/wt) of compounds 1 and 24 (Tables 36-1a, b).

TABLE 36-1a

Italian sausage seasoning mix without MSG

| Ingredient | Grams | Formula % (wt/wt) |
|---|---|---|
| Salt (Morton Salt) | 64.16 | 32.08 |
| Sugar (C&H #801461) | 37.74 | 18.87 |
| Paprika (Pacific Spice SA #1406) | 37.74 | 18.87 |
| Garlic powder (American Ingredients #5557) | 30.56 | 15.28 |
| Fennel Seeds Toasted (Spice Island 6C08B) | 11.32 | 5.66 |
| Black pepper 28 mesh (Pacific Spice SA #01406) | 9.44 | 4.72 |
| Parsley flakes (Pacific Spice SA #C1406) | 3.78 | 1.89 |
| Ground Anise seed (retail Kroger 09BK) | 3.38 | 1.69 |

TABLE 36-1a-continued

Italian sausage seasoning mix without MSG

| Ingredient | Grams | Formula % (wt/wt) |
|---|---|---|
| Cayenne pepper (Pacific Spice SA# C1406) | 1.88 | 0.94 |
| TOTAL | 200 | 100 |

Analysis of 10% solution of the dry mix

| | |
|---|---|
| pH | 5.00 |
| % Salt | 31.53 |
| Brix | 6.60 |

TABLE 36-1b

Sausage Preparation (No MSG)

| Ingredient | Grams | Formula % (wt/wt) |
|---|---|---|
| Pork, ground 20% fat | 280.68 | 93.56 |
| Dry mix Italian sausage seasoning without MSG | 15.9 | 5.30 |
| Water | 3.42 | 1.14 |
| TOTAL | 300 | 100 |

TABLE 36-2a

Italian sausage seasoning mix with MSG

| Ingredient | Grams | Formula % (wt/wt) |
|---|---|---|
| Salt (Morton Salt) | 62.96 | 31.48 |
| Monosodium glutamate (Ajinomoto #310704) | 3.70 | 1.85 |
| Sugar (C&H #801461) | 37.04 | 18.52 |
| Paprika (Pacific Spice SA #1406) | 37.04 | 18.52 |
| Garlic powder (American Ingredients #5557) | 30.00 | 15.00 |
| Fennel Seeds Toasted (Spice Island 6C08B) | 11.12 | 5.56 |
| Black pepper 28 mesh (Pacific Spice SA #01406) | 9.26 | 4.63 |
| Parsley flakes (Pacific Spice SA #C1406) | 3.70 | 1.85 |
| Ground Anise seed (retail Kroger 09BK) | 3.32 | 1.66 |
| Cayenne pepper (Pacific Spice SA# C1406) | 1.86 | 0.93 |
| TOTAL | 200 | 100 |

Analysis of 10% solution of the dry mix

| | |
|---|---|
| pH | 5.00 |
| % Salt | 31.53 |
| Brix | 6.60 |

TABLE 36-2b

Sausage Preparation (with MSG)

| Ingredient | Grams | Formula % (wt/wt) |
|---|---|---|
| Pork, ground (fat level 20%) | 280.41 | 93.47 |
| Dry mix Italian sausage seasoning with MSG | 16.17 | 5.39 |
| Water | 3.42 | 1.14 |
| TOTAL | 300 | 100 |

TABLE 36-3a

Italian sausage seasoning mix with 0.5 ppm of Compound 1 and 0.7 ppm of Compound 24.

| Ingredient | Grams | Formula % (wt/wt) |
|---|---|---|
| Salt (Morton Salt) | 61.60 | 31.37 |
| Flavor concentrate comprising 0.10% Compound 1 | 1.82 | 0.92 |
| Flavor concentrate comprising 0.10% Compound 24 | 2.54 | 1.29 |
| Sugar (C&H #801461) | 36.24 | 18.45 |
| Paprika (Pacific Spice SA #1406) | 36.24 | 18.45 |
| Garlic powder (American Ingredients #5557) | 29.34 | 14.95 |
| Fennel Seeds Toasted (Spice Island 6C08B) | 10.88 | 5.54 |
| Black pepper 28 mesh (Pacific Spice SA #01406) | 9.06 | 4.61 |
| Parsley flakes (Pacific Spice SA #C1406) | 3.62 | 1.85 |
| Ground Anise seed (retail Kroger 09BK) | 3.26 | 1.67 |
| Cayenne pepper (Pacific Spice SA# C1406) | 1.82 | 0.92 |
| TOTAL | 200 | 100 |

Analysis of 10% solution of the dry mix

| | |
|---|---|
| pH | 5.00 |
| % Salt | 31.53 |
| Brix | 6.60 |

TABLE 36-3b

Sausage Preparation

| Ingredient | Grams | Formula % (wt/wt) |
|---|---|---|
| Pork, ground 20% fat | 280.35 | 93.45 |
| Dry mix Italian sausage with Compounds 1 (9 ppm) and 24 (13 ppm) | 16.23 | 5.41 |
| Water | 3.42 | 1.14 |
| TOTAL | 300 | 100 |

Sensory Evaluations:

Ten trained tasters were trained to identify the relative intensities of the following taste attributes: salty, savory/meaty, umami, brothiness, bitter, linger and off flavors. A rank-rating intensity test was used to evaluate the Italian Sausage samples. A rank rating is a difference test to determine whether a sensory difference is perceived between various samples. Samples that were evaluated were the Italian Sausage no MSG, Italian sausage with MSG, Italian sausage with compounds 1 and 24 but no MSG. The panelists evaluated 3 randomized, blind coded samples of one ounce of Italian sausage served at 140° F., and ranked the intensity of savory, salt, spice flavors on a scale of 0-10:0 being the least intense and 10 being the most intense, and the scores were averaged for individual category.

TABLE 36c

Average scores of individual category for Italian Sausage

| | Savory | Spice | Salt |
|---|---|---|---|
| With MSG | 6.13 | 5.42 | 5.24 |
| Without MSG | 4.70 | 5.88 | 5.56 |
| With Compounds 1 and 24 | 6.34 | 6.42 | 5.97 |

Conclusions: The panelists were able to detect differences between the samples.

a. Savory: panelists ranked samples without MSG to be the least savory and samples with savory enhancer compounds 1 and 24 to be the most savory
b. Salt: panelist ranked samples with MSG to be the least salty and samples with savory enhancer compounds 1 and 24 to be the most salty
c. Spice flavor: panelists ranked samples with MSG to have the least spice flavor and samples with savory enhancer compounds 1 and 24 to have the most spice flavor Example 37

Partial Replacement of MSG in Ramen Noodle Soup

Summary:

A mixture of the compounds of Examples 1 and 24 were used to re-formulate Ramen Noodle Soup to have only ⅓ of a control level of MSG, and compared via human taste tests to a control soup having a full loading of MSG, and another control soup having only ⅓ of a normal loading of MSG. Human tasters could distinguish between the savory flavor of a control soup comprising a full loading of MSG, and a control soup with only ⅓ of the MSG, but could not distinguish the control soup with full MSG loading from the soup re-formulated with ⅓ of the MSG and the two compounds of the invention.

Noodle Soup Sample Preparation Procedures:

Ramen Noodle Soup Preparations:

The procedures below were used to prepare three variations of Ramen Noodle Soup Seasoning blends, which were added to cooked Ramen soup, for human taste testing. One Control seasoning blend comprised a full loading of MSG (Tables 1a, 1b, and 1c). A second Control seasoning blend comprised a ⅓ loading of MSG (Tables 2a, 2b, and 2c). A third seasoning blend comprised the flavor concentrate compositions comprising compounds 1 and 24, and a ⅓ loading of MSG.

Ramen Noodle Soup Seasoning Mixes:

The dry ingredients listed in Tables 37-1a, 37-2a, 37-3a were dry blended in a 6 quart bowl using a kitchen aid blender with a paddle attachment for 10 minutes and then hand blended with a rubber spatula to ensure visual homogeneity. The dry seasoning mixes were stored in a polyurethane non-vented food bag prior to soup preparation. The seasonings were then used to prepare Ramen Noodle Soup using hot water according to the proportions in Tables 37-1c, 37-2c, 37-3c. The proportions of ingredients used to prepare Ramen Noodle Soup actually having Noodles are illustrated in Tables 37-1c, 37-2c, 37-3c, but those samples were not actually tasted.

TABLE 37-1a

Ramen Noodle Soup Seasoning Mix (full MSG) - Control Formula A

| Ingredient | Formula % (wt/wt) |
|---|---|
| Salt (Morton Salt) | 31.53 |
| Monosodium Glutamate (Ajinomoto) | 15.24 |
| Autolyzed Yeast Extract (Sensient #945) | 0.79 |
| Hydrolyzed Vegetable Protein (Basic Food Flavors #C-303) | 5.25 |
| Ajitide I + G (Ajinomoto) | 0.26 |
| Soy Sauce Powder (Nikken #5310) | 11.04 |
| Garlic Powder (American Food Flavors, Inc #GA45) | 9.25 |
| Powdered Chicken (Henningson C-100-1B-AR #730) | 9.04 |
| Chicken Flavor (Mastertaste #F42X32) | 5.78 |
| Onion Powder (Elite Spice #516) | 4.20 |

TABLE 37-1a-continued

Ramen Noodle Soup Seasoning Mix (full MSG) - Control Formula A

| Ingredient | Formula % (wt/wt) |
|---|---|
| Sugar, Granulated (C & H) | 2.57 |
| Powdered Chicken Fat (Henningson #732) | 2.52 |
| Turmeric (McCormick) | 1.05 |
| White Pepper (Pacific Natural Spices) | 0.63 |
| Celery Powder (Food Source, Inc. #60) | 0.53 |
| Citric Acid (ADM) | 0.32 |
| TOTAL | 100.00% |

TABLE 37-1b

Preparation of Ramen Noodle Soup (as prepared with noodles)

| Ingredient | Grams | Formula % (wt/wt) |
|---|---|---|
| Ramen Noodle Soup Seasoning-Formula A | 8.99 | 1.61 |
| Ramen Noodles (retail) | 77.36 | 13.82 |
| Water | 473.20 | 84.57 |
| TOTAL | 559.55 g | 100.00% |

TABLE 37-1c

Preparation of Ramen Noodle Soup (as evaluated by the taste panel)

| Ingredient | Grams | Formula % (wt/wt) |
|---|---|---|
| Ramen Noodle Soup Seasoning-Formula A | 17.98 | 1.86 |
| Water | 946.40 | 98.14 |
| TOTAL | 964.38 g | 100.00% |

TABLE 37-2a

Ramen Noodle Soup Seasoning, 66% reduced MSG - Formula B

| Ingredient | Formula % (wt/wt) |
|---|---|
| Salt (Morton Salt) | 35.07 |
| Monosodium Glutamate (Ajinomoto) | 5.71 |
| Hydrolyzed Vegetable Protein (Basic Food Flavors #C-303) | 5.85 |
| Autolyzed Yeast Extract (#945) | 0.88 |
| Ajitide I + G (Ajinomoto) | 0.29 |
| Soy Sauce Powder (Nikken #5310) | 12.28 |
| Garlic Powder (American Food Flavors, Inc #GA45) | 10.29 |
| Powdered Chicken (Henningson C-100-1B-AR #730) | 10.05 |
| Chicken Flavor (Mastertaste #F42X32) | 6.43 |
| Onion Powder (Elite Spice #516) | 4.68 |
| Sugar, Granulated (C & H) | 2.86 |
| Powdered Chicken Fat (Henningson #732) | 2.81 |
| Turmeric (McCormick) | 1.17 |
| White Pepper (Pacific Natural Spices) | 0.70 |
| Celery Powder (Food Source, Inc. #60) | 0.58 |
| Citric Acid (ADM) | 0.35 |
| TOTAL | 100% |

TABLE 37-2b

Preparation of Ramen Noodle Soup (as prepared with noodles)

| Ingredient | Grams | Formula % (wt/wt) |
|---|---|---|
| Ramen Noodle Soup Seasoning-Formula B | 8.09 | 1.45 |
| Ramen Noodles (retail) | 77.36 | 13.85 |
| Water | 473.20 | 84.70 |
| TOTAL | 558.65 g | 100% |

TABLE 37-2c

Preparation of Ramen Noodle Soup (as evaluated by the taste panel)

| Ingredient | Grams | Formula % (wt/wt) |
|---|---|---|
| Ramen Noodle Soup Seasoning-Formula B | 16.18 | 1.68 |
| Water | 946.40 | 98.32 |
| TOTAL | 964.38 g | 100% |

TABLE 37-3a

Ramen Noodle Soup Seasoning, 66% reduced MSG with savory enhancers-Formula C

| Ingredient | Formula % (wt/wt) |
|---|---|
| Salt (Morton Salt) | 33.39 |
| Flavor Concentrate with 0.1% Compound 24 (8.5 ppm) | 0.85 |
| Flavor Concentrate with 0.1% Compound 1 (39.5 Ppm) | 3.96 |
| Monosodium Glutamate (Ajinomoto) | 5.44 |
| Hydrolyzed Vegetable Protein (Basic Food Flavors #C-303) | 5.56 |
| Autolyzed Yeast Extract (#945) | 0.83 |
| Ajitide I + G (Ajinomoto) | 0.28 |
| Soy Sauce Powder (Nikken #5310) | 11.69 |
| Garlic Powder (American Food Flavors, Inc #GA45) | 9.79 |
| Powdered Chicken (Henningson C-100-1B-AR #730) | 9.57 |
| Chicken Flavor (Mastertaste #F42X32) | 6.12 |
| Onion Powder (Elite Spice #516) | 4.45 |
| Sugar, Granulated (C & H) | 2.73 |
| Powdered Chicken Fat (Henningson #732) | 2.67 |
| Tumeric (McCormick) | 1.11 |
| White Pepper (Pacific Natural Spices) | 0.67 |
| Celery Powder (Food Source, Inc. #60) | 0.56 |
| Citric Acid (ADM) | 0.33 |
| TOTAL | 100% |

TABLE 37-3b

Preparation of Ramen Noodle Soup (as prepared with noodles)

| Ingredient | Grams | Formula % (wt/wt) |
|---|---|---|
| Ramen Noodle Soup Seasoning-Formula C | 8.49 | 1.52 |
| Ramen Noodles (retail) | 77.36 | 13.84 |
| Water | 473.20 | 84.64 |
| TOTAL | 559.05 g | 100% |

TABLE 37-3c

*Preparation of Ramen Noodle Soup (as evaluated by the sensory taste panel)

| Ingredient | Grams | Formula % (wt/wt) |
|---|---|---|
| Ramen Noodle Soup Seasoning-Formula B | 16.98 | 1.76 |
| Water | 946.40 | 98.24 |
| TOTAL | 968.38 g | 100% |

*Formula 37-3a contained a combination of compounds 24 and 1 in a ratio of 1:4.5 in the finished ramen soup that had a final concentration level of 0.15 ppm of compound 24 and 0.70 ppm of compound 1 in the finished ramen soup.

Sensory Evaluation Procedures:

Eight trained external tasters were trained to identify relative intensities of the following taste attributes: salty, savory/meaty, umami, brothiness, bitter, linger and off flavors in paired comparison tests. Paired comparison tests attempt to determine whether a perceivable sensory difference exists between two blind coded randomized samples. Each sample contained 2 ounces of ramen soup, served at 120° F., and each panelist conducted a total of five paired comparison tests.

Evaluation #1: The Ability to Distinguish Savory Flavors of High and Low MSG Control Formulations The objective was to determine whether panelists could tell the difference in savory flavor between the high MSG control (Full MSG, Formula A) and the 66% reduced MSG Control (Formula B);

Results:

Eight panelists evaluated the 100% MSG Ramen broth verses the 33% MSG Ramen broth in paired comparison tests five times. The results showed that 25 evaluations rated the 100% MSG ramen broth as more savory than the 33% MSG ramen broth while 15 tests rated the 33% MSG ramen broth as more savory. See Table 37-4 for results.

TABLE 37-4

100% MSG ramen broth versus 33% MSG ramen broth.
n = 40 (8 Panelists × 5 reps).

| Samples | Totals |
|---|---|
| 100% MSG ramen soup selected | 25 |
| 33% MSG ramen soup selected | 15 |
| Total | 40 |
| Confidence | 0.923 |
| 100% MSG ramen soup selected (p-value) | 0.077 |

Conclusion: Panelists could differentiate between 100% MSG ramen soup versus the 66% reduced MSG ramen soup; and correctly identified the 100% MSG sample to be significantly more savory than 33% MSG ramen broth. (p<0.1).

Evaluation #2—Comparison of High MSG Ramen Noodle Soup and a Reformulated Soup Comprising Compounds 1 and 24 and 66% reduced MSG.

The objective was to determine whether panelists could tell the difference in savory flavor between the high MSG noodle soup (Full MSG, Formula A) and the reformulated noodle soup comprising 66% reduced MSG, and compound 1 at 0.7 ppm and compound 2 at 0.15 ppm.

Results:

Eight panelists evaluated the 100% MSG ramen soup verses the 33% MSG ramen broth plus 0.15 ppm Compound 24 and 0.7 ppm Compound 1 in paired comparison tests repeated five times to obtain an N=40. The results showed that 20 evaluations rated the 100% MSG ramen soup as more savory and 20 evaluations rated the 33% MSG+0.15 ppm Compound 24 and 0.70 ppm Compound 24 ramen soup as more savory. See Table 37-5 for results.

TABLE 37-5

100% MSG ramen soup versus 33% MSG + 0.15 ppm Compound 24 and 0.7 ppm Compound 1 ramen soup. n = 40 (8 Panelists × 5 reps).

| Samples | Totals |
|---|---|
| 100% MSG ramen soup selected | 20 |
| 33% MSG + 0.15 ppm Compound 24 and 0.7 ppm Compound 1 ramen broth selected | 20 |
| Total | 40 |
| Confidence | <0.125 |
| 100% MSG ramen soup selected (p-value) | >0.875 |

Conclusion:

Panelists were unable to perceive a significant difference in savory intensity between 100% MSG ramen noodle soup and 33% MSG with +0.15 ppm Compound 24 and 0.7 ppm Compound 1 ramen noodle soup (p<0.1). Therefore, MSG was significantly reduced and replaced with Senomyx's enhancer 5336 and 5807 without any change in savory intensity.

Additional taste perceptions were reported by leasts some of the subjects, including increased salt perception in the sample utilizing compounds 1 and 24, and that the prolonged umami lingering effects improved the balance of flavor, and gave increased spice, herb and heat flavors in the sample utilizing compounds 1 and 24. Accordingly, use of mixtures of compounds can allow for reduction MSG and other savory potentiators such as IMP, GMP, etc, which may results in cost reduction.

Example 38

Replacement of MSG in Cajun BBQ Flavored Potato Chips

Summary:

Four samples of Cajun flavored potato chips were prepare and compared via human taste tests. One control chip sample had no MSG, another control chip sample had 0.6% MSG added, one chip sample had 3 ppm of the amide compound of Example 1 added in the form of a flavor concentrate composition, and one chip sample had 3 ppm of the oxalamide compound of Example 24 added in the form of a flavor concentrate composition. In human focus group taste tests, nine of eleven panelists reported that the chip samples comprising the compounds of Examples 1 and 24 had an increased intensity of Cajun spices and pepper flavors. Some panelists reported that the chip samples comprising the compounds of Examples 1 and 24 had an increased savory flavor.

Sample Preparations:

Two solid savory flavor concentrate compositions were prepared by spray drying procedures equivalent to those reported in Example 35. One savory flavor concentrate sample, comprising 0.01% (wt/wt) of the compound of Example 1 was prepared via from the compound of Example 1, Neobee M-5 medium chain triglycerides, N-Lok 1930 modified food starch, and maltodextrin. Another savory flavor concentrate sample, comprising 0.01% (wt/wt) of the compound of Example 24 was similarly prepared via from the compound of Example 24, Neobee M-5 medium chain triglycerides, N-Lok 1930 modified food starch, and maltodextrin.

A basic dry seasoning mix for providing Cajun flavor for the chips was prepared by dry blending the ingredients in Table 38-1 using a KitchenAide blender for 5 minutes at 40-80 rpms using a wire whip attachment.

TABLE 38-1

Dry Seasoning Mix Formula A

| Ingredient | Grams | Formula % (wt/wt) |
|---|---|---|
| Maltodextrin DE 18 (Grain Processing Co.) | 29.33 | 29.33 |
| Salt- Flour (Morton) | 13.10 | 13.10 |
| Honey Powder-50% honey (Mastertaste) | 27.37 | 27.37 |
| Onion Powder (American Food Ingredients) | 7.16 | 7.16 |
| Garlic Powder (American Food Ingredients) | 6.55 | 6.55 |
| Paprika (McCormick) | 2.18 | 2.18 |
| Red Pepper (McCormick) | 1.09 | 1.09 |
| Ground Cayane Red Pepper (McCormick) | 0.71 | 0.71 |
| White Pepper (McCormick) | 0.22 | 0.22 |
| Lime Powder (Mastertaste) | 4.58 | 4.58 |
| Ancho chili powder (McCormick) | 0.95 | 0.95 |
| Canola oil spray | 0.87 | 0.87 |
| Tomato powder (McCormick) | 5.62 | 5.62 |
| Chardex Hickory MS (Red Arrow) | 0.27 | 0.27 |
| TOTAL | 100.00 | 100.00 |

General Preparation of the Seasoned Chip Samples:

Kettle® Unsalted potato chips were hand broken into reasonably uniform ½"×½" pieces and placed in a polyethylene 26.7 cm×27.9 cm non-vented food bag. The chips were then heated in an Amana Commercial 1200 watt microwave for 20 seconds to release oils, and so the seasoning would adhere to the chips. Canola oil and was sprayed on the chips and then the various seasoning ingredients (the Dry Seasoning Mix described above, premixed with any added MSG or flavor concentrate compositions) were sprinkled into the bag. The bag was then shaken by hand for 1 minute until all chips were evenly coated with the seasoning mixture (Table 2). Chips were allowed to cool to ambient temperature (20° C./68° F.) before tasting.

TABLE 38-2

Cajun BBQ Chips with no MSG or savory concentrate compostions

| Ingredient | Grams | Formula % (wt/wt) |
|---|---|---|
| Kettle ® Chips- Unsalted | 84.36 | 84.36 |
| Seasoning Mix A | 7.36 | 7.36 |
| MSG (Ajinomoto #310704) | 0.18 | 0.18 |
| Canola oil spray | 8.10 | 8.10 |
| TOTAL | 100.00 | 100.00 |

TABLE 38-3

Cajun BBQ Chips with 0.6% MSG

| Ingredient | Grams | Formula % (wt/wt) |
|---|---|---|
| Kettle ® Chips- Unsalted | 83.67 | 83.67 |
| Seasoning Mix A | 7.63 | 7.63 |
| MSG (Ajinomoto #310704) | 0.60 | 0.60 |
| Canola oil spray | 8.10 | 8.10 |
| TOTAL | 100.00 | 100.00 |

TABLE 38-4

Cajun BBQ Chips-with 3 ppm Compound 1

| Ingredient | Grams | Formula % (wt/wt) |
|---|---|---|
| Kettle ® Chips- Unsalted | 81.09 | 81.09 |
| Seasoning Mix A | 7.63 | 7.63 |
| Salt- Flour (Morton) | 0.18 | 0.18 |
| Canola oil spray | 8.10 | 8.10 |
| Flavor Concentrate Composition containing 0.01% Compound 1 | 3.00 | 3.00 |
| TOTAL | 100.00 | 100.00 |

TABLE 38-5

Cajun BBQ Chips-with 3 ppm Compound 24

| Ingredient | Grams | Formula % (wt/wt) |
|---|---|---|
| Kettle ® Chips- Unsalted | 81.09 | 81.09 |
| Seasoning Mix A | 7.63 | 7.63 |
| Salt- Flour (Morton) | 0.18 | 0.18 |
| Canola oil spray | 8.10 | 8.10 |
| Flavor Concentrate Composition containing 0.01% Compound 24 | 3.00 | 3.00 |
| TOTAL | 100.00 | 100.00 |

Sensory Evaluation Procedures:

Eleven external tasters were trained to identify relative intensities of the following taste attributes: sweet, salty, savory/meaty, umami, brothiness, bitter, linger and off flavors. The panelists evaluated the four sample types of Cajun BBQ chips in a Focus Group taste test procedure and were instructed to write comments on several attributes: sweet, BBQ, Cajun spice, pepper, onion, salt, potato, umami, off tastes, other, and liking or disliking. And instructed to evaluate differences in umami taste and possible enhancement of flavors and taste.

Results:

Overall, 9/11 panelists reported the samples containing Compounds 1 and 24 to have the higher intensity of Cajun spice and pepper flavors.

Example 39

Replacement of MSG in Pizza Sauce

Summary:

A water soluble flavor concentrate composition comprising the compound of Examples 1 was prepared and then used to replace MSG in pizza sauce, and compared via human taste tests to a pizza sauce having a full loading of MSG. Most taste tasters could not distinguish between the sauces.

Water Soluble Flavor Concentrate Composition Comprising Compound 1:

For effective formulation in pizza sauce, a water soluble savory flavor concentrate formulation comprising 0.1% of Compound 1 was developed by dissolution in propylene glycol.

18221.7600 g of propylene glycol (supplied by Gold Coast, Inc.) was weighed out into a 2000 ml stainless steel cylinder, 18.2400 grams of Compound 1 was slowly added to 700.00 g of the propylene glycol using a Silverson Mill (model: L4RT) having a square hole high shear screen and set at 2000 rpm, until all of the dry 5807 (Compound 1) was added to the propylene glycol, the mill rpms was increased to 5,000-6,000 rpm's for 8-10 minutes. The remaining 17,521.76 g of propylene glycol was placed into a 10-gallon steam jacketed kettle equipped with a Lightnin Mixer utilizing a three blade impeller and heated to 50° C. (120° F.), then the milled solution was slowly added to the heated and agitated propylene glycol in the kettle. It took over 30 minutes of heating and mixing to completely solubilize Compound 1, then, the solution was allowed to cool to 80° F., then a Unispense Filler was used to fill sterilized 2 oz. glass containers with 62 grams of the liquid savory flavor, for storage. The water activity of the solution was 0.953 @24.7° C., the refractive index was 1.4328, and the final concentration of this savory flavor was 0.10% of Compound 1. Analysis via HPLC showed the average recovery of Compound 1 was 94% of theoretical.

Pizza Sauce Preparation Procedures:

Two pizza sauce samples, one comprising 0.4% of MSG and one containing no MSG, but comprising 1.1 ppm of Compound 1 were prepared using the ingredients listed in Tables 391 and 39-2 below, using the following procedure.

Salt, citric acid, sugar, the spices and herbs, including the MSG, were pre-blended as solids at 80-100 rpms in a 6 quart bowl and mixed using a KitchenAide blender for 5 minutes using a whip attachment. Water was placed in a clean kettle and stirred with a Lightnin mixer at 120-200 rpms to create a vortex. The savory flavor form of Compound 1, 0.10%, was slowly added to the water and mixed for five minutes. The vinegar and solid spice mixture was slowly added with the mixer still blending at 80-100 rpms until the dry seasonings were dissolved, approximately 5 minutes. The tomato paste was added and the slurry was mixed an additional 10. The resulting pizza sauce was transferred to a stainless steel six quart pot on a gas burner and was heated to pasteurizing temperature (175-190° F.) and held for a minimum of two minutes, cooled down to ambient (70+/−2° F.) temperature.

TABLE 39-1

Control Pizza sauce, with Monosodium Glutamate

| Ingredient | Grams | Formula % (wt/wt) |
|---|---|---|
| Water | 252.75 | 50.55 |
| Tomato paste (retail Ralphs 5TP1Q) | 220.80 | 44.16 |
| Salt (Morton Salt) | 9.00 | 1.80 |
| Sugar (C&H #801461) | 7.95 | 1.59 |
| Distilled vinegar 50 grain (Heinz HF6A06UW) | 3.75 | 0.75 |
| Monosodium Glutamate (Ajinomoto 310704) | 2.00 | 0.40 |
| Black pepper 28 mesh (Pacific Spice SA#01406) | 1.05 | 0.21 |
| Onion powder (Pacific Spice SA#C1406) | 0.70 | 0.14 |
| Garlic powder (American Ingredients GA45) | 0.70 | 0.14 |
| Citric acid (ADM S501132) | 0.70 | 0.14 |
| Ground oregano (McCormick 523561) | 0.45 | 0.09 |
| Basil (McCormick 526961) | 0.15 | 0.03 |
| TOTAL | 500 | 100 |
| Analysis | | |
| pH | 3.92 | |
| % TA (Titratable Acidity as Acetic Acid) | 0.72 | |
| Brix | 16.72 | |

TABLE 39-2

Pizza sauce, with 1.10 PPM of Compound 1, No MSG

| Ingredient | Grams | Formula % (wt/wt) |
|---|---|---|
| Water | 253.58 | 50.72 |
| Tomato paste (retail Ralphs 5TP1Q) | 220.80 | 44.16 |

TABLE 39-2-continued

Pizza sauce, with 1.10 PPM of Compound 1, No MSG

| Ingredient | Grams | Formula % (wt/wt) |
|---|---|---|
| Salt (Morton Salt) | 9.625 | 1.93 |
| Sugar (C&H #801461) | 7.95 | 1.59 |
| Distilled vinegar 50 grain (Heinz) | 3.75 | 0.75 |
| Black pepper 28 mesh (Pacific Spice SA#01406) | 1.05 | 0.21 |
| Onion powder (Pacific Spice SA#C1406) | 0.70 | 0.14 |
| Garlic powder (American Ingredients BA45) | 0.70 | 0.14 |
| Citric acid (ADM S501132) | 0.70 | 0.14 |
| Concentrate comprising (0.10% Compound 1) | 0.55 | 0.11 |
| Ground oregano (McCormick 523561) | 0.45 | 0.06 |
| Basil (McCormick 526961) | 0.15 | 0.03 |
| TOTAL | 500 | 100 |
| Analysis | | |
| ph | | 3.75 |
| % TA | | 0.80 |
| Brix | | 16.10 |

Sensory Evaluation:

Ten trained tasters were trained to identify relative intensities of the following taste attributes: salty, savory/meaty, umami, brothiness, bitter, linger and off flavors. A triangle difference test determines if there is a sensory difference between two products. Three blinded, coded and randomized samples are presented to the panelist. Two samples are the same and one is different. To answer the test correctly, the panelist must taste all three samples and correctly pick out the sample they feel is different from the other two.

The samples were blind coded and presented in randomized order. The panelists each performed a total of two triangle tests, with 3 samples per test a. Test 1: 2 samples with 1.1 ppm Compound 1; one sample with MSG.

b. Test 2: 2 samples with MSG; one sample with 1.1 ppm Compound 1.

TABLE 39-3

Triangle test results, n = 20 (10 Panelists × 2 reps)

| Samples | Test 1 | Test 2 | Totals |
|---|---|---|---|
| # Incorrect | 7 | 4 | 11 |
| # Correct | 3 | 6 | 9 |
| Total | 10 | 10 | 20 |
| Significance (p-value) | 0.701 | 0.077 | 0.191 |

In test #1 only three of the ten panelists correctly identified the different sample (i.e the sample comprising MSG). In test #2, six of the ten panelists correctly identified the different sample (i.e. the sample comprising Compound 1). From a total of twenty tests, nine tests correctly identified the different sample.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A process for preparing a solid flavorant concentrate composition, comprising:

a) providing one or more amide compounds having the formula

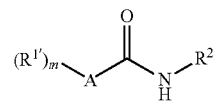

wherein i) A is a 5 or 6 membered aryl or heteroaryl ring, ii) m is 0, 1, 2, 3 or 4, iii) each $R^{1'}$ is independently selected from the group consisting of hydroxyl, $NH_2$, SH, halogen, and a $C_1$-$C_4$ organic radical, and iv) $R^2$ has 3 to 15 carbon atoms and is a branched alkyl, a cycloalkyl ring, or a heterocyclic ring, optionally substituted with 1, 2, 3, or 4 substituent groups independently selected from the group consisting of hydroxyl, $NH_2$, SH, halogen, and a $C_1$-$C_4$ organic radical, or one or more comestibly acceptable salts thereof, and b) dissolving the one or more amide compounds or comestibly acceptable salts thereof in one or more comestibly acceptable liquids to form a flavorant solution;

c) contacting the flavorant solution with one or more comestibly acceptable solid carriers or a solution, dispersion, or emulsion thereof, to form an intermediate composition; and d) removing or permitting the loss of liquids from the intermediate composition so as to form a solid flavorant concentrate composition.

2. The process of claim 1, wherein the step of removing or permitting the loss of liquids is a drying step.

3. The process of claim 2, wherein the drying step comprises spray drying, evaporating or heating.

4. The process of claim 1, wherein the amide compound has the formula:

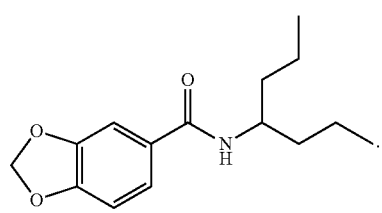 [SMILES: CCCC(CCC)NC(=O)c1ccc2c(c1)OCO2]

* * * * *